(12) United States Patent
Anagnostou et al.

(10) Patent No.: US 11,144,835 B2
(45) Date of Patent: Oct. 12, 2021

(54) SYSTEMS AND METHODS FOR OUTAGE PREDICTION

(71) Applicant: University of Connecticut, Farmington, CT (US)

(72) Inventors: Emmanouil Anagnostou, Farmington, CT (US); David Wanik, Farmington, CT (US); Brian Hartman, Farmington, CT (US); Jichao He, Farmington, CT (US)

(73) Assignee: University of Connecticut, Farmington, CT (US)

( * ) Notice: Subject to any disclaimer, the term of this patent is extended or adjusted under 35 U.S.C. 154(b) by 0 days.

(21) Appl. No.: 16/317,354

(22) PCT Filed: Jul. 29, 2016

(86) PCT No.: PCT/US2016/044893
§ 371 (c)(1),
(2) Date: Jan. 11, 2019

(87) PCT Pub. No.: WO2018/013148
PCT Pub. Date: Jan. 18, 2018

(65) Prior Publication Data
US 2019/0228362 A1    Jul. 25, 2019

Related U.S. Application Data

(60) Provisional application No. 62/363,156, filed on Jul. 15, 2016.

(51) Int. Cl.
*G06N 5/02* (2006.01)
*G06Q 50/06* (2012.01)
(Continued)

(52) U.S. Cl.
CPC ............... *G06N 5/02* (2013.01); *G06N 20/00* (2019.01); *G06Q 10/04* (2013.01);
(Continued)

(58) Field of Classification Search
None
See application file for complete search history.

(56) References Cited

U.S. PATENT DOCUMENTS 6,574,561 B2    6/2003 Alexander et al.
8,280,633 B1   10/2012 Eldering et al.
(Continued)

FOREIGN PATENT DOCUMENTS

EP      2472455 A1 *  7/2012   ..... G06Q 10/063112
WO   WO-2008133922 A1 * 11/2008   .............. G01W 1/10
(Continued)

OTHER PUBLICATIONS

Cerrai, Diego, et al. "Predicting storm outages through new representations of weather and vegetation." IEEE Access 7 (2019): 29639-29654. (Year: 2019).*
Liu et al., "Spatial generalized linear mixed models of electric power outages due to hurricanes and ice storms," Reliability Engineering & System Safety, 2008, 93(6):875-890.
(Continued)

*Primary Examiner* — Matthew S Gart
*Assistant Examiner* — Derick J Holzmacher
(74) *Attorney, Agent, or Firm* — Michael Best & Friedrich LLP

(57) ABSTRACT

A system and method for outage prediction for electrical distribution utilities using high-resolution weather forecasts, geographic data (e.g., land use and vegetation around overhead-lines) and utility infrastructure data (e.g., transformer fuses, etc.) to predict distributed outage occurrences (e.g., number of outages over a 2-km gridded map) in advance of a storm.

20 Claims, 41 Drawing Sheets

(51) Int. Cl.
| | |
|---|---|
| *G06N 20/00* | (2019.01) |
| *G06Q 10/04* | (2012.01) |
| *G06Q 10/06* | (2012.01) |
| *H02J 3/00* | (2006.01) |

(52) U.S. Cl.
CPC ... *G06Q 10/0635* (2013.01); *G06Q 10/06315* (2013.01); *G06Q 50/06* (2013.01); *H02J 3/00* (2013.01); *H02J 3/003* (2020.01); *H02J 2203/20* (2020.01)

(56) References Cited

U.S. PATENT DOCUMENTS

| | | | | |
|---|---|---|---|---|
| 8,682,623 | B1* | 3/2014 | Domijan, Jr. | G01W 1/06 703/2 |
| 8,775,109 | B2 | 7/2014 | Curt et al. | |
| 9,297,723 | B1* | 3/2016 | Hofmann | G06N 20/00 |
| 10,204,193 | B2 | 2/2019 | Koger et al. | |
| 10,387,961 | B1 | 8/2019 | Burgess et al. | |
| 10,445,673 | B1* | 10/2019 | Hofmann | G06N 3/08 |
| 10,529,028 | B1 | 1/2020 | Davis et al. | |
| 10,579,749 | B1 | 3/2020 | Davis et al. | |
| 10,740,684 | B1 | 8/2020 | Wani et al. | |
| 2005/0096856 | A1 | 5/2005 | Lubkeman et al. | |
| 2008/0300790 | A1 | 12/2008 | Kakaire | |
| 2010/0131202 | A1 | 5/2010 | Dannevik et al. | |
| 2011/0116387 | A1* | 5/2011 | Beeco | H04L 41/0677 370/242 |
| 2011/0119375 | A1* | 5/2011 | Beeco | H04L 41/12 709/224 |
| 2011/0119517 | A1* | 5/2011 | Beeco | H04L 41/12 713/340 |
| 2012/0046917 | A1 | 2/2012 | Fang et al. | |
| 2012/0072039 | A1* | 3/2012 | Anderson | G06Q 10/06315 700/291 |
| 2012/0136496 | A1* | 5/2012 | Black | H02J 3/14 700/291 |
| 2012/0150783 | A1 | 6/2012 | Jung et al. | |
| 2012/0265502 | A1 | 10/2012 | Omitaomu et al. | |
| 2012/0303278 | A1 | 11/2012 | Dannevik et al. | |
| 2012/0316906 | A1 | 12/2012 | Hampapur et al. | |
| 2013/0054162 | A1* | 2/2013 | Smith | H02J 13/00 702/59 |
| 2013/0110399 | A1 | 5/2013 | Moss et al. | |
| 2013/0268196 | A1 | 10/2013 | Dam | |
| 2014/0100889 | A1 | 4/2014 | Tofte | |
| 2014/0156190 | A1 | 6/2014 | Cordazzo et al. | |
| 2014/0236650 | A1 | 8/2014 | Davenport et al. | |
| 2014/0281645 | A1* | 9/2014 | Sen | G06Q 50/06 713/340 |
| 2014/0324351 | A1 | 10/2014 | Dannevik et al. | |
| 2015/0227893 | A1 | 8/2015 | Huynh et al. | |
| 2016/0306075 | A1* | 10/2016 | Heng | G06Q 10/06315 |
| 2016/0328670 | A1 | 11/2016 | Adam et al. | |
| 2016/0343093 | A1* | 11/2016 | Riland | G06Q 10/04 |
| 2017/0169534 | A1 | 6/2017 | Wani et al. | |
| 2017/0329287 | A1 | 11/2017 | Kurisu et al. | |
| 2018/0005293 | A1 | 1/2018 | Adams et al. | |
| 2018/0314995 | A1 | 11/2018 | Katz et al. | |
| 2018/0336652 | A1 | 11/2018 | Wani et al. | |
| 2019/0235604 | A1 | 8/2019 | VanBlon et al. | |
| 2019/0268283 | A1 | 8/2019 | Mukherjee et al. | |
| 2019/0304026 | A1 | 10/2019 | Lyman et al. | |
| 2019/0316309 | A1 | 10/2019 | Wani et al. | |
| 2019/0318440 | A1 | 10/2019 | Wani et al. | |
| 2020/0037125 | A1 | 1/2020 | Neuert | |
| 2020/0160283 | A1* | 5/2020 | Watson | G06F 16/29 |

FOREIGN PATENT DOCUMENTS

| | | | | |
|---|---|---|---|---|
| WO | WO-2011106511 A1 * | 9/2011 | | G06Q 10/04 |
| WO | WO-2012009724 A1 * | 1/2012 | | G06N 20/10 |
| WO | 2015/095890 A1 | 6/2015 | | |
| WO | 2015/112892 A1 | 7/2015 | | |
| WO | WO-2015112892 A1 * | 7/2015 | | G06Q 10/0635 |

OTHER PUBLICATIONS

Eskandarpour, Rozhin, and Amin Khodaei. "Machine learning based power grid outage prediction in response to extreme events." IEEE Transactions on Power Systems 32.4 (2016): 3315-3316. (Year: 2016).*

Jufri, Fauzan Hanif, et al. "A Method to Forecast Storm-Caused Distribution Grid Damages Using Cost-Sensitive Regression Algorithm." 2019 IEEE Innovative Smart Grid Technologies-Asia (ISGT Asia). IEEE, 2019. (Year: 2019).*

Rudin, Cynthia, et al. "Machine learning for the New York City power grid." IEEE transactions on pattern analysis and machine intelligence 34.2 (2011): 328-345. (Year: 2011).*

Wanik, D. W., et al. "Storm outage modeling for an electric distribution network in Northeastern USA." Natural Hazards 79.2 (2015): 1359-1384. (Year: 2015).*

Angalakudati et al., "Improving emergency storm planning using machine learning," T&D Conference and Exposition, 2014 IEEE PES, 6 pages.

Cerruti et al., "A statistical forecast model of weather-related damage to a major electric utility," Journal of Applied Meteorology and Climatology, 2012, 51:191-204.

Ciftci et al., "Analysis of the probability of failure for open-grown trees during wind storms," Probabilistic Engineering Mechanics, 2014, 37:41-50.

Davidson et al., "Electric power distribution system performance in Carolina Hurricanes," Nat Hazards Rev, 2003, 4 (1):36-45.

Guikema et al., "Estimating Power Outages during Hurricanes Using Semi-Parametric Statistical Methods," Structures Congress 2008, Apr. 24-26, 2008, Vancouver, British Columbia, Canada, 9 pages.

Guikema et al., "Hybrid data mining-regression for infrastructure risk assessment based on zero-inflated data," Reliability Engineering and System Safety, 2012, vol. 99(C), pp. 178-182.

Guikema et al., "Modelling critical infrastructure reliability with generalized linear (mixed) models," Proc Int Conf Probabilistic Saf Assess Manage, PSAM, 2006, 9 pages.

Guikema et al., "Practical considerations in statistical modeling of count data for infrastructure systems," J Infrastruct Syst, 2009, 15(3): 172-178.

Guikema et al., "Predicting Hurricane Power Outages to Support Storm Response Planning," IEEE Access, 2014, vol. 2, 1364-1373.

Guikema et al., "Prestorm estimation of hurricane damage to electric power distribution systems," Risk Anal., 2010, 30(12):1744-1752.

Guikema et al., "Statistical models of the effects of tree trimming on power system outages," IEEE Trans Power Delivery, 2006, 21(3):1549-1557.

Guikema et al., "Storm power outage prediction modeling," Saf, Reliab Risk Anal: Beyond Horiz—Proc Eur Saf Reliab Conf, ESREL, 2014.

Han et al., "Estimating the spatial distribution of power outages during hurricanes in the Gulf coast region," Reliability Engineering and System Safety, 2009, 94(2):199-210.

Han et al., "Improving the predictive accuracy of hurricane power outage forecasts using generalized additive models," Risk Anal., 2009, 29(10):1443-53.

Han et al., "Integrating Models and Data to Estimate the Structural Reliability of Utility Poles During Hurricanes," Risk Analysis, 2014, 34(6):1079-1094.

International Search Report and Written Opinion for Application No. PCT/2016/044893 dated Oct. 27, 2016 (10 pages).

Li et al., "A statistical model for risk management of electric outage forecasts," IBM Journal of Research and Development, 2010, 54(3): 8:1-8:11.

Liu et al., "Negative binomial regression of electric power outages in hurricanes," Journal of Infrastructure Systems, 2005, 11 (4):258-267.

(56) References Cited

OTHER PUBLICATIONS

Liu et al., "Statistical forecasting of electric power restoration times in hurricanes and ice storms," IEEE Trans Power Syst, 2007, 22(4):2270-2279.

Mensah et al., "Outage predictions of electric power systems under Hurricane winds by Bayesian networks," 2014 International Conference on Probabilistic Methods Applied to Power Systems (PMAPS), 2014, 6 pages.

Nateghi et al., "Comparison and validation of statistical methods or predicting power outage durations in the event of hurricanes," Risk analysis, 2011, 31(12):1897-1906.

Nateghi et al., "Forecasting hurricane-induced power outage durations," Natural Hazards, 2014, 74(3):1795-1811.

Nateghi et al., "Power outage estimation for tropical cyclones: improved accuracy with simpler models," Risk Anal., 2014, 34(6):1069-78.

Quiring et al., "Importance of soil and elevation characteristics for modeling hurricane-induced power outages," Natural hazards, 2011, 58(1):365-390.

Radmer et al., "Predicting vegetation-related failure rates for overhead distribution feeders," IEEE Trans Power Delivery, 2002, 17(4):1170-1175.

Reilly et al., "Bayesian Multiscale Modeling of Spatial Infrastructure Performance Predictions with an Application to Electric Power Outage Forecasting," Journal of Infrastructure Systems, 2014, 21(2):04014036, 11 pages.

Wanik et al., "Storm outage modeling for an electric distribution network in Northeastern USA," Natural Hazards, 2015, 79:1359-1384.

United States Patent Office Action for U.S. Appl. No. 16/683,701 dated Dec. 15, 2020 (12 pages).

United States Patent Office Action for U.S. Appl. No. 16/683,701 dated Jul. 7, 2021 (15 pages).

\* cited by examiner

| Variable | Abbv. | Description | Type | Units | BASE | GUST | WIND |
|---|---|---|---|---|---|---|---|
| Duration of wind at 10 meters above 5 m/s | wgt5 | Weather | Continuous | hr | x | | x |
| Duration of wind at 10 meters above 9 m/s | wgt9 | Weather | Continuous | hr | x | | x |
| Duration of wind at 10 meters above 13 m/s | wgt13 | Weather | Continuous | hr | x | | x |
| Duration of wind at 10 meters above 18 m/s | wgt18 | Weather | Continuous | hr | x | | x |
| Duration of gust wind above 18 m/s | ggt18 | Weather | Continuous | hr | x | x | |
| Duration of gust wind above 27 m/s | ggt27 | Weather | Continuous | hr | x | x | |
| Duration of gust wind above 36 m/s | ggt36 | Weather | Continuous | hr | x | x | |
| Duration of gust wind above 45 m/s | ggt45 | Weather | Continuous | hr | x | x | |
| Continuous duration of wind at 10 meters above 5 m/s | Cowgt5 | Weather | Continuous | hr | x | | x |
| Continuous duration of wind at 10 meters above 9 m/s | Cowgt9 | Weather | Continuous | hr | x | | x |
| Continuous duration of wind at 10 meters above 13 m/s | Cowgt13 | Weather | Continuous | hr | x | | x |
| Continuous duration of wind at 10 meters above 18 m/s | Cowgt18 | Weather | Continuous | hr | x | | x |
| Total accumulated precipitation | TotPrec | Weather | Continuous | mm | x | | x |
| Wind gust | Gust | Weather | Continuous | m/s | x | x | |
| Wind at 10 m height | Wind10m | Weather | Continuous | m/s | x | | x |
| Soil moisture | SoilMst | Weather | Continuous | mm/mm | x | | |
| Precipitation Rate | PreRate | Weather | Continuous | mm/hr | x | | |
| Snow Water Equivalent | SnoWtEq | Weather | Continuous | Kg/kg | x | | |
| Snow Ratio | SnowRatio | Weather | Continuous | Unitless | x | | |
| Freezing Rain Precipitation | Freezingrain precipitation | Weather | Continuous | Unitless | x | | |
| Ice Index | IceIndex | Weather | Continuous | unitless | x | | |

FIG. 3

| Variable | Abbreviation | Description | Type | Units |
|---|---|---|---|---|
| Sum of Assets | sumAssets | Infrastructure | Continuous | Count |
| Percent Developed | PercDeveloped | Land Cover | Continuous | % |
| Percent Coniferous | PercConif | Land Cover | Continuous | % |
| Percent Deciduous | PercDecid | Land Cover | Continuous | % |
| Leaf Area Index | LAI | Vegetation | Continuous | Index |
| Percent Enhanced Tree Trimming | PercETT | Vegetation | Continuous | % |
| Percentage Standard Maintenance Trimming | PercSMT | Vegetation | Continuous | % |

FIG. 4

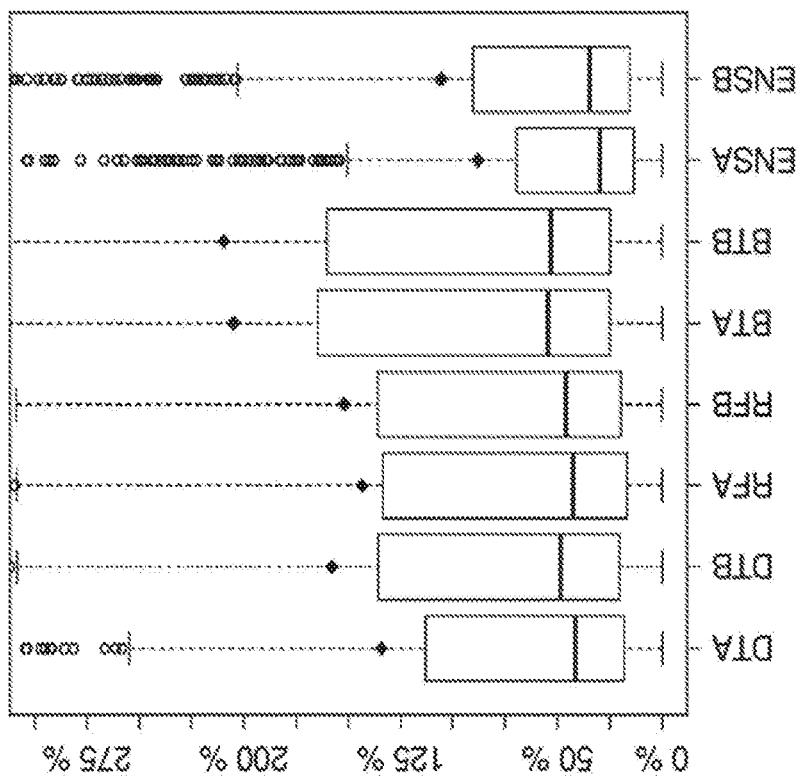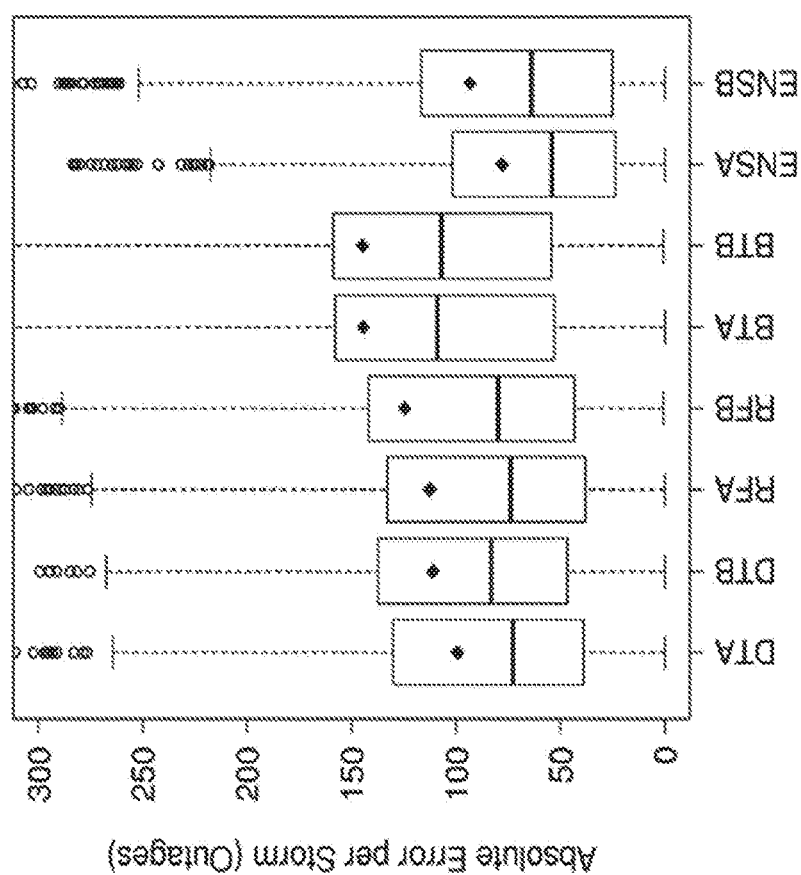
FIG. 13

Table 1: Explanatory data included in the models.

| Variable | Abbreviation | Description | Type | Units |
|---|---|---|---|---|
| Season | seasoncat | Weather | Continuous | - |
| Duration of wind at 10 meters above 9 m/s | wgt9 | Weather | Continuous | hr |
| Duration of wind at 10 meters above 13 m/s | wgt13 | Weather | Continuous | hr |
| Duration of wind at 10 meters above 18 m/s | wgt18 | Weather | Continuous | hr |
| Duration of wind gusts above 18 m/s | ggt18 | Weather | Continuous | hr |
| Duration of wind gusts above 27 m/s | ggt27 | Weather | Continuous | hr |
| Duration of wind gusts above 36 m/s | ggt36 | Weather | Continuous | hr |
| Duration of wind gusts above 45 m/s | ggt45 | Weather | Continuous | hr |
| Total accumulated precipitation* | TotPrec | Weather | Continuous | mm |
| Wind stress* | Wstress | Weather | Continuous | unitless |
| Wind gust* | Gust | Weather | Continuous | m/s |
| Wind at 10 m height* | Wind10m | Weather | Continuous | m/s |
| Snow water equivalent* | SnoWtEq | Weather | Continuous | kg/kg |
| Soil moisture* | SoilMst | Weather | Continuous | mm/mm |
| Precipitation Rate* | PreRate | Weather | Continuous | mm/hr |
| Sum of Assets | sumAssets | Infrastructure | Continuous | count |
| Percent Developed | PercDeveloped | Land Cover | Continuous | % |
| Percent Coniferous | PercConif | Land Cover | Continuous | % |
| Percent Deciduous | PercDecid | Land Cover | Continuous | % |

**\*variables have both mean and maximum values, there are 26 unique variables used in the models**

FIG. 20

Table 2: Statistical metrics from the WRF evaluation against the METAR station data.

|  |  | RMSE | MB | MAE | R | NSE |
|---|---|---|---|---|---|---|
| Irene | SWS[a] | 2.28 | 0.12 | 1.68 | 0.81 | 0.52 |
| (103/3001)[b] | Max SWS | 2.89 | 0.39 | 2.16 | 0.60 | 0.01 |
| Sandy | SWS | 2.57 | 0.53 | 1.85 | 0.73 | 0.36 |
| (102/4159) | Max SWS | 3.15 | 0.56 | 2.34 | 0.63 | 0.06 |
| Blizzard | SWS | 2.12 | -0.69 | 1.68 | 0.73 | 0.40 |
| (103/4495) | Max SWS | 3.00 | -1.78 | 2.54 | 0.74 | -0.11 |

[a] SWS=sustained wind speed, m/s

[b] Values in parenthesis: (No. of stations/No. of observation-model pairs for SWS)

FIG. 21

Table 3: Number of storms per season

| Type | Number of Storms | Percentage of Total |
|---|---|---|
| Warm weather | 38 | 43% |
| Cold weather | 28 | 28% |
| Transition | 24 | 27% |
| Hurricane | 2 | 2% |
| Total | 89 | 100% |

FIG. 22

Table 4: Land use changes for variables classification/aggregation methods.

| Land Cover Class | Grid Average | Directly on Circuit | 60m Buffer |
|---|---|---|---|
| Developed | 5.8% | 66.3% | 21.7% |
| Turf & Grass | 20.5% | 7.8% | 16.3% |
| Other Grasses | 4.7% | 0.8% | 1.9% |
| Agriculture | 12.0% | 2.7% | 8.4% |
| Deciduous Forest | 29.9% | 17.9% | 40.1% |
| Coniferous Forest | 10.9% | 2.2% | 5.6% |
| Water | 3.1% | 0.4% | 2.0% |
| Non-forested Wetland | 1.1% | 0.1% | 0.2% |
| Forested Wetland | 8.5% | 0.7% | 2.1% |
| Tidal Wetland | 0.4% | 0.1% | 0.3% |
| Barren Land | 2.3% | 0.5% | 1.0% |
| Utility ROWs | 0.8% | 0.5% | 0.3% |

FIG. 23

Table 5: Description of the evaluated models.

| Model | Description |
|---|---|
| Model $DT_A$ | Decision tree model with only weather data |
| Model $RF_A$ | Random forest model with only weather data |
| Model $BT_A$ | Boosted gradient tree model with only weather data |
| Model $ENS_A$ | Ensemble decision tree inputted by models DTA, RFA, and BTA |
| Model $DT_B$ | Decision tree model with weather, infrastructure and land cover data |
| Model $RF_B$ | Random forest model with weather, infrastructure and land cover data |
| Model $BT_B$ | Boosted gradient tree model with weather, infrastructure and land cover data |
| Model $ENS_B$ | Ensemble decision tree inputted by models DTB, RFB, and BTB |

FIG. 24

Table 6: Median absolute error (MdAE, outages) and median absolute percentage error (MdAPE, %) by season and model.

| Metric | Season | $DT_A$ | $RF_A$ | $BT_A$ | $DT_B$ | $RF_B$ | $BT_B$ | $ENS_A$ | $ENS_B$ |
|---|---|---|---|---|---|---|---|---|---|
| MdAE | Transition | 88 | 82 | 125 | 97 | 84 | 116 | 54 | 64 |
| MdAE | Cold | 52 | 59 | 103 | 67 | 66 | 105 | 32 | 39 |
| MdAE | Warm | 85 | 92 | 100 | 91 | 101 | 102 | 72 | 83 |
| MdAPE | Transition | 46.7% | 43.5% | 54.0% | 49.8% | 44.9% | 52.1% | 29.8% | 32.0% |
| MdAPE | Cold | 33.4% | 33.7% | 47.6% | 39.4% | 41.7% | 49.1% | 23.5% | 30.9% |
| MdAPE | Warm | 45.3% | 48.0% | 56.4% | 52.5% | 50.6% | 57.2% | 35.1% | 38.7% |

FIG. 25

Table I: Explanatory Variables Included in Modeling

| Variable | Description | Type | Unit |
|---|---|---|---|
| Wind10m | Sustained wind speed at 10 meters | Numerical | m/s |
| Gust | Wind speed of gust at 10 meters | Numerical | m/s |
| WStress | Wind stress | Numerical | - |
| wgt9 | Duration of 10m wind greater than 9m/s | Numerical | hour |
| ggt18 | Duration of gust greater than 18m/s | Numerical | hour |
| ggt27 | Duration of gust greater than 27m/s | Numerical | hour |
| PreRate | Precipitation rate | Numerical | mm/hr |
| TotPrec | Total accumulated precipitation | Numerical | mm |
| Temp | Temperature | Numerical | °C |
| SoilMst | Soil moisture | Numerical | kg/kg |
| SnoWtEq | Snow water equivalent (only for winter) | Numerical | $kg/m^2$ |
| sumAssets | Sum of assets (infrastructure) | Numerical | Count |
| PercDeveloped | Percentage of urban area | Numerical | % |
| PercConif | Percentage of coniferous trees | Numerical | % |
| PercDecid | Percentage of deciduous tress | Numerical | % |
| seasoncat | Leaves on (summer: Jun to Sep); Leaves off (winter: Dec to Mar); Transition (Oct, Nov, Apr and May). | Categorical | - |

FIG. 26

Table II: Comparison of QRF, BART and Mean Model with Hurricane Validation Data

| Hurricane (Outages) | Model | Predicted | Pred. Interval | MAE (By Town) | RMSE (By Town) |
|---|---|---|---|---|---|
| Irene (4890) | QRF | 4542 | (4311, 4666) | 8.86 | 15.70 |
| | BART | 4795 | (4688, 4898) | 6.12 | 9.43 |
| | MEAN | 5200 | - | 23.95 | 35.25 |
| Sandy (5052) | QRF | 5060 | (4674, 5110) | 6.91 | 11.02 |
| | BART | 5171 | (5039, 5302) | 5.50 | 8.02 |
| | MEAN | 5121 | - | 28.89 | 52.03 |

FIG. 27

Uncertainty Ratio (UR) for Each Storm in Different Resolutions: (a) Grid Cell, (b) Town, (c) Division, (d) Territory.

Statistical metrics used in the model evaluation analysis are presented below. The modeled wind speed is represented by M, the observed wind speed by O and N is the total number of data points used in the calculations.

- Root Mean Square Error (RMSE):

$$RMSE = \sqrt{\frac{1}{N}\sum_N (M-O)^2}$$

- Mean Bias (MB):

$$MB = \frac{1}{N}\sum_N (M-O)$$

- Mean Absolute Error (MAE):

$$MAE = \frac{1}{N}\sum_N |M-O|$$

- Correlation Coefficient (R):

$$R = \frac{\sum(M-\bar{M})(O-\bar{O})}{\sqrt{\sum(M-\bar{M})^2 \sum(O-\bar{O})^2}}$$

- Nash-Sutcliffe efficiency (NSE):

$$NSE = 1 - \frac{\sum(O-M)^2}{\sum(O-\bar{O})^2}$$

- Percentage within a factor of 2 or 1.5 (FAC2, FAC1.5):

$$FAC2 = 0.5 \leq \frac{M}{O} \leq 2,$$

$$FAC1.5 = 0.5 \leq \frac{M}{O} \leq 1.5$$

FIG. 40

SYSTEMS AND METHODS FOR OUTAGE PREDICTION

CROSS-REFERENCE TO RELATED APPLICATIONS

This application is a non-provisional of and claims the benefit of U.S. Provisional Application No. 62/363,156 filed on Jul. 15, 2016, the contents of which are incorporated herein by reference.

BACKGROUND OF THE INVENTION

Storms can affect hundreds of thousands of utility customers and each of them can cause hundreds of millions of dollars of damage to property. Severe weather is among the major causes of damage to electric distribution networks and resultant power outages in the United States. An outage is defined as a location where a utility line crew must be sent to manually intervene and fix the overhead electric distribution network. Typically, for managing the risk of a weather hazard, a utility's engineers and emergency preparedness staff would receive multiple sources of information using time series of weather forecasts, as well as maps and tables of predicted outages—and would use this information to make decisions. This includes deciding in advance on the number of repair crews, including out-of-state crews, needed and pre-staging crews and equipment. Being better prepared allows the utility to restore the power faster and cost efficiently, and boosts the ratepayer's confidence knowing that their utility is basing their storm preparedness decisions on quantitative data rather than through guesses.

SUMMARY OF THE INVENTION

One aspect of the present disclosure provides a method for outage prediction for electrical distribution utilities using high-resolution weather forecasts, coupled with geographic data (e.g., land use and vegetation around overhead-lines) and utility infrastructure data (e.g., transformer fuses, etc.) to predict distributed outage occurrences (e.g., number of outages over a 2-km gridded map) in advance of a storm. One of the outage prediction models provided herein applies to storms of most weather types (e.g., thunderstorms, blizzards, freezing rain, tropical storms) and magnitudes (low severity to high severity). By using outage prediction models described herein, utility emergency preparedness efforts before a storm event can be supported, which will aid the pre-storm deployment of crews and resources (e.g., poles, transformers, and conductors), thereby decreasing restoration times and increasing reliability to customers.

Another aspect of the present disclosure provides an outage prediction system comprising an electronic processor configured to combine high-resolution weather forecasts with geographic (e.g., land use and vegetation around overhead-lines) and utility infrastructure data (e.g., transformer fuses, etc.) to predict distributed outage occurrences (number of outages over a 2-km gridded map) in advance of a storm.

In one embodiment, the invention provides an outage prediction system comprising an electronic processor configured to receive, from a database, dynamic weather data and geographic data from data storage, combine the dynamic weather data with the geographic information to generate a file identifying parameters of a forthcoming weather event, define a plurality of model forcings, each model forcing including a predetermined set of weather variables, define a plurality of machine learning models for each model forcing, each machine learning model calibrated with a dataset of variables of past weather events, apply the plurality of model forcings and the plurality of machine learning models to the identified parameters in the file, and generate a visual output value for each model forcing and each machine learning model, each output value predicting the likelihood of a utility outage in a particular location.

In another embodiment, the invention provides a method of predicting a utility outage. The method comprises retrieving, with an electronic processor, dynamic weather data from a database, retrieving, with an electronic processor, geographic information data from a database, the geographic information data including data related to location of utility overhead lines in a predefined region, combining, with an electronic processor, the dynamic weather data with the geographic information data to generate a file identifying parameters of a forthcoming weather event, applying a plurality of model forcings and a plurality of machine learning models to the file, generating a plurality of visual output values based on the application of the model forcings and the machine learning models to the file, each of the output values providing a prediction of an outage of one or more of the overhead lines.

In a further embodiment, the invention provides a method of predicting a utility outage. The method comprises retrieving, with an electronic processor, dynamic weather data, retrieving, with an electronic processor, geographic information data from a geographic information system, the geographic information data including data related to location of utility overhead lines in a predefined region, combining, with an electronic processor, the dynamic weather data with the geographic information data to generate a file identifying parameters of a forthcoming weather event, inputting, via a user interface, a season in which the forthcoming weather event is occurring, retrieving, with an electronic processor, leaf condition data associated with the season and precipitation data for the forthcoming weather event, defining a plurality of model forcings relevant to the forthcoming weather event, each model forcing including a predetermined set of weather variables related to precipitation and temperature, applying a plurality of machine learning models for each of the model forcings, and generating a plurality of visual output values based on the application of the machine learning models, each of the output values providing a prediction of an electrical outage at a particular location.

The present disclosure provides in part a method of operation of the Outage Prediction Model (OPM) wherein weather data is combined with a geographical information system (GIS) look-up table to create a clean parameter file, which is then inputted into the outage prediction system. The outage prediction system employs various sets of machine learning (ML) models such as a Decision Tree (DT) model, a Random Forest (RF) model, a Boosted Tree (BT) model, an Ensemble Decision Tree (ENS) model, and a Bayesian Additive Regression Tree (BART) model. These five machine learning models are trained on an historic calibration dataset of more than 150 storms that contains information on weather, infrastructure, and other GIS variables (e.g., land use around overhead lines). Precipitation and temperature data from the clean parameter file is analyzed regionally, and relevant data from the historic calibration dataset is selected for calibration of the machine learning models. A principal components analysis (PCA) is applied before calibration to deal with related variables and reduce the dimensionality of the data. The PCA is then applied to the clean parameter file.

The five ML models may be inputted with different combinations of weather variables. In one embodiment of the outage prediction system provided herein, three combinations of variables (BASE, GUST, WIND) are defined, which are used to force each of the five ML models to compute 15 predictions for an upcoming storm from which a utility can make decisions. Not all model/variable combinations may be appropriate for each storm. In some cases, precipitation has been shown to adversely inflate predictions. Given that predictions are continuous because regression is performed, the predictions are rounded to the nearest integer. The rounded predictions are summed for each model/variable combination and maps of predicted outages per town are created by joining a text file of predictions to a GIS shape file. Time series plots of the wind at 10 m, accumulated precipitation and wind gust are generated. After the storm has cleared, actual outage data from an FTP is received by the system from the utility, and a separate updating code processes the actual outage data on a 2-km grid, joins the aggregated outage data to weather analysis forecast data and GIS data, and is subsequently added to the historic calibration dataset. The outage prediction model provided herein is adaptive as new data is added and new patterns are found or reinforced, resulting in an improved outage prediction model.

At least one benefit to the approach provided herein is that no assumptions are made about the processes that cause an outage. Enormous amounts of data are gathered that describe the process, and the machine learning algorithms described above find the underlying relationship between outages per grid cell and the geographic, environmental and infrastructure data. For example, in some embodiments, the outage prediction models provided herein were calibrated based on storms from 2005-2013, but the system is adaptive in that recent storms (2013-2016) have been simulated and added to the calibration database. As storms arise, the data is added to enrich the database. This allows the outage prediction model to have a dynamic, updated picture of what occurred on the grid during these storms, which can be applied to future storms that will impact the utility distribution grid. The model also accounts for changes in the system such as enhancements of the infrastructure and vegetation management activities.

The illustrative non-limiting example system, method, and program product disclosed herein has the technical effect of providing a computer implemented tool for automatically acquiring information concerning operational parameters/events that occur throughout an electrical power distribution grid and relating such data to geographically and temporally relevant weather phenomenon events, and for displaying the acquired and related information in a user-controllable, practical and useful manner. In some embodiments, the contemplated implementation relates the variation of operational parameters such as outages to historical/forecast weather data at different points in time. For example, data displayed can include static snapshots of maps of predicted outages at regular time intervals. In other embodiments, the system may display a map that overlays one or more of the following types of data or graphical information: weather radar information, satellite information, weather related or geographical related measurement data, forecast maps, geographical network schematics, a graphical representation of events and their location, and a graphical representation of operation parameters at various locations on the electric distribution network.

The illustrative non-limiting example system, method, and program product described herein provides processing of enormous amounts of data with applied machine learning models to find a relationship between actual outages per grid cell and geographic environmental and infrastructure data.

BRIEF DESCRIPTION OF THE DRAWINGS

The accompanying figures together with the detailed description below, are incorporated in and form part of the specification, and serve to further illustrate embodiments described herein, including various principles and advantages of those embodiments.

FIG. 3 is a table showing a listing of weather input variables, in accordance to some embodiments of the invention.

FIG. 4 is a table showing the list of fixed values including GIS related data related to land use, infrastructure, trimming and leaf area index (LAI).

FIG. 13 illustrates boxplots of absolute error (left) and percentage error per storm by model for all ten holdouts. Diamonds represent mean values (MAE and MAPE) and bold horizontal lines indicate median values (MdAE or MdAPE) per model.

FIG. 20 is a table showing explanatory data included in the prediction models in accordance with some embodiments of the invention.

FIG. 21 is a table showing statistical metrics from the WRF evaluation against the METAR station data.

FIG. 22 is a table showing a number of storms per season.

FIG. 23 is a table showing land use changes for variables classification/aggregation methods.

FIG. 24 is a table showing a listing of the description of various evaluated models.

FIG. 25 is a table showing Median absolute error (MdAE, outages) and median absolute percentage error (MdAPE, %) by season and model.

FIG. 26 is a table showing explanatory variables included in the modeling

FIG. 27 is a table showing a comparison of QRF, BART and Mean Model with hurricane validation data.

FIG. 40 shows a listing of the statistical metrics, including name conventions and mathematical formulas provided in this disclosure.

DETAILED DESCRIPTION

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element. Unless otherwise defined, all technical terms used herein have the same meaning as commonly understood by one of ordinary skill in the art to which this disclosure belongs. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be utilized to implement the embodiments described herein. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement embodiments of the invention. For example, "mobile device" and "computing device" as used in the specification may include one or more electronic processors, one or more memory modules including non-transitory computer-readable medium, one or more input/output interfaces, and various connections (e.g., a system bus) connecting the components.

Figure 1:
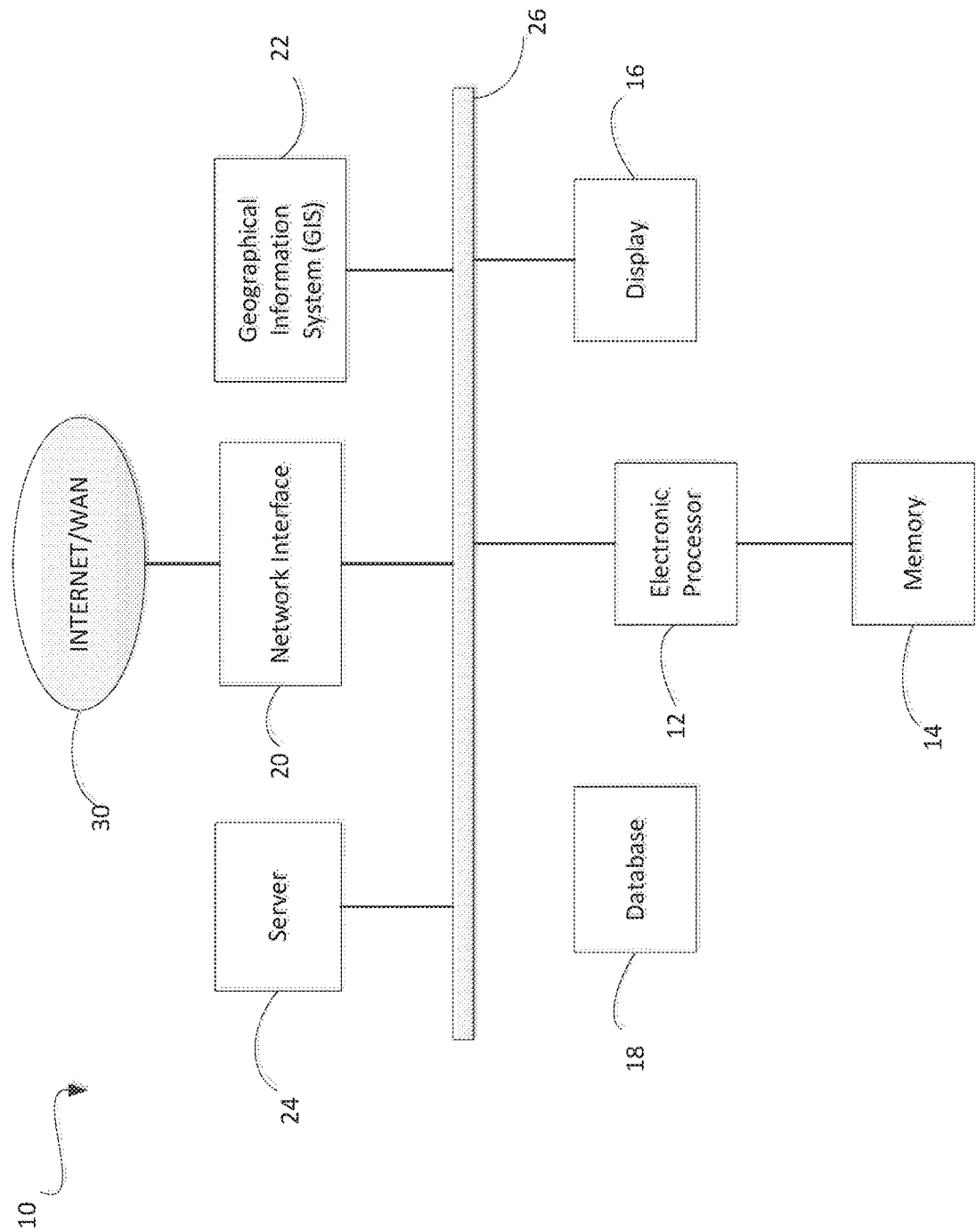
FIG. 1 schematically illustrates a system for outage prediction according to some embodiments of the invention.

As noted above, embodiments of the invention provide an outage prediction to a utility. For example, FIG. 1 schematically illustrates an outage prediction system 10 according to some embodiments of the invention. The system 10 includes an electronic processor 12 (e.g., a microprocessor, application-specific integrated circuit ("ASIC"), or other suitable electronic device), a memory 14, a display device 16, a database 18, a network interface 20 and a geographical information system 22 that is coupled to an input/output (I/O) interface 24. I/O interface 24 in turn has connectivity to the internet or a wide area network (WAN) 30 to access alternate databases and servers to access computer instructions and data using various different types of network protocols. An example of such a protocol is the file transfer protocol (FTP). In some embodiments, the system 10 may include additional, fewer, or different components. For example, in some embodiments, the system 10 includes multiple electronic processors, memories, display devices, or combinations thereof. Also, in some embodiments, the system 10 as described in the present application may perform additional functionality other than the outage prediction functionality described herein.

The memory 14 includes non-transitory, computer-readable memory, including, for example, read only memory ("ROM"), random access memory ("RAM"), or combinations thereof. The memory 14 stores program instructions (e.g., one or more software applications) and weather data. The electronic processor 12 is configured to retrieve instructions from the memory 14 and execute, among other things, the instructions to perform the outage prediction, including the methods described herein. The display device 16 is an output device that presents visual information and may include a light-emitting diode ("LED") display, a liquid crystal display, a touchscreen, and the like. In some embodiments, the electronic processor 12, memory 14, display device 16 and database 18 are included in a single computing device (e.g., within a common housing), such as a laptop computer, tablet computer, desktop computer, smart telephone, smart television, smart watch or other wearable, or another suitable computing device. In these embodiments, the electronic processor 12 executes a software application (e.g., a "mobile application" or "app") that is locally stored in the memory 14 of the computing device to perform the methods described herein. For example, the electronic processor 12 may execute the software application to access and process data (e.g., weather data) stored in the memory 14. Alternatively or in addition, the electronic processor 12 may execute the software application to access data (e.g., weather data) stored external to the computing device (e.g., on a database 18 accessible through an I/O interface 22 over a communication network). The electronic processor 12 may output the results of processing the accessed data (i.e., weather data) to the display device 16 included in the computing device.

In other embodiments, the electronic processor 12, the memory 14, and database 18 or a combination thereof may be included in one or more separate devices. In this configuration, the electronic processor 12 may be included in a server or another device that communicates with the server over a wired or wireless network or connection. For example, the electronic processor 12 included in the server may execute a software application that is locally stored on the server to access and process data as described herein. In particular, the electronic processor 12 may execute the software application on the server, which a user may access through a software application, such as a browser application or a mobile application, executed by a computing device of the user. Accordingly, functionality provided by the system 10 as described below may be distributed between a computing device of a user and a server remote from the computing device. For example, a user may execute a software application (e.g., a mobile app) on his or her personal computing device to communicate with another software application executed by an electronic processor included in a remote server.

Figure 2:
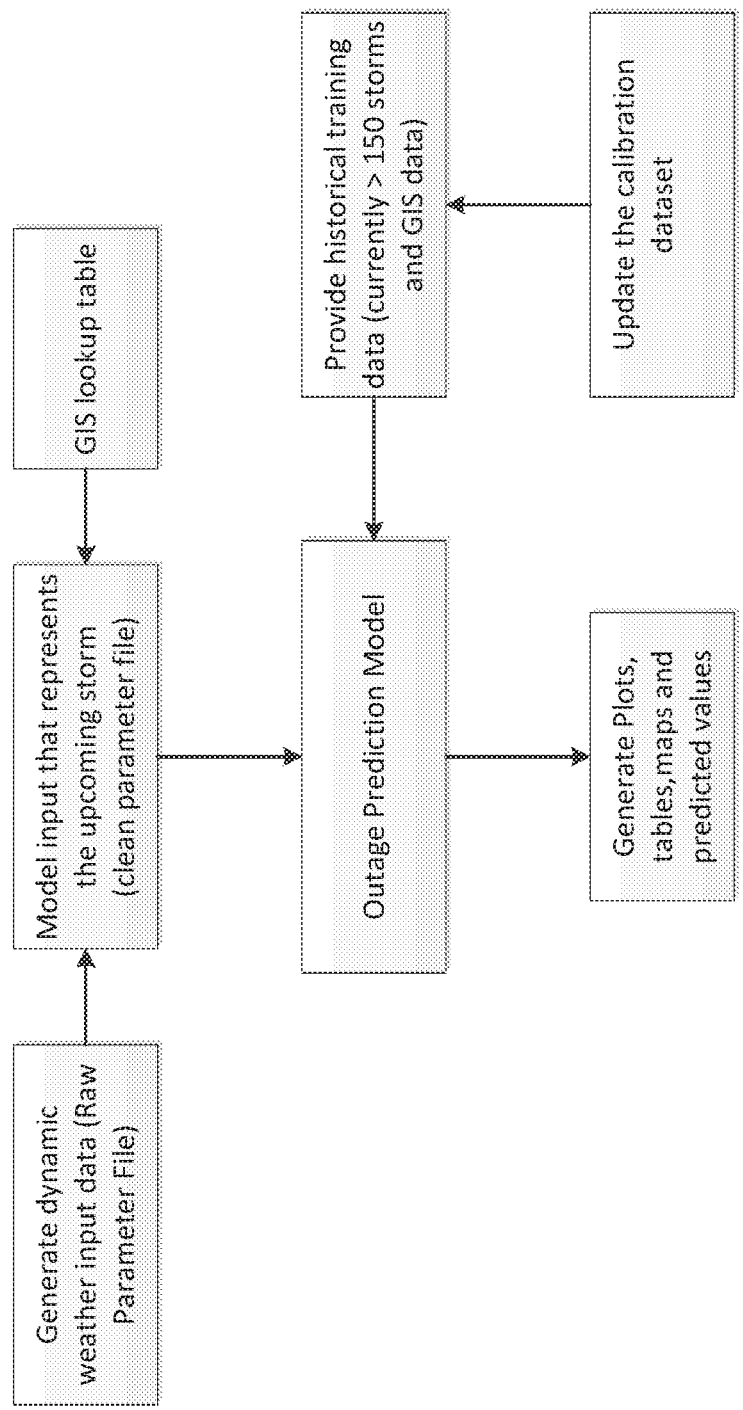
FIG. 2 is a flow chart showing aspects of a dynamic outage prediction model, in accordance with some embodiments of the invention.

FIG. 2 is a flow chart showing aspects related to a outage prediction model that predicts outages, in accordance with some embodiments. Initially, dynamic weather input data is generated within a raw parameter file. The raw parameter file includes more than 18,000 rows having all centroids within a 2 km grid. The flowchart in FIG. 2 shows how the data is prepared for modeling, how the models are fit, how the output is generated and displayed, and as to how the calibration dataset is updated (contingent upon receiving actual outage data and a weather forecast analysis simulation). In some embodiments, the outage prediction model shown in FIG. 2 provides for three model forcings along with five machine learning models. In an example, historical training data related to more than 150 storms and associated GIS data is provided to the dynamic prediction model.

FIG. 3 is a table showing a listing of weather input variable, in accordance to some embodiments. Various input variables for each calibration (such as base, wind only and gust only) that is fit are provided. The calculation of precipitation indices are provided by the following relationships using some of the variables shown in FIG. 3:

$$Snowratio = MAXSnoWtEq/TotPrec$$

$$Freezingrain\_preciptation = SUM\{liquid\ precipitation\ if\ Temp < 273.15\ K\}$$

$$Ice\_index = freezingrain\_precipitaton/TotPrec$$

FIG. 4 is a table showing the list of fixed variables including geographical information system (GIS) related data related to land use, infrastructure, trimming and leaf area index (LAI).

Figure 5:
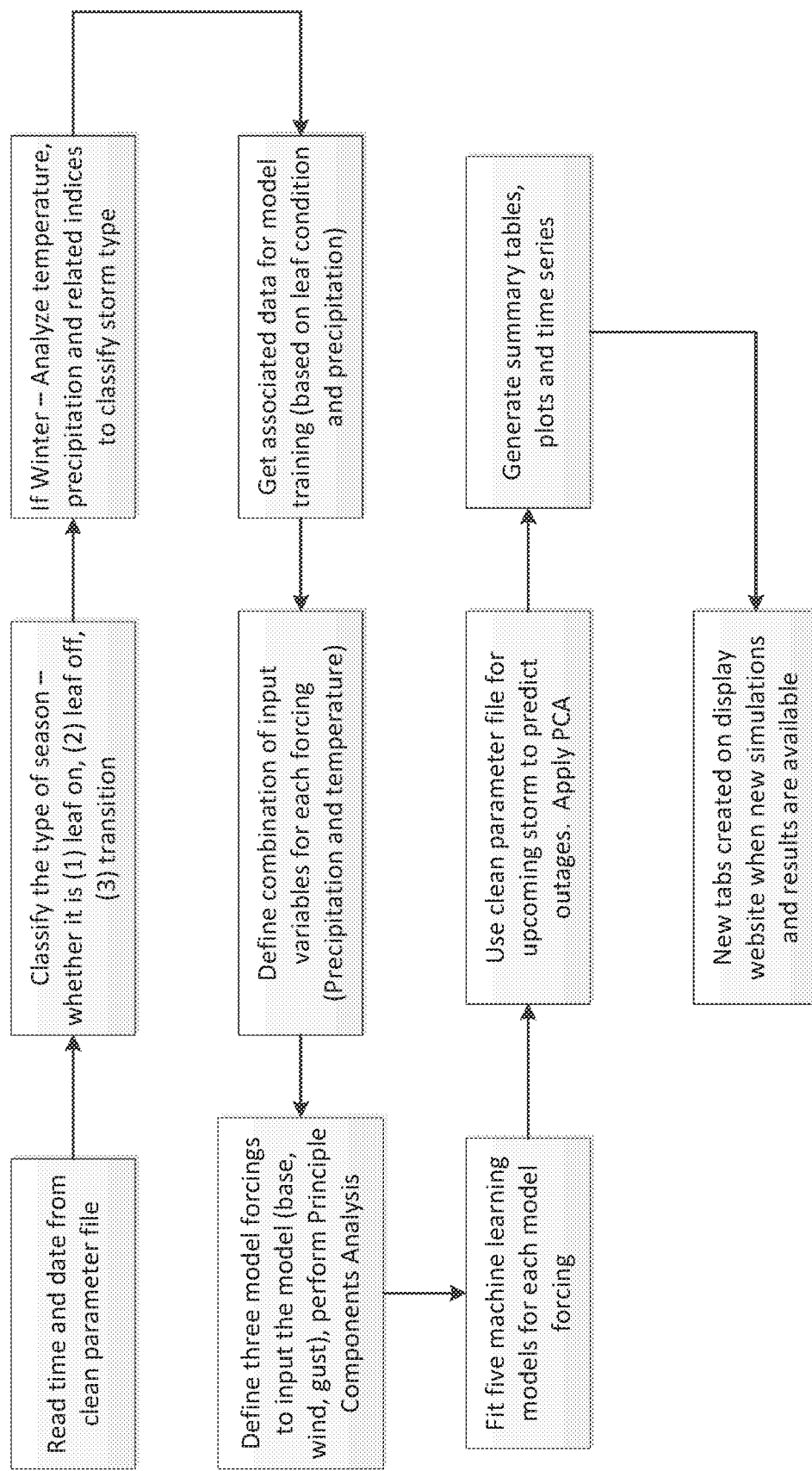
FIG. 5 is a flow chart showing various steps performed by the dynamic outage prediction model, in accordance to some embodiments of the invention.

FIG. 5 is a flow chart showing various steps carried out by the dynamic prediction model of FIG. 2, in accordance with some embodiments. In operation, the dynamic prediction model first reads the time and date from a clean parameter file. Following which, the dynamic prediction model classifies the type of season based on whether it is (i) a leaf-on season (June-September), (ii) a leaf-off season (December-March), and (3) a transition season (April, May, October, and November). If it is winter then the temperature, precipitation and related indices are analyzed to classify the type of storm. In some embodiments, the dynamic prediction model receives associated data for model training (based on leaf condition and precipitation). The next step includes defining a combination of input variables for each forcing (such as precipitation and temperature). This is followed by defining three model forcings to input into the model (e.g., base, wind, gust) and performing principle components analysis (PCA). In one embodiment, five machine learning models are fit for each model forcing. A clean parameter file is used for upcoming storm to predict outages and apply principle components analysis (PCA). Following which, summary tables, plots, and time series are generated and a new tab is created on a display website when new simulations and results are available.

Figure 6:
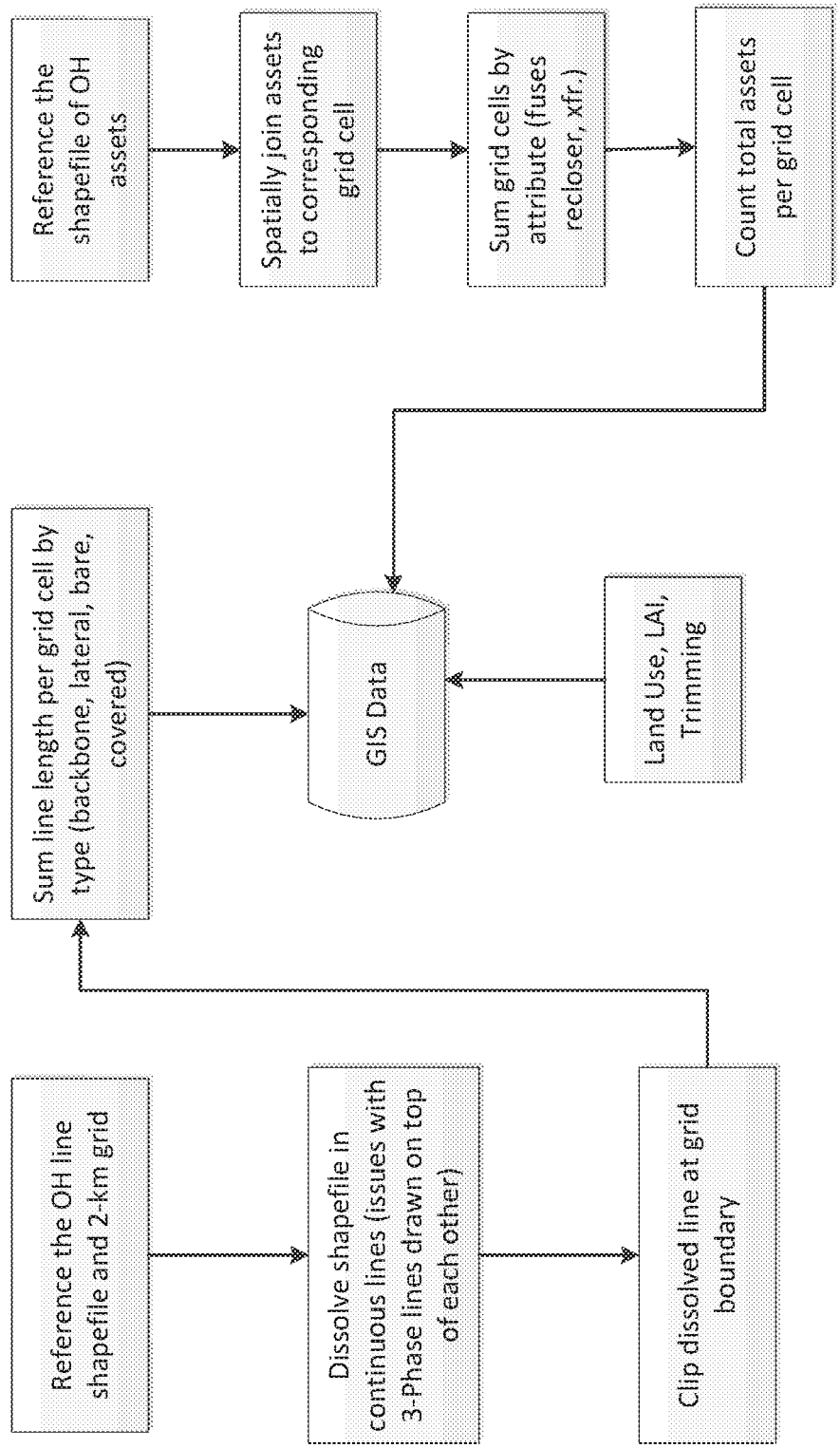
FIG. 6 is a flow chart showing various steps in geospatial data processing used for outage prediction in accordance to some embodiments of the invention.

FIG. 6 is a flow chart showing various steps in geospatial data processing used for outage prediction in accordance with some embodiments. The flow chart details how overhead lines and isolating devices (assets) are processed on the 2 km grid. The geographic information data (GIS data) utilized in the outage prediction system 10 is generated from a plurality of sources. A first source of the geographic data is related to land use, tree trimming, and leaf area index. This first source of geographic data is generated using other processing methods as shown in FIGS. 7 and 8. A second source of the geographic data is related to the overhead utility lines. The electronic processor 12 receives or accesses a database to retrieve an overhead line shapefile and a 2 km grid relevant to a particular location. The location may be, for example, a state, a county, a city, a town, or other well-defined area. The overhead line shapefile may be generated or maintained by the electrical utility. The electronic processor 12 operates to dissolve the overhead line shapefile into contiguous lines (issues with 3-phase lines drawn on top of each other). The dissolved lines are clipped at each 2 km grid boundary. The electronic processor 12 then operates to sum the line length per grid cell by type (e.g., backbone, lateral, bare, covered). A third source of the geographic data is related to the overhead assets (e.g., isolating devices). The electronic processor 12 receives or accesses a database to retrieve an overhead line shapefile of the assets for a particular location. The particular location would be the same as the location identified for the second source of geographic data. The electronic processor 12 then spatially joins the assets to a corresponding grid cell and the grid cells are summed by attribute (e.g., fuses, reclosers, transformers, and the like). The electronic processor 12 then counts the total number of assets per grid cell.

Figure 7A:
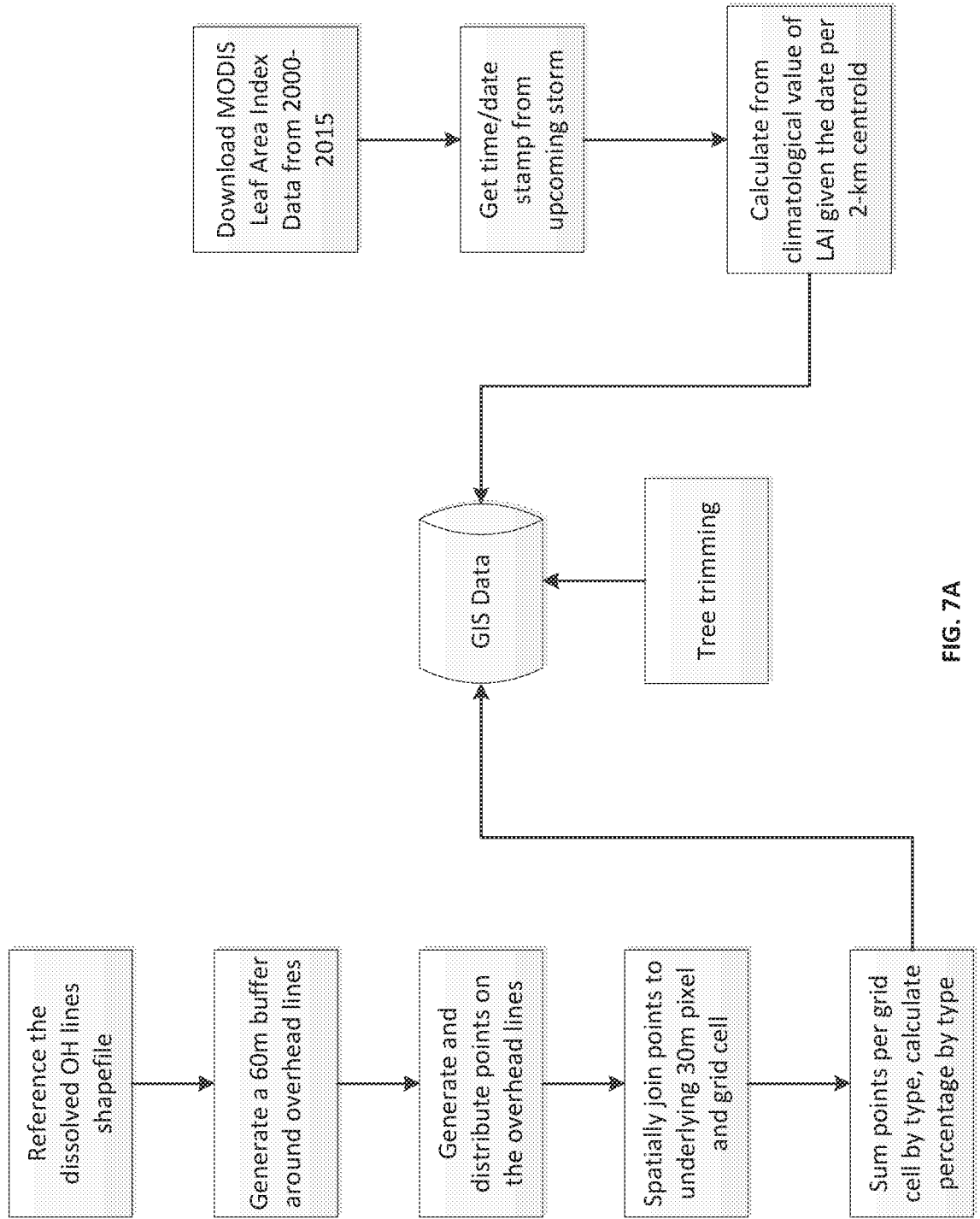
FIG. 7A is a flow chart showing various steps in geospatial data processing and tree trimming in accordance to some embodiments of the invention.
Figure 8:
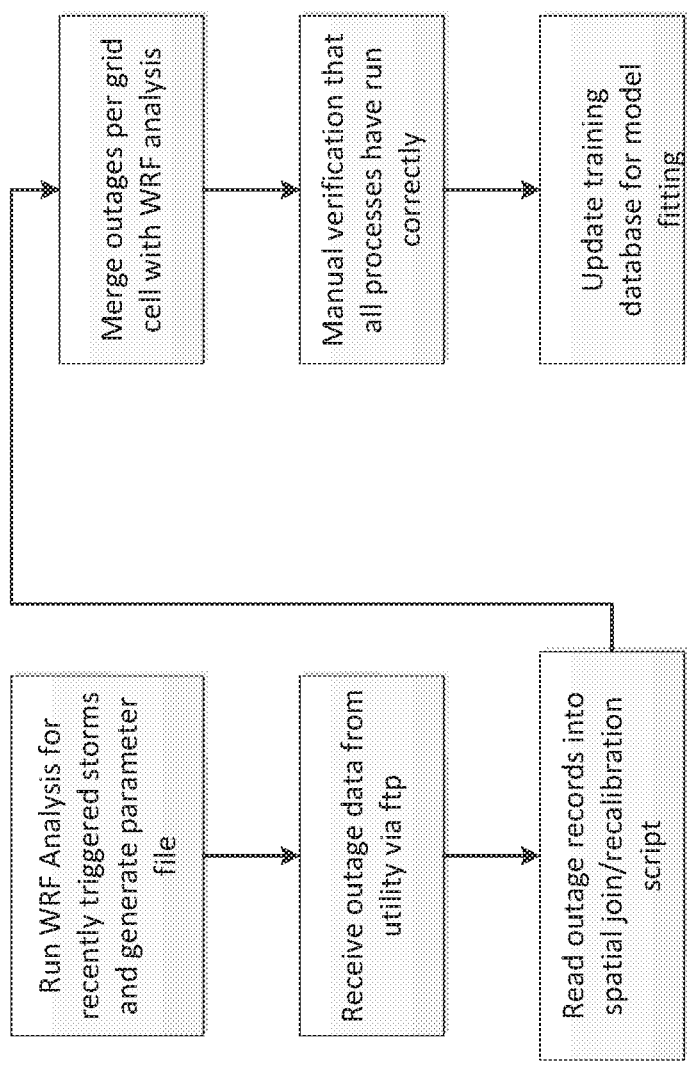
FIG. 8 is a flow chart showing various steps in updating the calibration dataset in accordance to some embodiments of the invention.

FIG. 7A is a flow chart showing various steps in geospatial data processing and tree trimming in accordance with some embodiments. The flowchart shows in detail as to how land use is calculated around overhead lines and leaf area index (LAI) are processed on the 2 km grid. A fourth source of the geographic data is related to land use. The electronic processor 12 receives or accesses a database to retrieve the dissolved overhead line shapefile (referenced above) and a 2 km grid relevant to a particular location. The electronic processor 12 generates a 60 m buffer around the overhead lines. The electronic processor 12 then generates and distributes points on the overhead lines. Next, the electronic processor 12 spatially joins the points to an underlying 30 m pixel and grid cell, and then sums the points per grid cell by type (e.g., develop, deciduous, etc.) and calculates percentage by type. A fifth source of the geographic data is related to leaf area index. The electronic processor 12 receives or accesses a database to retries the MODIS Leaf Area Index Data from 2000-2015. It is noted that this data may be updated and that the current updated data would be used by the system 10. The electronic processor 12 then obtains a time/data stamp from the forthcoming storm and calculates a climatological value of leaf area index give the data per the 2 km centroid.

Figure 7B:
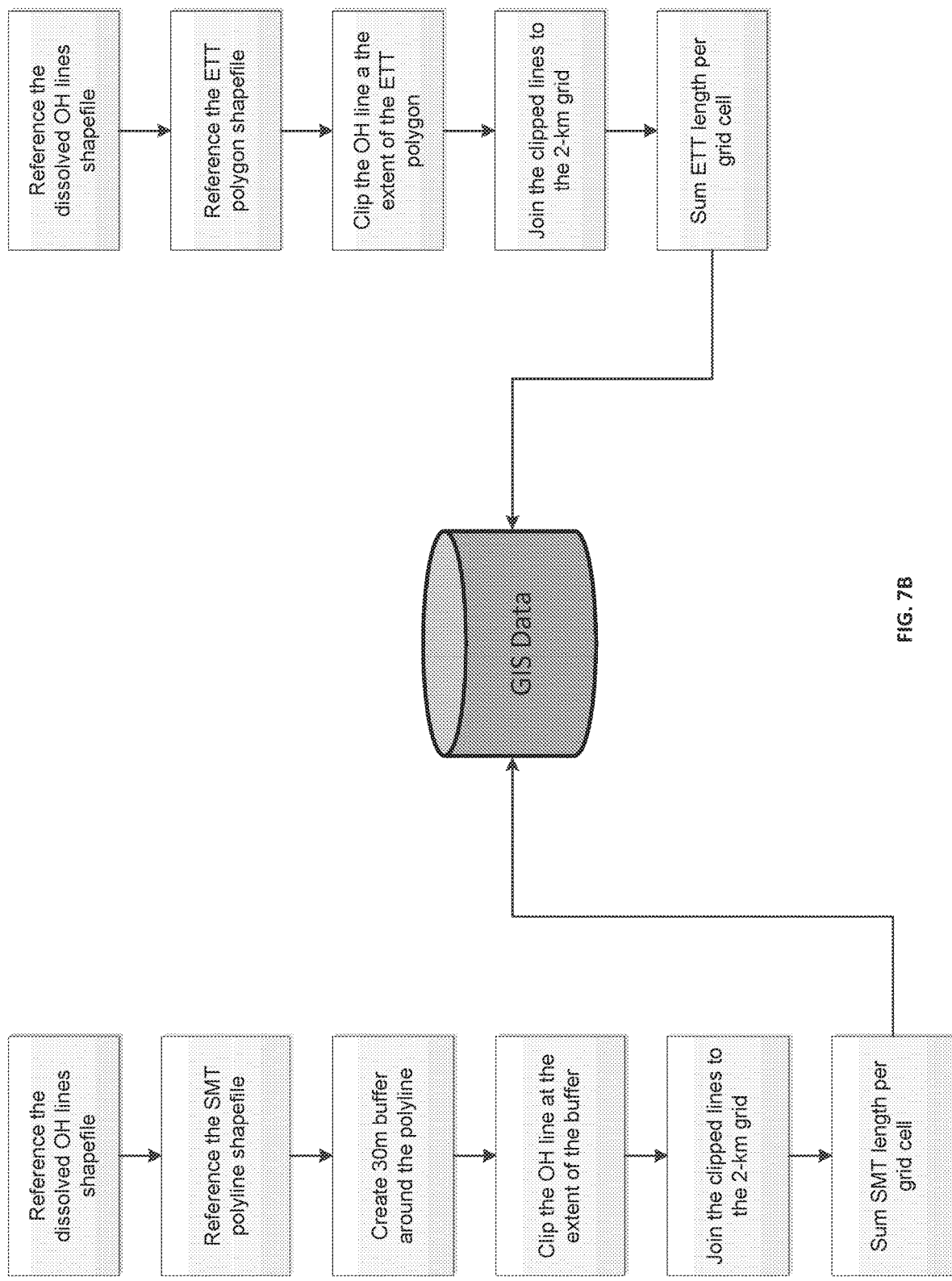
FIG. 7B is a flow chart showing various steps in geospatial data processing for tree trimming in accordance to some embodiments of the invention.

FIG. 7B is a flow chart detailing how different tree trimming data (standard maintenance trimming, SMT) and enhanced tree trimming (ETT) are processed on the 2-km grid. A sixth source of the geographic data is related to standard maintenance trimming. The electronic processor 12 receives or accesses a database to retrieve the dissolved overhead line shapefile (referenced above) and a 2 km grid relevant to a particular location. The electronic processor 12 references a SMT polyline shapefile and creates a 30 m buffer around the polyline. Next, the electronic processor 12 clips the overhead line at the extent of the buffer and joins the clipped lines to the 2-km grid. The electronic processor 12 sums the length per grid cell. A seventh source of the geographic data is related to enhanced tree trimming. The electronic processor 12 receives or accesses a database to retrieve the dissolved overhead line shapefile (referenced above) and a 2 km grid relevant to a particular location. The electronic processor 12 references an ETT polygon shapefile and clips the overhead line at the extent of the ETT polygon. The electronic processor 12 then joins the clipped lines to the 2-km grid, and sums the length per grid cell.

The data from each of the sources is stored in a database (e.g., GIS database). It is noted that additional sources than those described above may be utilized as geographic data. It is also noted that not all of the sources identified above are required to perform the methods described herein.

FIG. 8 is a flow chart showing various steps in updating the calibration dataset in accordance with some embodiments. The calibration dataset is updated by the electronic processor 12 running a WRF analysis for recently triggered storms and generating a parameter file. The electronic processor 12 receives or accesses a database to retrieve utility outage data from a particular utility via a network (e.g., FTP connection). The electronic processor 12 then reads outage records into a spatial join/recalibration script and merges the outages per grid cell with the WRF analysis. Next, the electronic processor 12 or user verifies that all processes have run correctly and the training database for model fitting is updated.

Prediction models support utility emergency preparedness efforts before a storm event. Such a model can aid the pre-storm deployment of crews and resources (i.e., poles, transformers, and conductors), thereby decreasing restoration times and increasing reliability to customers. Discussed below are systems and methods of predicting outage locations ("outages") from severe weather. In one example, provided herein, the systems and methods are used for predicting severe weather in Connecticut.

Storm Outage Modeling for an Electric Distribution Network in Northeastern US

Section 1 Introduction

Outages may be defined as locations that require a manual intervention to restore power, which is separate from modeling the number of customers affected ("customer outages"). Storm-related impacts to the electric distribution network includes: (i) predicting damages to overhead lines (such as broken poles) (described by Guikema et al. in 2010 entitled "Prestorm Estimation of Hurricane Damage to Electric Power Distribution Systems," Risk Anal. doi: 10.1111/j.1539-6924.2010.01510.x, incorporated herein by reference), (ii) predicting the number of outages that need to be repaired (described by Guikema et al. in 2014 entitled "Storm power outage prediction modeling," Saf, Reliab Risk Anal: Beyond Horiz—Proc Eur Saf Reliab Conf, ESREL, incorporated herein by reference), (described by Mensah and Duenas-Osorio in 2014 entitled "Outage predictions of electric power systems under Hurricane winds by Bayesian networks," Int Conf Probab Methods Appl Power Syst, PMAPS—Conf Proc. doi 10.1109/PMAPS.2014.6960677, incorporated herein by reference), (iii) predicting the associated customers affected by power outages (described by Guikema et al. in 2008 entitled "Estimating power outages during hurricanes using semi-parametric statistical models," Proc Struct Congr—Struct Congr: Crossing Borders, incorporated herein by reference), (described by Guikema et al. in 2014 entitled "Predicting Hurricane Power Outages to Support Storm Response Planning," Access, IEEE. doi: 10.1109/ACCESS.2014.2365716, incorporated herein by reference), (described by Han et al. in 2009 entitled "Estimating the spatial distribution of power outages during hurricanes in the Gulf coast region," Reliab Eng Syst Saf. doi: 10.1016/j.ress.2008.02.018, incorporated herein by reference), and (iv) modeling the length of outage durations during major storm events (described by Liu et al. in 2007 entitled "Statistical forecasting of electric power restoration times in hurricanes and ice storms," IEEE Trans Power Syst. doi: 10.1109/TPWRS.2007.907587, incorporated herein by reference), (described by Nateghi et al. in 2011 entitled "Comparison and Validation of Statistical Methods for Predicting Power Outage Durations in the Event of Hurricanes," Risk Anal. doi: 10.1111/j.1539-6924.2011.01618.x, incorporated herein by reference), (described by Nateghi et al. in 2014 entitled "Forecasting hurricane-induced power outage durations. Nat Hazards, incorporated herein by reference).

While each of the above may be distinct research topics, the underlying fundamentals of each problem are similar; critical infrastructure and environmental data are related to actual utility data (i.e., outages, customers or damages), which tend to be zero-inflated data with nonlinear response thresholds (described by Guikema and Coffelt in 2009 entitled "Practical considerations in statistical modeling of count data for infrastructure systems," J Infrastruct Syst. doi: 10.1061/(ASCE)1076-0342(2009)15:3(172), incorporated herein by reference). In addition, modeling utility-related problems can be complex due to different interactions involved (e.g. tree conditions, soil saturation, infrastructure age). To address this complexity, an assortment of methods have been used herein for utility-related problems, including: (i) generalized linear models (GLMs) (described by Cerruti and Decker in 2012 entitled "A statistical forecast model of weather-related damage to a major electric utility," Journal of Applied Meteorology and Climatology 51:191-204, incorporated herein by reference), (described by Hongfei Li et al. in 2010 entitled "A statistical model for risk management of electric outage forecasts," IBM Journal of Research and Development. doi: 10.1147/JRD.2010.2044836, incorporated herein by reference), (ii) spatial and non-spatial Generalized Linear Mixed Models (GLMMs) (described by Guikema and Davidson in 2006 entitled "Modeling critical infrastructure reliability with generalized linear (mixed) models," Proc Int Conf Probabilistic Saf Assess Manage, PSAM, incorporated herein by reference), and (described by Liu et al. in 2008 entitled "Spatial generalized linear mixed models of electric power outages due to hurricanes and ice storms," Reliab Eng Syst Saf. Doi: 10.1016/j.ress.2007.03.038, incorporated herein by reference), (iii) generalized additive models (GAMs) (described by Han S-, Guikema et al. in 2009 entitled "Improving the predictive accuracy of hurricane power outage forecasts using generalized additive models," Risk Analysis, incorporated herein by reference), (iv) classification and regression trees (CART) (described by Quiring et al. in 2011 entitled "Importance of soil and elevation characteristics for modeling hurricane-induced power outages," Nat Hazards. doi: 10.1007/s11069-010-9672-9, incorporated herein by reference), (v) random forest (described in Nateghi et al. in 2014 entitled "Power Outage Estimation for Tropical Cyclones: Improved Accuracy with Simpler Models," Risk Anal. doi: 10.1111/risa.12131, incorporated herein by reference) and (vi) Bayesian additive regression trees (BART) (described by Nateghi et al. in 2011). In addition to count data models, probabilistic models have also been coupled with physical models of the electric system with the aim to predict failures on both transmission and distribution lines (described by Mensah and Duenas-Osorio in 2014). Many of the above models can be implemented as: (i) individual models, (ii) average of multiple individual models, or (iii) as part of a hybrid two-stage model (described by Guikema and Quiring in 2012 entitled "Hybrid data mining-regression for infrastructure risk assessment based on zero-inflated data," Reliab Eng Syst Saf doi: 10.1016/j.ress.2011.10.012, incorporated herein by reference). Additionally, Nateghi et al. (2014) shows that the random forest model is superior to other models that have been built on the same set of hurricane data (described by Guikema and Quiring in 2012 and Han et al. in 2006).

In addition to modeling improvements, the quality and granularity of utility-specific data (i.e., tree-trimming and overhead line infrastructure) and environmental data (i.e., soil conditions, aspect ratio, and elevation) used as forcing parameters has led to models being able to better represent the physical processes that cause outages. As a complement to these data-intensive/utility-specific models, additional research dedicated to investigating publically available weather data can be used in lieu of proprietary, utility-specific data (i.e., using population counts for Census data rather than using actual customer data) such that the calibrated models may be generalized to other areas. This area of research is important as such early warning tools can lead to better emergency preparedness efforts. Also, Nateghi et al. in 2014 has shown that these generalized models have a marginal yet acceptable decrease in accuracy than the utility-specific models, which allows for the calibrated models to be applied to other service territories for which outage models don't currently exist. In addition to short-term outage models, other research has extended these generalized models into a long-term evaluation of tropical cyclone risk from climate change (described by Staid et al. in 2014 entitled "Simulation of tropical cyclone impacts to the U.S. power system under climate change scenarios," Clim Change. doi 10.1007/s10584-014-1272-3, incorporated herein by reference). Guikema et al. in 2014 have taken their utility-specific customer outage model for a Gulf Coast utility, called Hurricane Outage Prediction Model (HOPM), to create the Spatially Generalized Hurricane Outage Prediction Model (SGHOPM) to predict customer outages for Hurricane Sandy along the Eastern seaboard. Although the SGHOPM did well for many regions (including Massachusetts and Rhode Island), it seemed to have underestimated customer outages that impacted Connecticut due to the face that a large amount of customer outages in Connecticut might have been caused by storm surge which wouldn't be captured by SGHOPM. Although the storm surge was abundant and catastrophic in Connecticut during Sandy, with some coastal stations reporting >12 feet of surge (described by Fanelli et al. in 2013 entitled "Hurricane Study 2012 Water Level and Meteorological Data Report<br/>. NOAA, incorporated herein by reference), the storm surge only contributed to a minor fraction of the customer outages in the service territories. According to sources at each utility, the majority of outages were actually caused by trees interacting with the overhead lines. This might highlight that not all distribution utilities respond similarly to severe weather; a 50 mph wind gust may have a different impact in Connecticut than it would in a Gulf Coast state, which is believed to be a function of the overhead infrastructure and the surrounding vegetation. Connecticut is among the most forested and densely populated regions in the country as measured by the amount of wildland-urban interface (described by Radeloff et al. in 2005 entitled "The wildland-urban interface in the United States" Ecol Appl, incorporated herein by reference), which makes the region especially susceptible to tree-related utility damage (described by Wagner et al. in 2012 entitled "Environmental Quality in Connecticut 2011").

Although many outage models have focused solely on hurricanes, the use of high-resolution numerical weather simulations for storms of varying type (e.g., hurricanes, blizzards, thunderstorms) and severity (from 20 outages to >15,000 outages) are employed herein. In order to provide outage prediction, it would be important to know the accuracy of a predictive model being able to relate high-resolution numerical weather simulation data to outages for a range of storm types, seventies and seasons (e.g., warm weather, cold weather and transition months). It is also useful to know as to the amount of added performance the utility-specific data (e.g. land cover data aggregated around overhead lines and distribution infrastructure data) would contribute to magnitude (count of outages) and spatial (distribution of predicted outages) error metrics. Embodiments provided herein show the study area and datasets used in the model, covers the models used to predict utility damages and the model validation strategy and presents the results of all models evaluated, as well as a selection of the best model overall with particular focus on the hurricanes outage modeling results for the most simple and complex models.

Section 2 Study Area and Datasets

Figure 9:
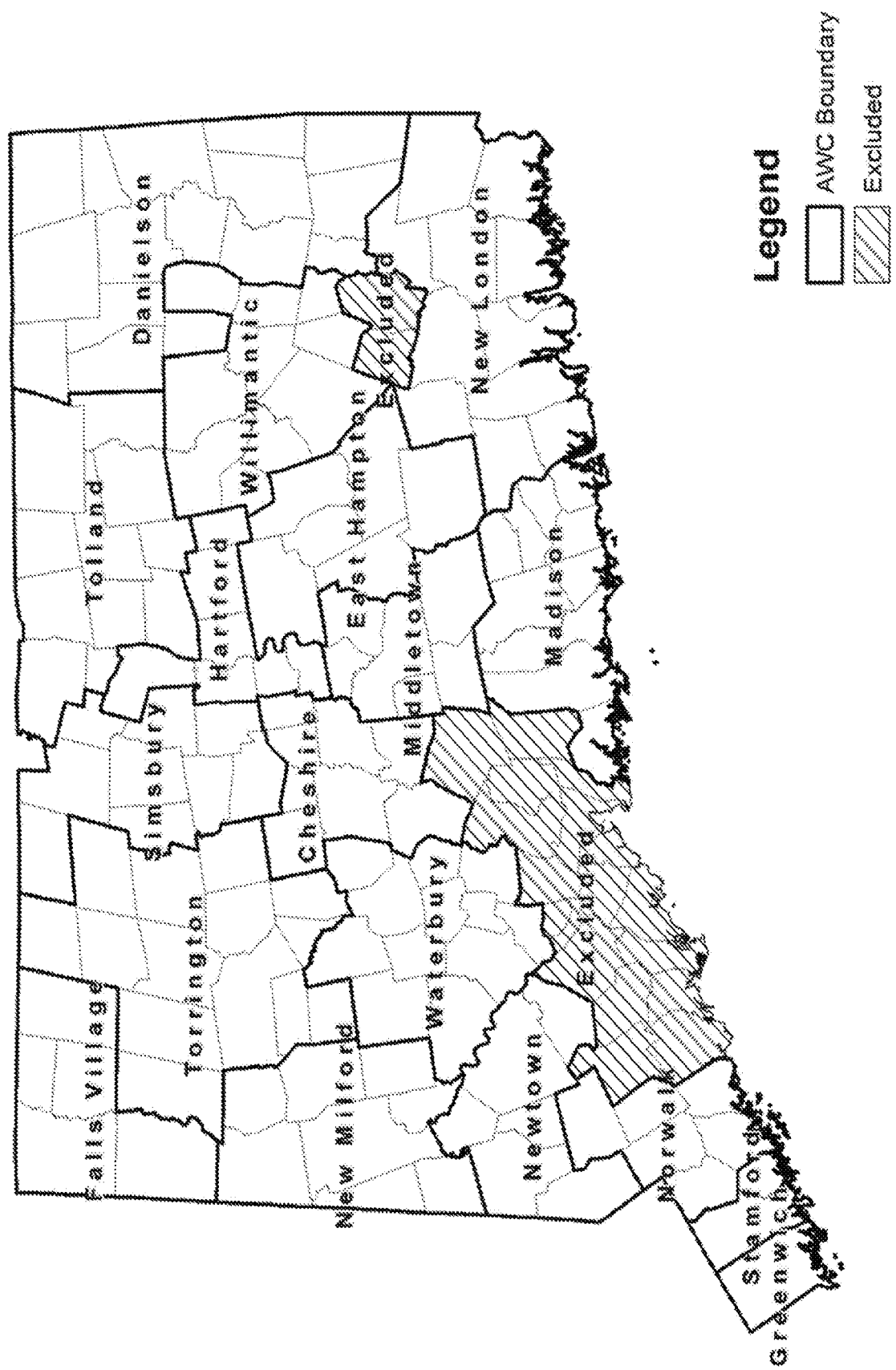
FIG. 9 illustrates a sample service territory denoting the town and area work center (AWC) boundaries.

The study area encompassed an exemplary territory within 1.2 million electricity customers in 149 towns across Connecticut via >18,000 miles of overhead distribution lines. Each of the 149 towns belongs to one of 18 Area Work Centers (AWCs) which are used to organize restoration crews (note that AWCs can have up to 15 associated towns, FIG. 9). Connecticut has a wide variety of land cover conditions; from a southerly coastal landscape, to urban centers in central and southwestern Connecticut, to the forested uplands of eastern and western Connecticut. Population density is most concentrated in the central and coastal areas.

Weather Simulations

Simulations of the weather for 89 storms that impacted the service territory between 2005 and 2014 were performed using the Advanced Research (ARW) dynamics core of the Weather Research and Forecasting Model (WRF) model version 3.4.1 (described by Skamarock et al. in 2008, incorporated herein by reference). The events were dynamically downscaled from analyzed fields provided by the Global Forecast System (GFS, at 6-hourly intervals with 1.0 degree grid resolution) produced by the National Center for Environmental Prediction (NCEP). In order to minimize initial condition (IC) and boundary condition (BC) errors, the events were modeled as hindcasts (e.g., the analyses are used to derive both the model's IC and BC updates).

Figure 10:
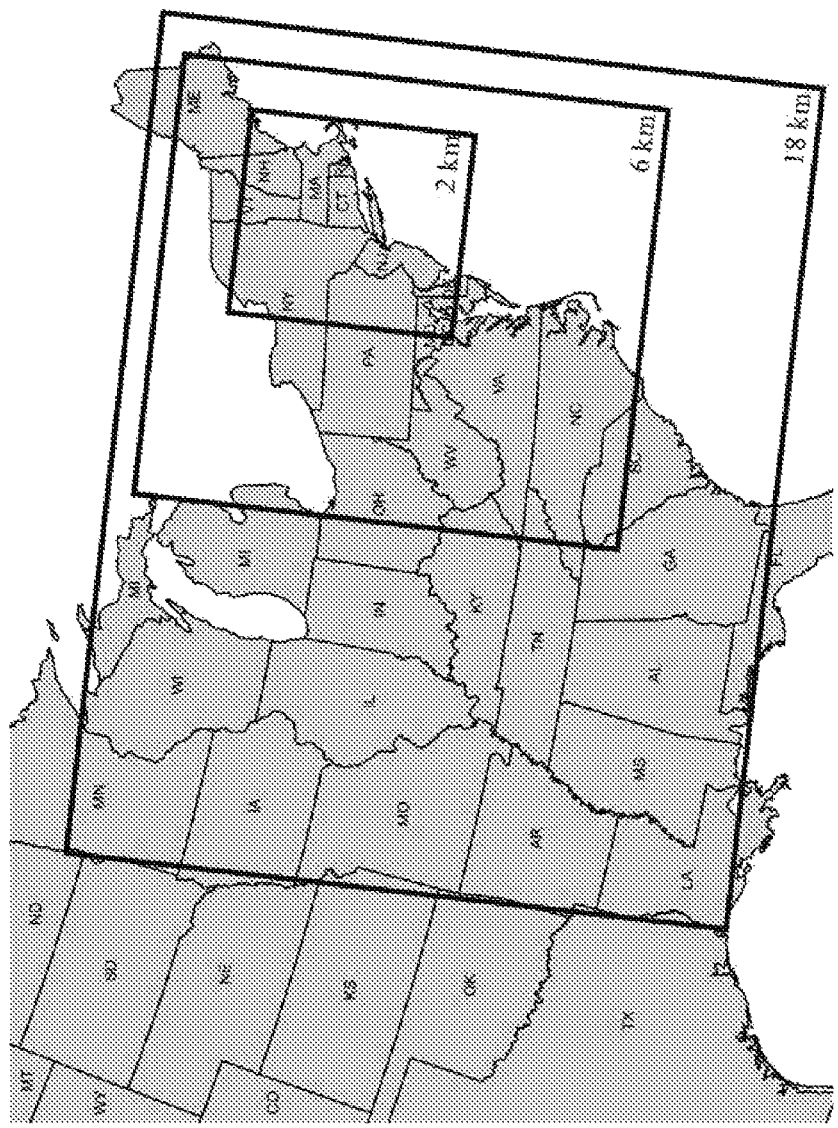
FIG. 10 illustrates nested grids of Weather Research and Forecasting model used to simulate storm events with the sample service territory of FIG. 2 is within the 2 km model grid resolution.

For the WRF setup, three nested domains (FIG. 10) were created to gradually downscale from the 1.0 deg GFS analysis to a 2 km resolution: an outer domain with resolution of 18 km, an inner-intermediate domain with 6 km, and the focus area with 2 km with a topography dataset at 30 arc-second (~1000 m) resolution. A subset of the inner most domain provides the modeled atmospheric conditions, which are derived from the grid cells within the area of study. WRF was configured to use a 30 second time-step, 2-way feedback between nested grids, and vertical levels. The schemes used to parameterize the physical processes included the Thompson for cloud microphysics (described by Thompson et al. in 2008 entitled "Explicit Forecasts of Winter Precipitation Using an Improved Bulk Microphysics Scheme. Part II: Implementation of a New Snow Parameterization," Mon. Weather Rev. doi: 10.1175/2008MWR2387.1, incorporated herein by reference); Grell 3D for convection (described by Grell and Devenyi in 2002 entitled "A generalized approach to parameterizing convection combining ensemble and data assimilation techniques," Geophysical Research Letters 29:1693, incorporated herein by reference), with the 2 km inner nest solved explicitly; RRTM for Long Wave radiation (described by Mlawer et al. in 1997 entitled "Radiative transfer for inhomogenous atmospheres: RRTM, a validated correlated-k model for the longwave," Journal of Geophysical Research 102:16663, incorporated herein by reference), initialized each 18, 6, and 2 minutes for each domain, respectively; Goddard for Short Wave radiation (described by Chou and Suarez in 1994 entitled "An efficient thermal infrared radiation parameterization for use in general circulation models," NASA Technical Memo:84, incorporated herein by reference); MM5 similarity for Surface Layer (described by Zhang and Anthes in 1982 entitled "A high-resolution model of the planetary boundary layer—sensitivity tests and comparisons with SESAME-79 data," Journal of Applied Meteorology 21:1594, incorporated herein by reference); Unified NOAH for Land Surface Model (described by Tewari et al. in 2004 entitled "Implementation and verification of the unified NOAH land surface model in the WRF model:11, incorporated herein by reference); Yonsei for Planetary Boundary Layer (described by Song-You Hong et al. in 2006 entitled "A new vertical diffusion package with an explicit treatment of entrainment processes," Mon Weather Review, incorporated herein by reference); and topographic correction for surface wind to represent extra-drag from sub-grid topography and enhanced flow at hill tops (described by Jimenez and Dudhia in 2012 entitled "Improving the representation of resolved and unresolved topographic effects on surface wind in the WRF model," Journal of Applied Meteorology and Climatology 51: 300, incorporated herein by reference); all the others settings were left to the default configuration.

For each event, the model was initialized 6 hours prior to the time of the first damage report running in the network for a 60 hour simulation time with hourly outputs. From these outputs, various wind and precipitation variables were derived and reduced to sustained mean and maximum representative value per grid cell (FIG. 20). The maximum value per grid cell refers to the maximum value over the duration of the 60 hour simulation, while the sustained mean value per grid cell refers to the maximum 4 hour mean from a "running window" during the simulation. In addition to these sustained and maximum values, the duration of 10 m wind speed and wind gust above a range of thresholds (e.g. 9, 13, 18 m/s for 10 m wind speed, and 18, 27, 36, 45 m/s for gust winds) was calculated. In terms of precipitation, a WRF-derived storm-total accumulated liquid and solid (snow and ice) precipitation and soil moisture was used. The impact of heavy rains has been shown to be significant in cases of stationary storms (typically associated with complex terrain areas), which can exemplify wind effects due to saturated soils (described by Guikema et al. in 2014). On the other hand, blizzards and freezing rain can enhance the effect of winds on tree damages.

Weather Simulation Evaluation

Given the significance of winds on the outage predictions, numerical weather simulations of selected major storm events were evaluated against wind speed observations using data from airport stations provided by the National Centers for Environmental Prediction (NCEP) ADP 163 Global Upper Air and Surface Weather Observations (NCEP/NWS/NOAA/USDC 2008). Specifically, wind speed at 10 m above ground is compared to modeled wind speed taken at the gridded location of each airport station. The error analysis was performed on the data pairs (WRF and NCEP ADP stations) of 10 m sustained wind speed (SWS) time series and the corresponding maximum 10 m sustained wind speed values from each station location. Sustained wind speed is calculated similarly to the way used in the OPM model, namely, taking a 4 hour running window that spans the entire duration of the simulated event. Error analysis results are presented for three major storms: Storm Irene ("Irene", 2011), Hurricane Sandy ("Sandy", 2012) and the Nemo blizzard ("Nemo", 2013). Details on the statistical metrics, including name conventions and mathematical formulas are provided in FIG. 40.

Figure 11:
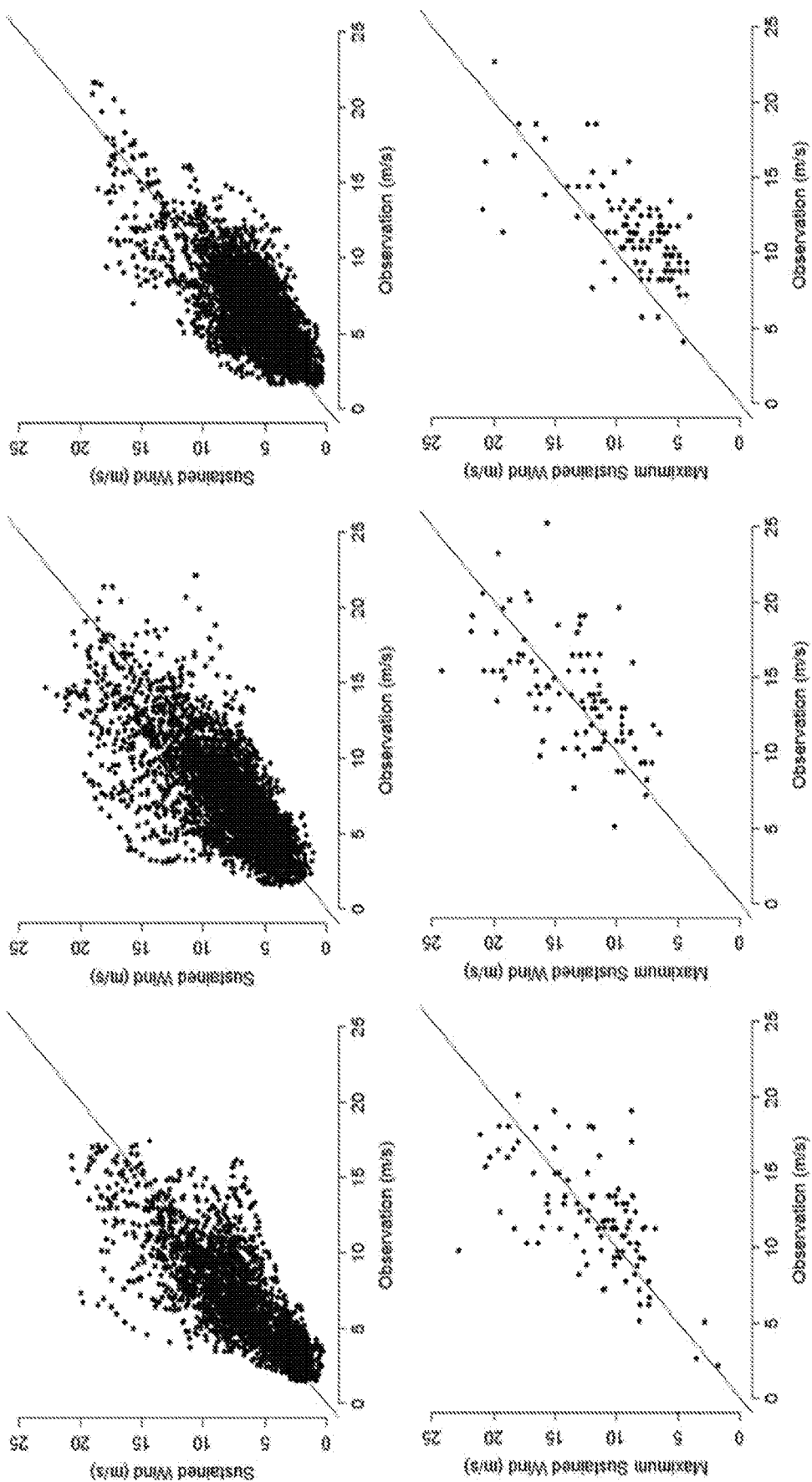
FIG. 11 shows scatter plots of 10 m (m s$^{-1}$) sustained wind speed (top plot) and corresponding max values at each station location (bottom plot) from WRF simulations versus METAR observations. Left panels: Hurricane Irene; Middle panels: Hurricane Sandy; Right panels: NEMO blizzard.

The model predictions of sustained wind speed at 10 m above ground have shown acceptable agreement with the observations. This step was necessary to gain confidence in the numerical weather prediction of extreme events for northeastern U.S. and use the model data as one of the drivers of the damage prediction model. Although precipitation was not evaluated in this study, it is noted that winds and precipitation processes resolved in the model are based upon the same atmospheric physics, with precipitation imposing added complexity due to microphysical processes. Scatter plots of observed versus modeled data show the linear correlation between calculated and measured horizontal wind fields (FIG. 11). The model simulations for Irene and Sandy exhibit similar patterns with predictions close to observed values. The mean bias (MB) is low (0.12-0.56 ms$^{-1}$) and the correlation varies from 0.6 to 0.8 depending on the atmospheric variable (Table 2). Similar performance is seen for the Nemo blizzard, with the only difference that the model slightly under-predicted the observations (negative MB and NSE) with an overall high correlation coefficient (0.74) for both wind parameters (sustained and maximum wind). Among other metrics, the statistical metric denoted as percentage within a fraction of 2 (FAC2) has been widely used in the atmospheric and air quality modeling community for the evaluation of predicted values (described by Astitha et al. in 2010 entitled "Modelling the chemically aged and mixed aerosols over the eastern central Atlantic Ocean-potential impacts," Atmos Chem Phys. doi: 10.5194/acp-10-5797-2010, incorporated herein by reference), (described by Builtjes in 2005 entitled "Review of Methods for Assessing Air Quality at Regional/Continental Scale," AirEU 6$^{th}$ Framework Programme Deliverable D5.1, incorporated herein by reference), (described by Chang and Hanna in 2004 entitled "Air quality model performance evaluation, Meteorol Atmos Phys. doi 10.1007/s00703-003-0070-7, incorporated herein by reference), (described by Hendrick et al. in 2013 entitled "Evaluation of NO2 predictions by the plume volume molar ratio method (PVMRM) and ozone limiting method (OLM) in AERMOD using new field observations," J Air Waste Manage Assoc. doi: 10.1080/10962247.2013.798599, incorporated herein by reference). FAC2 uses the multiplicative bias (model/observation) for each model-observation pair instead of the difference between the values. The percentage within a factor of two shows how many model-observation pairs are within an acceptable range (predicted values must be between half and twice the observations, with 1 being the ideal situation). The fraction of SWS within a factor of 2 for a series of model-observation pairs was 93% for Nemo, 92% for Irene and 70% for Sandy. The fraction of SWS within a factor of 1.5 was 88% for Nemo, 84% for Irene and 66% for Sandy. This statistical metric is considered more robust than the traditional correlation coefficient since it is not sensitive to outlier data pairs (high or low) (described in Chang and Hanna 2004). In all cases, the model correctly captured the diurnal variation of the wind field in the majority of the stations (not shown here). In addition, the uncertainty ratio (characterized as the ratio of standard deviation from modeled to observed fields) in the cases shown herein varies between 1.03 and 1.2 indicating strong similarity in the predicted and observed variability of wind simulations. Although, precipitation parameters are also used in forcing damage prediction model, errors in forecasts of precipitation are not evaluated herein. Precipitation information has limited contribution to the damage prediction, mainly as an index for enhancing the impact of severe winds in damage prediction. Future investigations based on more accurate spatial precipitation data (such as those derived from weather radar) could be used to enhance the use of precipitation information in damage prediction.

Seasonal Categorization

Storms were categorized based on their month of occurrence: "warm weather storms" included storms from June through September, "cold weather storms" included storms from December through March, "transition storms" occurred in April, May, October and November (FIG. 22). The labeling of storms allows this categorical variable to be included in the model. Each season category has an average leaf index associated with it, and storm characteristics tend to be more similar per season. For example, trees would hold leaves during warm weather storms, not during the cold weather storms, and hold some for transition storms. Warm weather storms tend to be predominately driven by convective and mesoscale processes, while cold weather storms tend to be predominately driven by synoptic scale processes, and transition storms can be characterized by either mesoscale or synoptic processes, as well as nor'easters (described by Jimenez et al. in 2008 entitled "Surface wind regionalization in complex terrain," Journal of Applied Meteorology and Climatology, incorporated herein by reference), (described by Wallace and Hobbs in 2006 entitled "Climate Dynamics," Atmospheric Science (Second Edition). Academic Press, San Diego, pp 419-465, incorporated herein by reference).

Utility Outages

The response variable in our models was the count of outages per grid cell. Outages are defined by a utility as "extended interruptions (>5 minutes) of service to one or more customers, that usually requires human intervention to restore electric service." For reference, the median number of outages on a normal day with low wind is typically around 40. During Hurricane Sandy and Storm Irene each event had >15,000 outages, which is equivalent to more than an entire year's worth of outages caused by one storm (calculated as total outages divided by median number of outages per day).

Utilities can provide detailed records of outages outputted from their Outage Management System (OMS) for each of the storms to be simulated. The OMS records included geographic coordinates, nearest substation, customers affected, town, regional operating center, date, time, outage length and circuit affected. In general, analysts should use caution when working with OMS data, as much as the data inputted by lineman can be erroneous; in an effort to save time, the lineman may enter the first entry of a dropdown list into a data collection system, even if incorrect. Duplicate records and records with "cause codes" not related to storm damages (i.e., damage caused by animals or vandalism) were removed. The utility may not track outages at individual metered locations; instead they rely on its customers to notify them of outages. After that, predictive algorithms automatically approximate the location of the damage to the nearest isolating device (i.e., transformers, fuses, reclosers, switches). Once the possible outage is recorded into the OMS, a crew is dispatched to find and repair the damage, and closes out the outage record once restoration is complete.

Distribution Infrastructure

The utility can also provide detailed geographic data about their electric distribution system in the form of polylines of the overhead distribution lines and point shape-files of isolating devices and poles. Although overhead distribution lines and pole locations were provided, these ultimately were excluded from the model because outages are recorded at the nearest isolating device (and not the nearest pole). Holding everything else constant, a grid cell with one mile of overhead-lines and one isolating device will theoretically only have one outage attributed to it, while a grid cell with one mile of overhead lines and 100 isolating devices will likely have many more outages attributed to it. Outages can occur anywhere on the overhead lines, and the isolating device may be of any type. Rather than aggregating the data by isolating device type (i.e., counts of transformer per grid cell), the total number of all isolating devices was aggregated by grid cell as a term called "sumAssets." As the sum of isolating devices increases per grid cell so does the opportunity that a trouble spot will be recorded simply by virtue of an isolating device to be there. Overhead line length was not used as a variable in the models directly but was used to calculate the percentage of land cover around overhead lines per grid cell.

Land Cover

Overhead lines directly interact with the environment that surrounds them. Trees are the predominant cause of damages to the utility distribution system, and vegetation management (colloquially referred to as "tree trimming") has been shown to decrease customer outages (described by Guikema et al. in 2006 entitled "Statistical models of the effects of tree trimming on power system outages," IEEE Trans Power Delivery. doi: 10.1109/TPWRD.2005.860238, incorporated herein by reference). Specific trees that have the potential to damage the overhead lines are referred to as "hazard trees." The interaction between trees and overhead lines is inherently localized and complex, and because "hazard tree" data may not exist for the utility, the land cover data surrounding the overhead lines can be used as a surrogate for grid cells that may have high amounts of "hazard trees." Land cover data aggregated by grid cell has previously shown to help generalize models where utility-specific distribution infrastructure data is not available without significantly affecting model performance (described by Quiring et al. in 2011). Thirty-meter resolution land cover data was attained from the University of Connecticut Center for Land Use Education and Research (CLEAR). The 2006 Landsat satellite imagery was processed by CLEAR into various land cover categories (University of Connecticut 2006) of which coniferous forest, deciduous forest and developed categories were included in the damage models. To determine the land cover categories around the overhead lines, the overhead lines were first overlaid with the land cover data. Given that the resolution of the land cover data was 30 m, a point was placed uniformly every 30 m on the overhead lines shape-file and spatially joined to the land cover data. The counts of points per land cover category were aggregated for every 2 km grid cell, and the total counts of points per category were then divided by the total number of points in the grid cell to calculate the percentage of land cover category that surrounded the power lines in each grid cell. Initially, there was an overwhelming abundance of developed land cover (>66%, Table 4) when the count of points was summed per grid cell. We suspected that roadways might be interfering with our land cover analysis: a typical two lane road with two shoulders is approximately 48 ft (16 m) (described by Stein and Neuman in 2007 entitled "Mitigation Strategies for Design Exceptions," FHWA-SA-07-011, incorporated herein by reference) and thus may constitute >50% of a grid cell. To counteract this phenomenon, a 60 m buffer was drawn around the overhead lines and points were uniformly placed every 30 m. FIG. 23 shows a comparison of service-territory percentages of land cover categories by using different aggregation methods. Our analysis shows that overhead lines were mostly located along deciduous forest and developed areas, and were least likely to be located near wetland areas. Additionally, FIG. 4 shows the classification for "developed" land cover around overhead lines, which is most concentrated in central and coastal Connecticut.

Section 3 Models

Overview

Three decision tree models (decision tree, random forest, boosted gradient tree), with full and reduced datasets, and an ensemble decision tree that uses as input the predictions from the three decision tree models, were evaluated to determine which combination of method and data would yield the best damage predictions on the utility's electric distribution network. The reduced subset consisted of only the weather variables, while the full model consisted of the weather variables along with infrastructure and land cover variables (Table 5). Models ending with an "A" subscript refer to models that use the reduced set of variables (i.e. "Model $DT_A$" is a decision tree model using the reduced dataset), and models with a "B" subscript refer to models that use the full set of variables (i.e. "Model $DT_B$" is a decision tree model using the full dataset).

Decision Tree Regression (DT)

The decision tree regression (DT) model, as described by Breiman et al. (1984), was the simplest model evaluated in this study and was selected because it is among the easiest of models to interpret and apply. A decision tree is a collection of logical "if-then" statements (called "branches") that relates explanatory variables (i.e., wind gust, wind duration above a threshold, etc.) to a response variable (i.e., outages) by recursively partitioning the explanatory variables into bins (called "leaves") that minimize the sum of square error (SSE). Recursive partitioning can either be an interactive process with the analyst selecting which splits should occur, or an automatic process that uses a stopping criterion (i.e. a node reaching purity (SSE=0) or a decrease in the validation $R_2$) to grow the tree. Although not required, pruning can improve the robustness of a decision tree model by removing extraneous leaves.

Random Forest Regression (RF)

Random forest regression (RF), also described by Breiman (2001), is an extension of the decision tree model that tends to yield more robust predictions by stretching the use of the training data partition. Whereas a decision tree makes a single pass through the data, a random forest regression bootstraps 50% of the data (with replacement) and builds many trees (as specified by the analyst). Rather than using all explanatory variables as candidates for splitting, a random subset of candidate variables are used for splitting, which allows for trees that have completely different data and different variables (hence the term random). The prediction from the trees, collectively referred to as the "forest", are then averaged together to produce the final prediction. One hundred trees were included in our random forest model, with six terms sampled per split, a minimum of ten splits per tree, and a minimum split size of 256.

Boosted Gradient Tree Regression (BT)

Boosted gradient tree regression (BT), a common model used in ecology (Kint et al. 2012) and in business analytics (Pittman et al. 2009), is a set of large additive decision trees built by building a series of small trees on the residuals of the previous trees (SAS Institute Inc. 2013). The small trees, also known as "decision stumps" because of their limited depth (e.g. splits per tree), are considered "weak learners". While the first small trees are not very useful, or interesting on their own, the collection of small trees built on residuals of the previous small trees that can become a sophisticated predictive model. As more layers are added to the tree, the contribution from each small tree is regulated via a "learning rate". As the depth of the tree increases, the sum of predictions becomes more accurate while the additive tree becomes increasingly complex. Our boosted gradient tree was initialized with a learning rate of 0.1, fifty layers and three splits per tree.

Ensemble Decision Tree Regression (ENS)

Lastly, an ensemble decision tree regression (ENS) was investigated to determine if the predictions from the decision tree, random forest and boosted gradient tree regression could be used to predict storm damages better than the simple average of all models or any model alone. The ensemble decision tree can be likened to asking three different people what they expect the damage to be from a storm, and to then fit a model based on their predictions (one method may better predict extreme damage; and a separate method may better predict low or no damage); any number of these scenarios can be accounted for in the framework of the ensemble decision tree regression.

Model Validation

Repeated Random Holdout

Model validation on out-of-sample data is used to test the predictive accuracy of the model, and as such, only model validation results are presented herein. There are many ways to look at model validation (repeated holdout, k-fold, stratified k-fold, leave-one-storm out validation). A 10-times repeated random holdout was conducted using ⅔ of the data as training and ⅓ of the data as validation. One drawback of the repeated holdout exercise is that some data may be used for validation exclusively while other data are used only for model training. We completed an analysis (not shown here) and found that more than 97% of observations were used for model validation at least once, and of those 97% of observations, each was used an average of 3.09 times (std. dev=1.38). Given the small number of covariates (26) relative to the large data record size (>250,000 records), the large size of the validation partition (33% relative to the 10% or 20% used in other studies), and the overall coverage of available observations (97% observations were used on average 3 times for validation), we believe this represents a fair validation of our models.

The repeated random holdout was conducted as follows: of the >250,000 records in our database (2,851 grid cells for each of the 89 storm events), ⅔ of the data was used for training and ⅓ was used for validation. For fair comparison, the same training and validation partitions were used to evaluate each of the eight model combinations. Each of the eight models was built on the training data and used to predict the holdout data, which was used for validation. The error metrics were calculated for each model in the validation partition, then the training and validation were recombined and the random holdout process was repeated a total of 10 times.

Definition of Accuracy Metrics

Outage predictions are aimed to inform emergency preparedness about the 1) total number of storm outages upon which a utility can decide on the number of crews needed to repair damages and 2) the spatial distribution of those outages so that they know where to place crews before a storm. To evaluate the model's predictive accuracy relative to these utility-specific needs, the magnitude (count of outages) was decoupled from the spatial (distribution of outages) evaluations of each model. Two subsets of metrics were presented to explore the magnitude and spatial accuracy of the trouble spot predictions to compare the eight different models that were separately evaluated.

The absolute error (AE) per storm measures the accuracy of the predictions aggregated by storm. It was calculated by taking the absolute value of the difference between the actual ($\theta$) and predicted ($\theta_o$) outages per storm (Equation 1).

$$AE = |\theta - \theta_0| \qquad \text{(Eqn. 1)}$$

Similarly, the percentage error (PE, Equation 2) per storm per holdout sample is calculated by dividing the absolute error by the corresponding actual outages per storm. AE and APE values that are 0 are perfect, while anything greater than 0 is considered less than perfect.

$$APE = \frac{|\theta - \theta_0|}{\theta} \qquad \text{(Eqn. 2)}$$

The four metrics calculated based on the above error definitions include: i) mean absolute error (MAE), ii) median absolute error (MdAE), iii) mean absolute percentage error (MAPE), iv) median absolute percentage error (MdAPE). The mean and median AE or PE of each model can be calculated by taking the mean (median) of the distribution of AE or PE across all holdout samples, respectively (89 storms times 10 holdout samples equals 890 values for mean and median to be calculated).

It is noted that most outage models in the literature use MAE per grid cell as the metric to evaluate model performance—given that the storms used in the studies represent a variety of sizes and severities (from 20 to 15,000 outages), it is appropriate to present error metrics by storm rather than by grid cell. To compare the models to other hurricane outage models in the literature, MAE per grid cell is presented to evaluate Storm Irene and Hurricane Sandy in Section 5 below.

To evaluate the spatial accuracy of the predicted outages the proportion of actual outages by town were calculated. For each storm and model, the actual outages per town were divided by the total actual outages across the service territory per storm. Additionally, corresponding proportions for the predicted outages were generated. The Spearman's rank correlation coefficient, $r_s$, between these proportions for each holdout sample were calculated (resulting in 10 unique $r_s$ values per model, which are presented as boxplots in Section 4). To ensure that correlation was not a scale dependent phenomenon, proportions for AWCs were generated and Spearman's rank correlation coefficient was calculated for each holdout sample. Although this model predicts outages per 2-km grid cell, towns and AWCs are natural aggregations for correlation because these are the geographic units by which the utility allocates crews and resources. As 410 mentioned earlier, the exemplary utility is divided into 149 towns which are grouped into 18 AWCs (note that not all AWCs have the same number of towns or geographic boundary). It is expected that the $r_s$ is improved for AWCs over towns because of the aggregation. Spearman's correlation is a nonparametric test for determining the strength of the relationship between variables and is more resilient to outliers than Pearson correlation (Wilks 2011); Spearman's correlation is the Pearson correlation computed using the ranks of the data. The two assumptions required for Spearman correlation are 1) variables are measured on ordinal, interval or ratio scale, and 2) a monotonic relationship between the variables. Spearman was used instead of Pearson because the distribution of proportion of actual outages per town and AWC was skewed right, whereas the distribution of the predicted proportion of outages was normally distributed. Spearman's rank correlation coefficients that are close to 1 have a strong positive relationship (though not necessarily linear), values close to 0 have no relationship, and values close to -1 have a strong negative relationship (though not necessarily linear). In addition to the spatial correlation error metric, we used maps to qualitatively compare the spatial accuracy of model predictions to actual outages for two of the largest and most impactful events in the database (Irene and Sandy, Section 5). Maps of the MAE and MdAE per town are presented of the best overall model, Model $ENS_B$, in Section 4 (computed as the mean and median of the AE per town from all 10 holdout samples).

Section 4 Results

Model Validation Results

Magnitude Results

The storm-wise results from each holdout (i.e., 89 storms times 10 holdouts equals 890 validation points were used to create each graph) are presented. FIG. 13 shows boxplots of the absolute error and percentage error per storm for all holdouts. Note that diamond symbols on FIG. 13 represent the mean absolute error (MAE) and mean absolute percentage error (MAPE), and the thick black lines represents the median absolute error (MdAE) and median percentage error (MdAPE), respectively. The MAPE values are skewed for all models due to over-prediction of smaller storm events. For example, a storm with 20 actual outages can be off by 500% if 100 outages are predicted for that storm. In addition, the MAE values are skewed for all models due to the errors from predicting the largest storm events (hurricanes, which can be up to two orders of magnitude larger than other events in our database).

Figure 14:
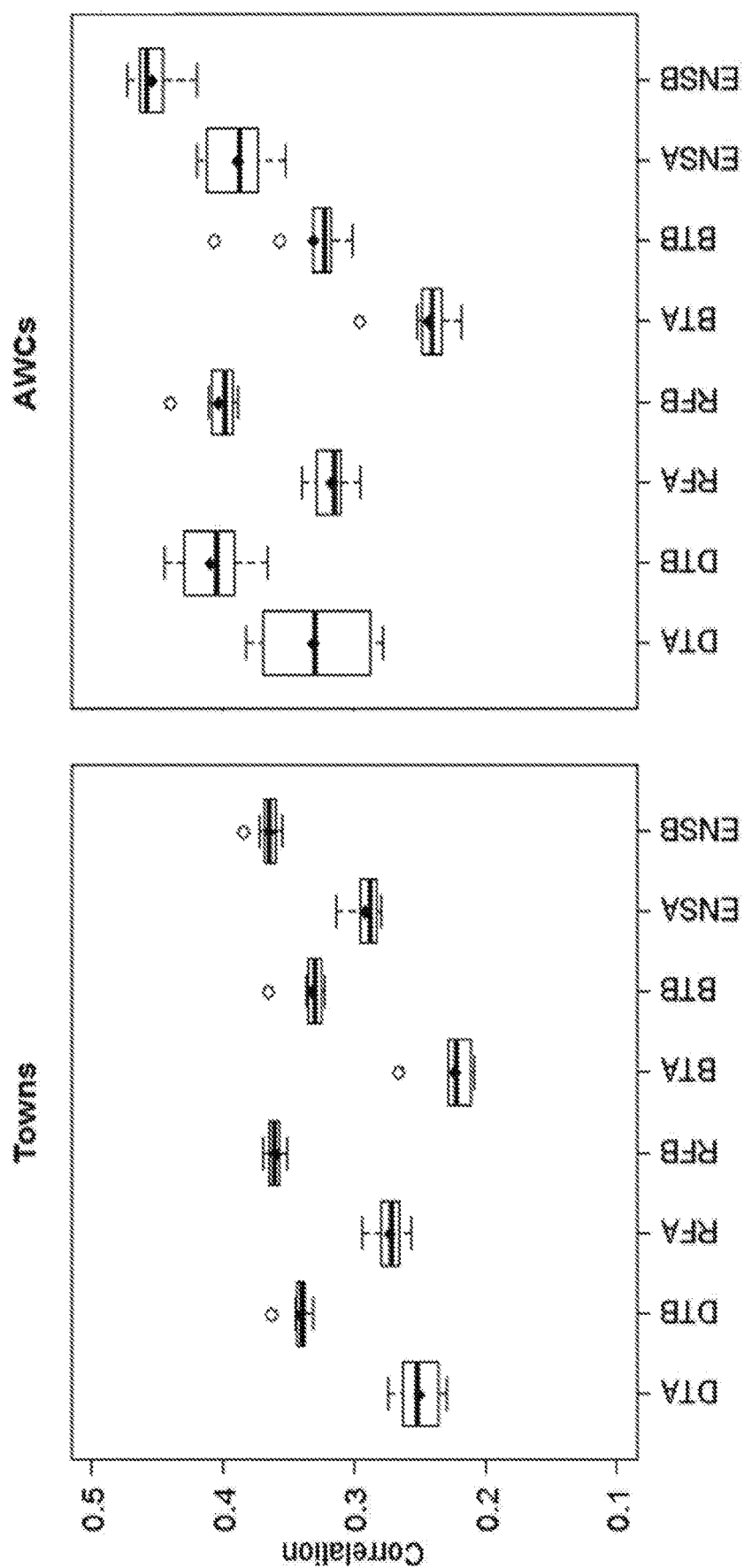
FIG. 14 illustrates boxplots of Spearman's rank-order correlation coefficient for each of the ten holdout samples, computed by town (left) and AWC (right). Diamonds represent mean values and bold horizontal lines indicate median values.

Though the meaning of MdAE and MdAPE is different than MAE or MAPE, it is believed that the MdAE and MdAPE are better metrics for model evaluation than MAE and MAPE because the median is a good representation of the center of the distribution. FIG. 14 shows MdAE and MdAPE for each model by season. Cold weather storms (storms occurring between December and March) had both lowest MdAE and MdAPE values, and transition storms tended to have slightly improved MdAPE than warm weather storms, and had similar MdAE values. It may be easier to predict cold weather storms than warm weather or transition storms because the trees have lost their leaves and the soil is generally frozen during these months, so most damage is associated with wind effects. Model $ENS_A$ had the lowest MdAE, MdAPE, MAE, and MAPE values, and so we can say with respect to magnitude that it was the best performing model. Model $ENS_B$ had a similar, slightly less improved performance than Model $ENS_A$; it also had a slightly wider interquartile range (IQR) and higher MAE, MAPE, MdAE and MdAPE values. If desired, the first and third quantiles (Q1, Q3) of the AE and PE can be read from FIG. 13.

Spatial Accuracy Results

The $r_s$ values for all towns or AWCs for each holdout (recall that each boxplot in FIG. 14 was constructed from 10 $r_s$ values, one for each holdout sample) are presented. FIG. 14 shows the values for $r_s$ for each model and holdout sample for both towns and AWCs. As mentioned earlier, it is preferred to use proportions rather than actual values in order to evaluate the accuracy of the model to predict the spatial distribution of outages (even if the territory-total predicted number of outages is over or underestimated). The range of $r_s$ values for the different models was between 0.2 and 0.5 (p-value<0.001), which indicates a weak positive correlation between observed and predicted proportions of outages in each town and AWC for each model. As expected, $r_s$ increased for each model when aggregating from towns to AWCs. The mean value of $r_s$ across all holdout samples is close to the median (FIG. 14). These $r_s$ values can be interpreted as follows: when the proportion of predicted outages increases, so does the actual proportion of outages, which implies that there is spatial accuracy (albeit, weak spatial accuracy overall). The model with the best distribution of $r_s$ values was Model $ENS_B$, which had the highest values for both town and AWC spatial scales of aggregation. Interestingly, Model $RF_B$ had similar spatial correlation to Model $ENS_B$, which may imply that Model $RF_B$ may also be used to forecast the spatial distribution of damages; however this model was shown to exhibit stronger biases in the total magnitude of outages.

Selecting the Best Overall Model

Figure 12:
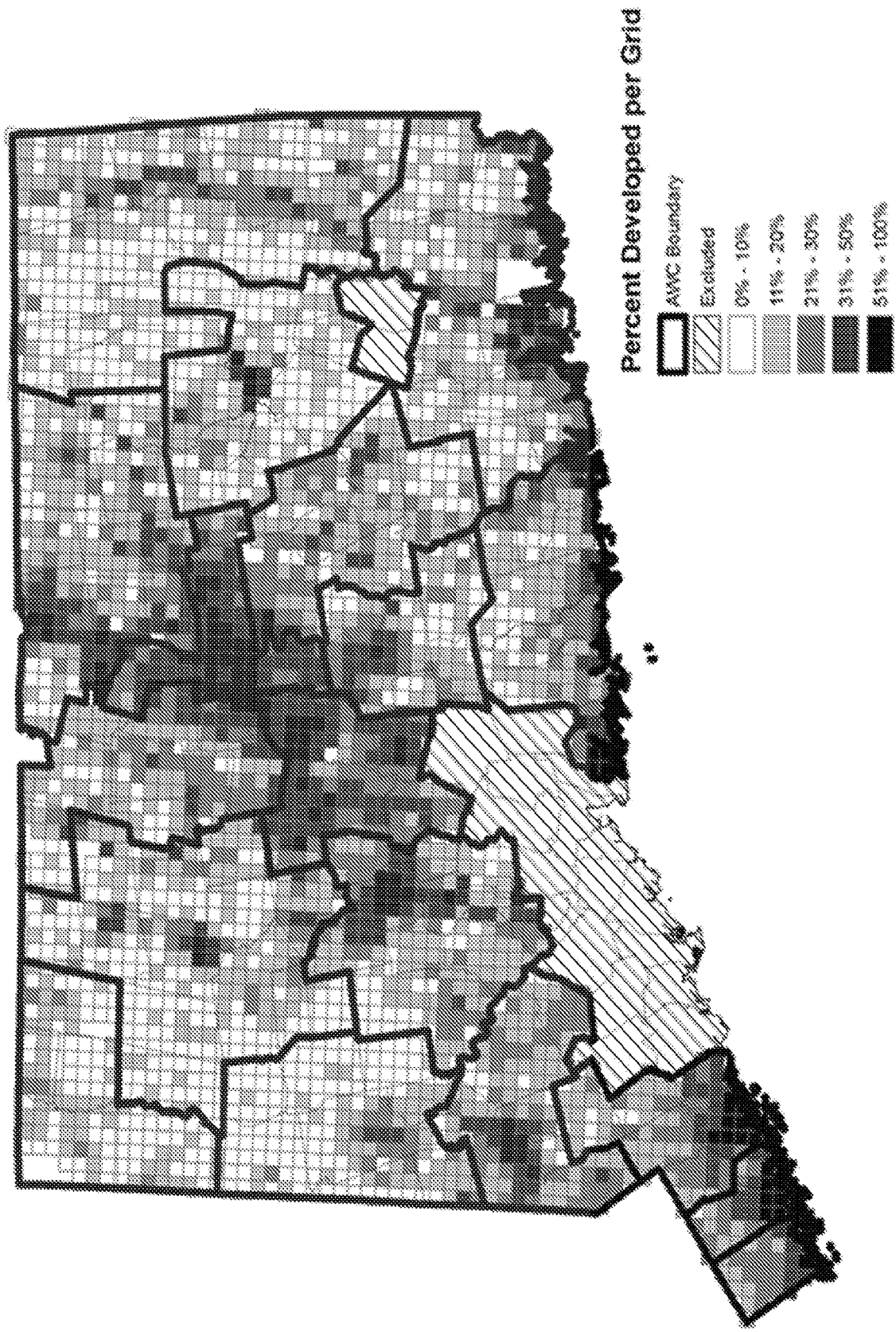
FIG. 12 illustrates the percentage of developed lines per grid cell using 60 m buffer classification/aggregation.
Figure 15:
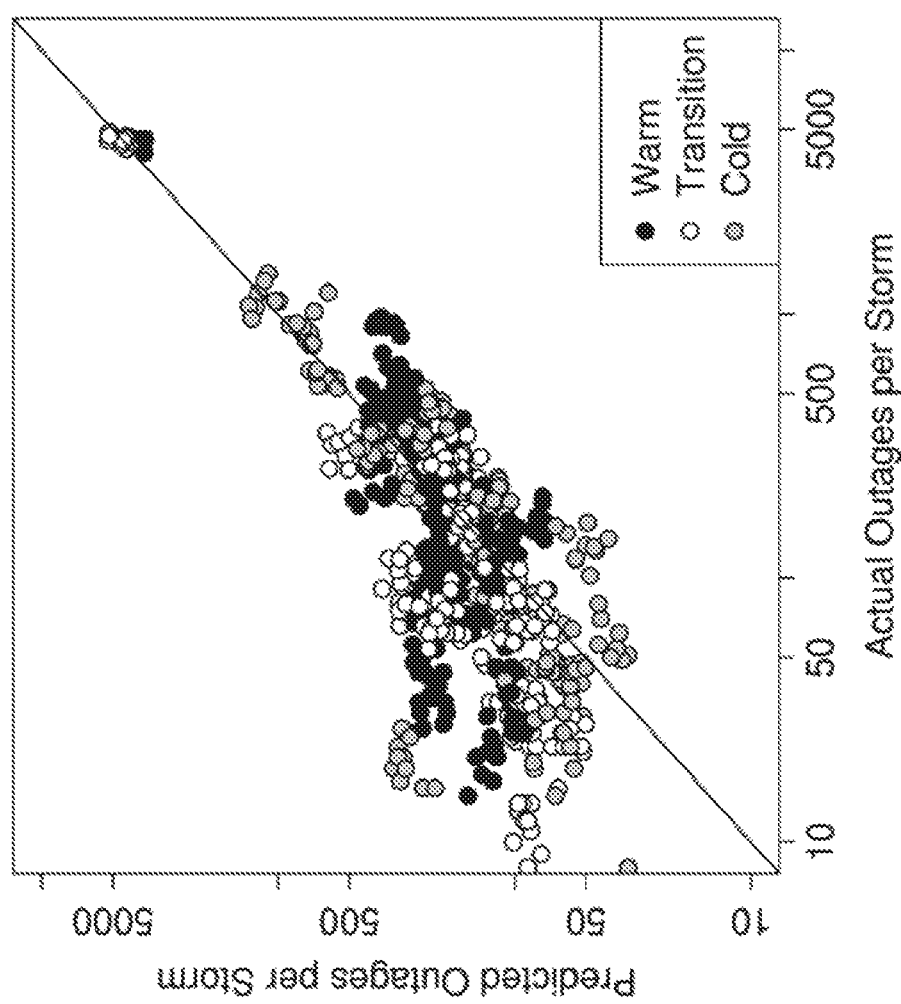
FIG. 15 illustrates total number of actual vs. predicted outages over the validation grid cells for model $ENS_B$ with seasonal grouping for all holdout samples, with a 45 degree line.
Figure 16:
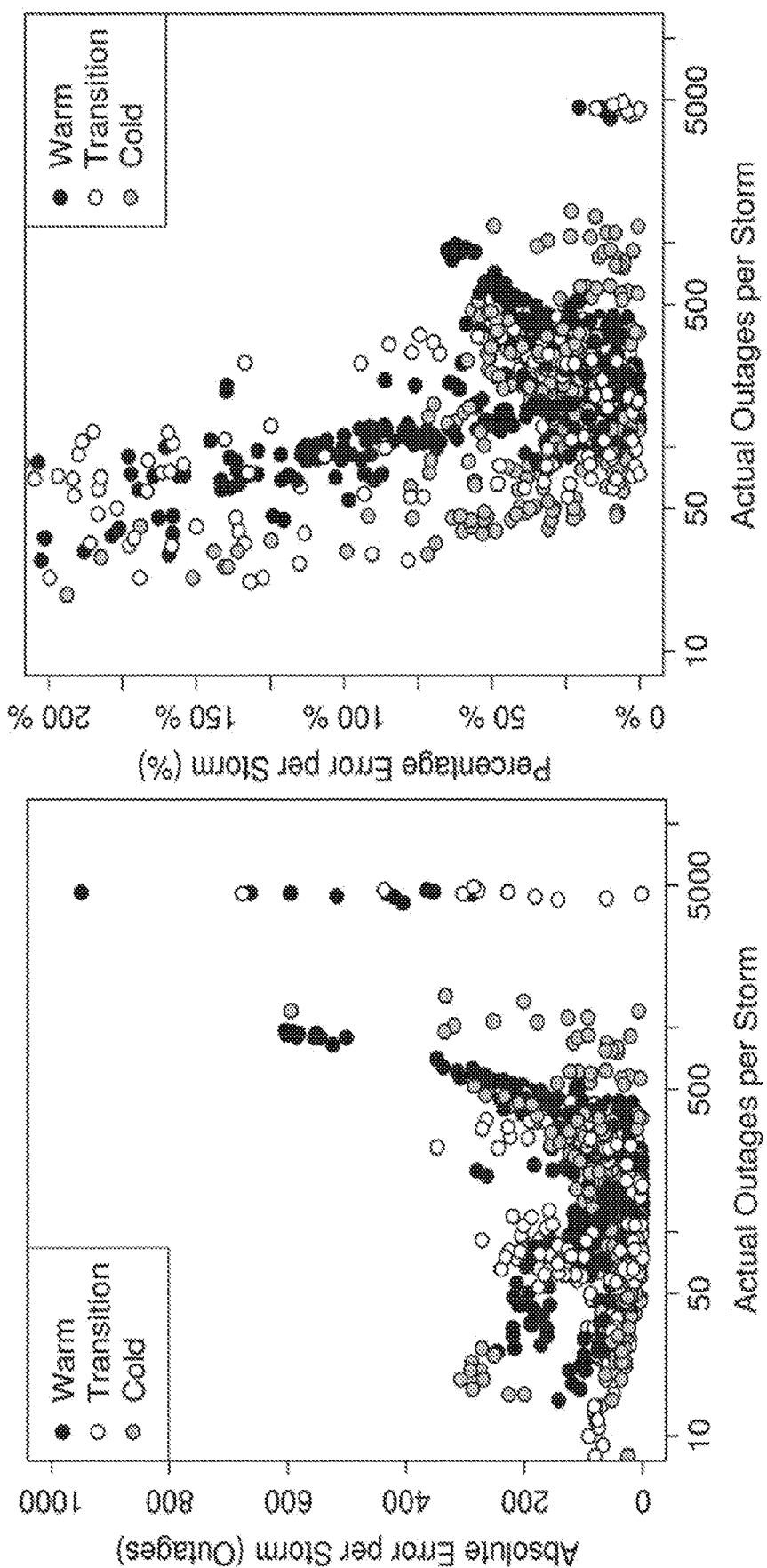
FIG. 16 illustrates the absolute (left graph) and the percentage (right graph) error per storm of model $ENS_B$ for all ten holdouts as a function of magnitude.
Figure 17:
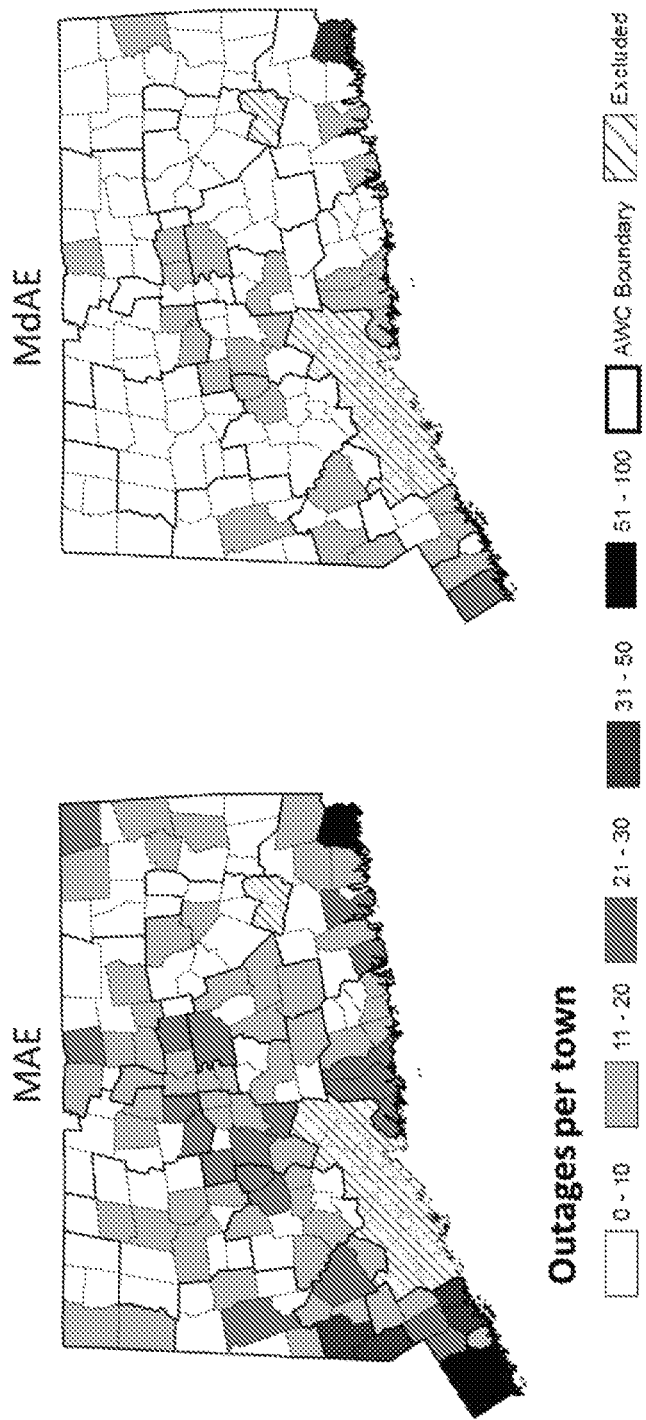
FIG. 17 illustrates the mean absolute error (left diagram) and median absolute error (right diagram) per town of model $ENS_B$ for all ten holdouts as a function of magnitude.

In an operational context, all models should be considered to represent the range of possible outage scenarios. However, utilities need to select the most likely scenario during decision-making, which will be based on the performance of the models in terms of both magnitude and spatial accuracy metrics. The Model $ENS_B$ was the best model in the overall evaluation because of its combination of spatial accuracy and magnitude metrics. For brevity, the magnitude error metrics for Model $ENS_B$ are explored as all models have weak positive spatial correlation. FIG. 15 shows the actual vs. predicted outages per storm by season; FIG. 16 shows how storm percent error decreases and absolute error increases as a function of storm severity. In order to show where the model tends to have the most error, the MAE and MdAE per town (FIG. 17) is presented. Note how the model tended to have the highest MAE and MdAE in areas that have the highest population (central and coastal Connecticut) and highest "developed" land cover around overhead lines (FIG. 12); less populated areas tended to have less MAE and MdAE per town, which may be a function of having less customers, less isolating devices or better vegetation management practices. However, further research is needed to understand why some areas are more resilient than other areas.

Section 5 Predicting Outages for Hurricanes

Hurricanes are among the most costly, disruptive and serious of all storm events to impact electric distribution networks. Though significant, hurricanes represented only two of the 89 storms in our database. If the damage before a hurricane could be accurately forecasted, then emergency-preparedness efforts could be vastly improved by deploying restoration crews and supplies ahead of a hurricane's land fall. The simplest model ($DT_A$) is compared with the most sophisticated model ($ENS_B$) to show how model and data forcing complexity might influence hurricane outage predictions.

Figure 18:
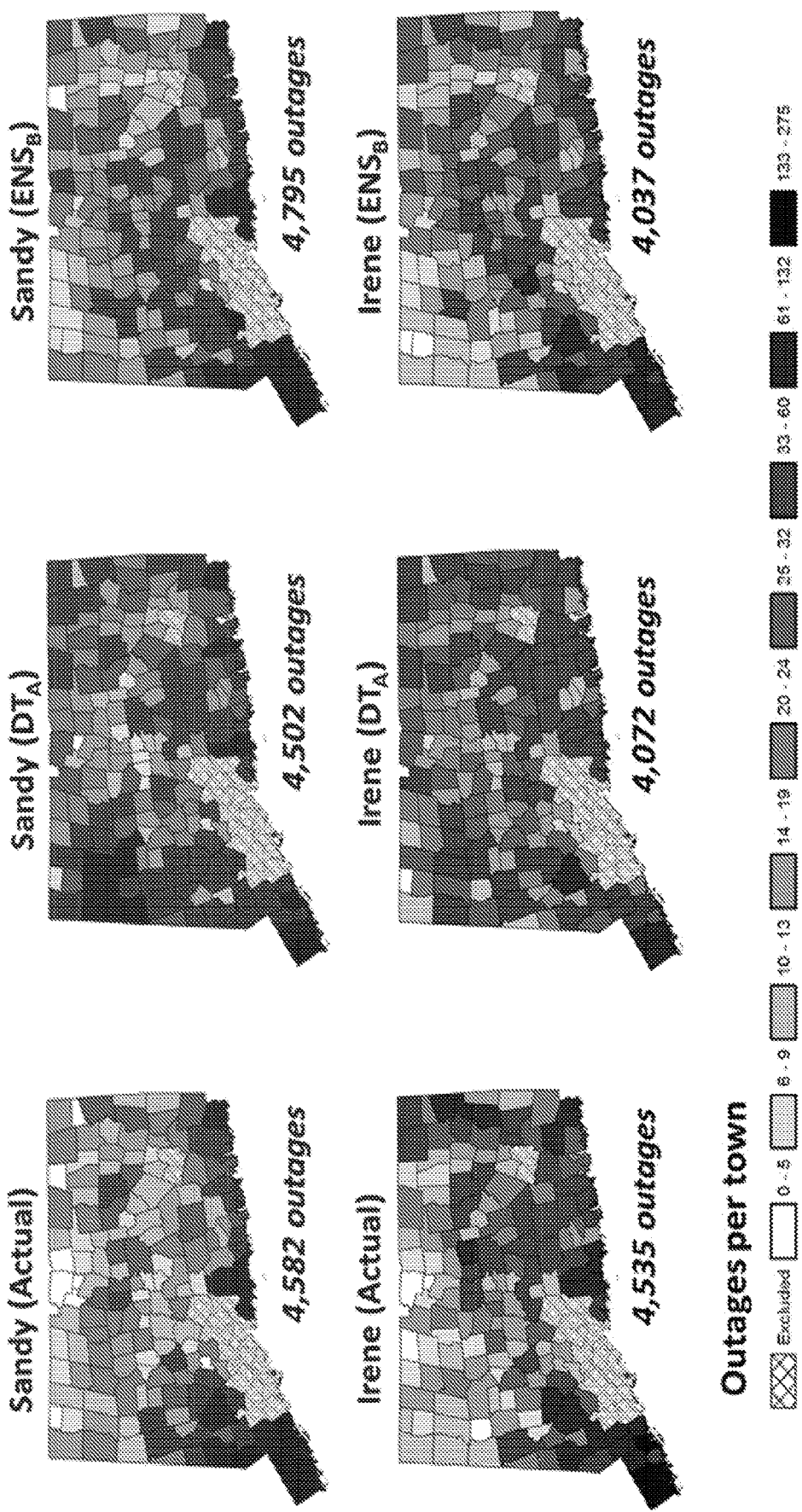
FIG. 18 illustrates maps of actual vs. predicted outages per town for Irene and Sandy for models $DT_A$ and $ENS_B$.
Figure 19:
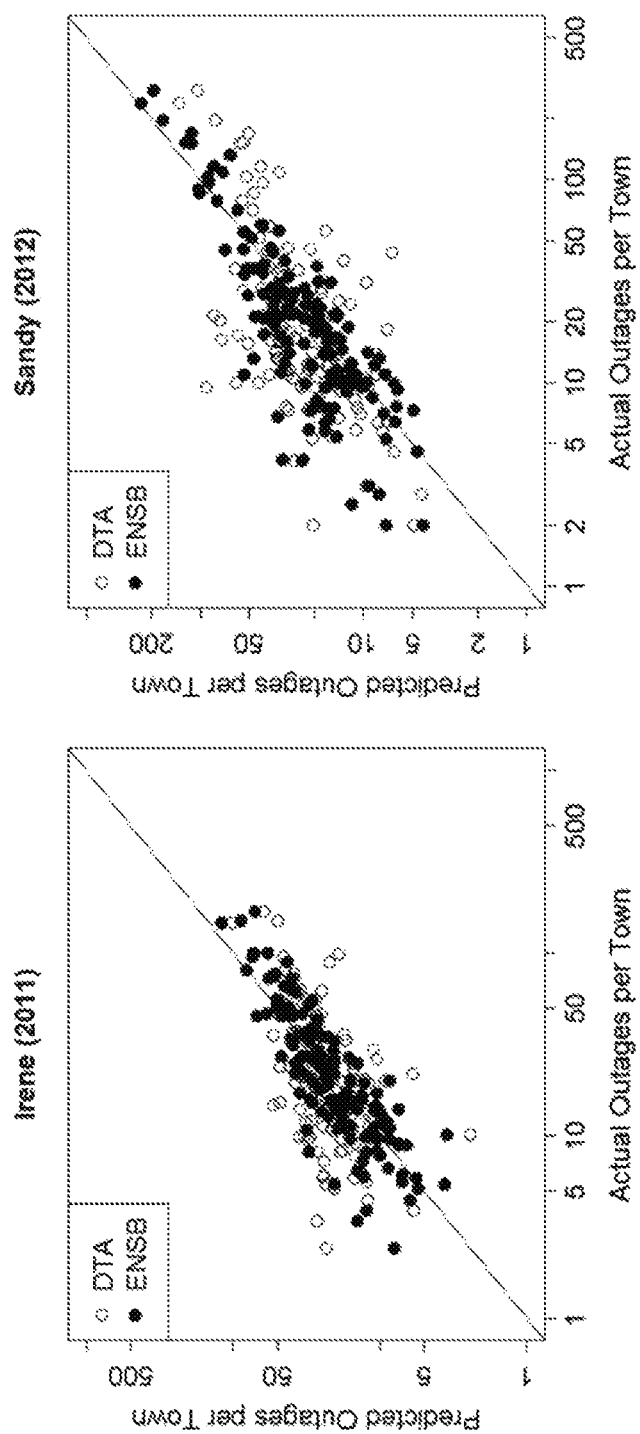
FIG. 19 illustrates scatterplots of actual vs. predicted outages per town for Storm Irene and Hurricane Sandy, with a 45 degree line.
Figure 28:
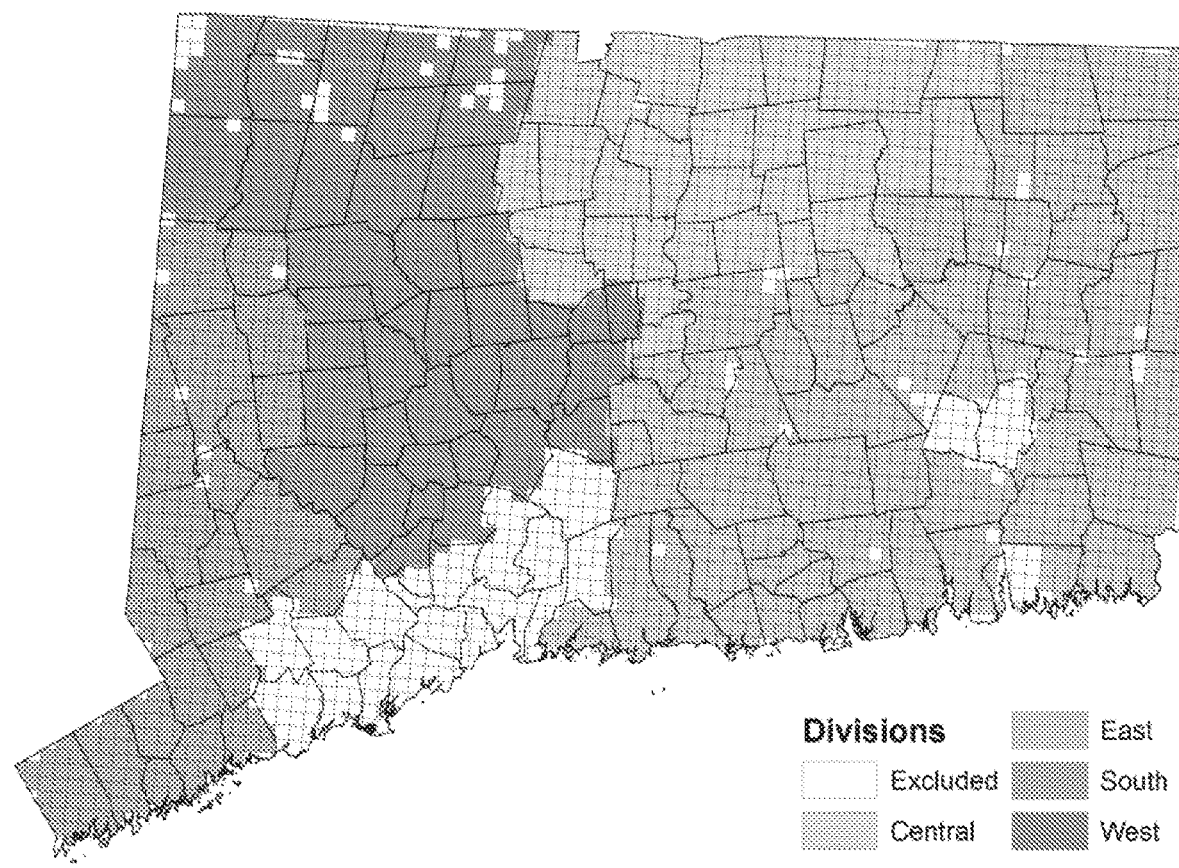
FIG. 28 is a map showing spatial resolutions: 2 km grid cell, town, division and territory with grid cells without infrastructure or outside the service territory excluded from the map.

FIG. 18 shows the distribution of average outages per town across all 10 holdout samples of Irene and Sandy for actual data vs. model $DT_A$ and model $ENS_B$ outage predictions. On average, Irene predictions were underestimated 10.2% by model $DT_A$ (463 outages) and 11% by model $ENS_B$ (498 outages). On average, Sandy was underestimated 1.7% (80 outages) by model $DT_A$ and overestimated 4.4% by model $ENS_B$ (212 outages). While both models are shown to accurately predict the aggregate total number of outages for the two hurricane storm events, model $ENS_B$ was superior in predicting the spatial distribution of these outages, especially for the towns that were hardest hit (FIG. 18). As a complement to the actual and predicted outage maps, FIG. 19 shows a scatterplot of the holdout averages for comparison of actual and predicted values from the average of all holdout samples for Irene and Sandy. The improved spatial accuracy of model $ENS_B$ renders the model useful as an input for other related models such as a storm restoration duration model or customer outage model because it correctly predicts the worst hit areas.

Regarding weather-only outage models and the value of added utility-specific data, a reasonably performing outage model to predict outages for the entire service territory can be developed without additional utility data so long as actual outage locations are available for historic events. Similar to the model in Han et al. (2009), the model presented herein tended to overestimate in the most populated (urban) areas; and similar to Nateghi et al. (2014), the weather-only model ($ENS_A$) exhibited similar (even slightly better) magnitude metrics to the corresponding utility-specific model ($ENS_B$). Consequently, there is an opportunity to readily expand the models presented in this study to other utilities that are within the inner 2-km weather simulations domain (FIG. 10), which includes utilities in Massachusetts, New Hampshire, New York, New Jersey and Rhode Island, so long as historic outage data are available for the simulated storm events. An additional benefit of these models is that they can be used for different storm types from different seasons, which is represented by the error metrics determined for many different storms. It was shown that the models predicted best the cold weather storm events, which may attributed to trees having lost their leaves and frozen soil, so most damage is caused by wind. Although cold weather storms may be predicted the best, ice storms might get excluded, which are among the most damaging storms for electric distribution networks (Liu et al. 2008). The higher MdAE and MdAPE values were shown for the convective warm weather storms, which are the most difficult to predict with numerical weather models due to their short timescale and localized nature.

These "weather-only" outage models can be valuable tools for utilities in the short term that can be used until data becomes available to build more mature models. The limitation of weather-only outage model is that they cannot account for dynamic conditions of the distribution network; such as system hardening improvements (Han et al. 2014), the topology of the network (Winkler et al. 2010), or vegetation management (described by Guikema et al. in 2006 entitled "Statistical models of the effects of tree trimming on power system outages," IEEE Trans Power Delivery. doi 10.1109/TPWRD.2005.860238, incorporated herein by reference), (Nateghi et al. 2014), and (described by Radmer et al. in 2002 entitled "Predicting vegetation-related failure rates for overhead distribution feeders," IEEE Trans Power Delivery. doi:10.1109/TPWRD.2002.804006, incorporated herein by reference). The benefit of the added utility data was that it had higher spatial accuracy than the weather-only models. The storms exhibited weak positive correlation between actual and predicted proportion of outages. Model $ENS_B$ had a mean correlation ($r_s$=0.37 for towns, $r_s$=0.45 for AWCs) that is similar to other correlation values found in the literature (described by Angalakudati et al. in 2014 entitled "Improving emergency storm planning using machine learning," T&D Conference and Exposition, 2014 IEEE PES. doi: 10.1109/TDC.2014.6863406, incorporated herein by reference), though they compute correlation for actual vs. predicted outages (not proportions) at "platforms", which are similar to the utility's AWCs.

Model $ENS_B$ to is compared to other existing models in the literature. Several hurricane outage studies have reported the MAE per grid cell across all storms evaluated, which was calculated from the grid cell predictions from all 10 holdout samples for Irene and Sandy. For model $ENS_B$ the MAE per grid cell was 3.13 outages (std. dev.=4.4 outages) for Irene and 3.15 outages (std. dev.=4.9 outages) for Sandy. These are comparable error magnitudes described in Nateghi et al. (2014) used a random forest model and reported MAE per grid cell values between 0.26 and 2.24 depending on which State they modeled; Han (2009) used generalized additive models and reported MAE per grid cell values between <0.001-72 outages depending on the hurricane that was predicted (however, MAE per grid cell values were tabulated as function of the actual number of outages, which made it difficult to do a direct comparison). With respect to storm totals, the outage models predicted Storm Irene within 5% and Hurricane Sandy within 11%, which is similar to other hurricane outage models (Winkler et al. 2010). However, direct comparison of the results must be taken with caution: the northeastern U.S. service territory has different environmental and infrastructure attributes than Gulf Coast utilities, and we are not using the same storms for evaluation (our average size hurricane caused >15,000 outages compared to the Han et al. (2009a) data, in which the average hurricane caused 6,169 outages).

The performance of four types of models have been investigated with two different subsets of data to determine what combination of data and method yields the best prediction of outages to the exemplary utility's electric distribution network in Connecticut. Of the eight models evaluated, an ensemble decision tree regression ($ENS_B$) forced with predictions from decision tree, random forest and boosted gradient tree regressions proved to be the best model overall. The ensemble decision tree regression modeling framework could be implemented operationally to predict future weather-related threats to the distribution system (as well as other types of critical infrastructure such as water or gas distribution systems). Now that outages can be forecasted in anticipation of a storm event, other models could be built from our predictions such as a customer outage model or an outage duration model. Should data become available, this modeling framework lends itself to the inclusion of vegetation management (e.g., tree trimming) and "hazardous tree" data. Further, other utility-specific data, such as conductor material and circuit type (backbone or lateral), may prove important to future models. Although all electric distribution networks are relatively unique (i.e., each utility has different topology, different tree species that interact with overhead lines and different vegetation management strategies), this model can be applied elsewhere as long as the necessary outage data is available.

Nonparametric Tree-Based Predictive Modeling of Storm Outages on an Electric Distribution Network Section 1 Introduction In addition to hurricanes, other more frequent weather systems (e.g., thunderstorms and frontal systems) have caused power outages in Connecticut lasting from several hours up to several days. Accurate prediction of the number of outages associated with storms would allow utility companies to restore power faster by allocating resources more efficiently. Furthermore, to effectively use these outage predictions in decision-making, models must exhibit acceptable accuracy in the spatial distribution of estimated outages and characterization of the prediction uncertainty.

A wide range of models have been employed in hurricane outage modeling, beginning with parametric statistical models. Generalized linear models (GLMs) such as that described by Liu et al. in 2005 entitled "Negative binomial regression of electric power outages in hurricanes," 11(4): 258-267, incorporated herein by reference, use negative binomial regression with binary index variables representing storm similarity characteristics. Guikema et al. in 2006 entitled "Statistical model of the effects of tree trimming on power system outages," Power Systems, IEEE Transactions on, 11(3):1549-1557, incorporated herein by reference, explored the effects of tree trimming on hurricane outages with a GLM and a generalized linear mixed model (GLMM). Liu et al. in 2008 entitled "Spatial generalized linear mixed models of electric power outages due to hurricanes and ice storms," Reliability Engineering & System Safety, 93(6):897-912, incorporated herein by reference, attempted the use of spatial GLMM for better inference on variables, but did not achieve improved prediction accuracies using random effects or spatial correlation modeling. Han et al. in 2009 entitled "Estimating the spatial distribution of power outages during hurricanes in the Gulf coast region," Reliability Engineering & System Safety, 94(2): 199-210, incorporated herein by reference, suggested using more informative descriptive variables with GLM and performed principal components analysis (PCA) as a treatment to transform related variables and obtain stable parameter estimates.

Nonparametric models for hurricane outage prediction gained popularity shortly thereafter. Guikema et al. in 2010 entitled "Prestorm estimation of hurricane damage to electric power distribution systems," Risk analysis, 30(12): 1744-1752, incorporated herein by reference, compared multiple models including classification and regression trees (CART), generalized additive models (GAM), Bayesian additive regression trees (BART) and GLM, and discussed the advantages of nonparametric models over parametric models for outage prediction for hurricanes. Nateghi et al. in 2011 entitled "Comparison and validation of statistical methods for predicting power outage durations in the event of hurricanes," Risk analysis, 31(12):1897-1906, incorporated herein by reference, expanded the topic to outage duration modeling and concluded that multivariate adaptive regression splines (MARS) and BART had better results than traditional survival analysis models and CART, and that BART produced the lowest prediction error. Guikema et al. in 2012 entitled "Hybrid data mining-regression for infrastructure risk assessment based on zero-inflated data," Reliability Engineering & System Safety, 99:178-182, incorporated herein by reference, proposed a two-stage model using classification trees and logistic regression to deal with zero-inflation and GAM for over-dispersion, which helped balance the statistical assumption and prediction. Recently, Nateghi et al. entitled "Forecasting hurricane-induced power outage durations," Natural Hazards, 74(3):1795-1811, incorporated herein by reference, highlighted the modifiable areal unit problem (MAUP) and compared predictions from random forests (RF) and BART, concluding that RF benefited from its distribution-free setting and performed the best in outage duration prediction. Among all nonparametric models, tree-based models, and especially multiple trees or forests models, have been used widely and have been generally preferred in modeling hurricane outages.

To support utilities in pre-storm decision making, two models were investigated and compared their predictions of spatial outage patterns and their ability to perform statistical inference. This study builds on our previous research that investigated the use of different model forcing data and methods for predicting power outages in Connecticut (described by Wanik et al. in 2015 entitled "Storm outage modeling for an electric distribution network in Northeastern US. Natural Hazards, incorporated herein by reference). Prediction intervals of model estimates are as important for risk management as point estimations of storm outages; a point estimate only provides a single value at each location to describe the predicted storm outages, while prediction intervals provide a characterization of the uncertainty associated with the prediction. The lack of uncertainty characterization can affect the complex socioeconomic aspects of emergency response. Here, two nonparametric tree-based models for the prediction of storm outages on the electric distribution network of the utility. In keeping with the most recent research in hurricane outage prediction, we selected quantile regression forests (QRF) and Bayesian additive regression trees (BART) as our candidate models because they were capable of both point estimation and prediction interval construction. BART was shown by Guikema et al. in 2010 to be the most accurate of the different hurricane outage prediction models evaluated in that study. QRF is derived from the random forest model, which has been demonstrated by Nateghi et al. in 2011 to provide robust spatial data aggregation and better power outage duration estimates than BART in terms of prediction error.

Section 2 Study Area and Data Description

The analysis was performed on a dataset of 89 storms of multiple temporal and spatial scales (i.e., deep and shallow convective events, hurricanes, blizzards and thunderstorms) that occurred during a ten-year period (2005-2014). We selected the explanatory variables based on their potential contribution to outages on the overhead lines when interactions of overhead lines and vegetation occur. All data including distribution system infrastructure, and land cover information (FIG. 26) were processed on a high-resolution gridded domain (grid spacing: 2×2 $km^2$) to represent the average conditions in the corresponding Numerical Weather Prediction (NWP) model grid spacing. Further, a seasonal categorization variable was created for each of the 89 storms (FIG. 26) to represent the actual tree-leaf conditions (e.g., leaf-on, leaf-off or transition) at the time of each storm. The study area was the service territory of the utility (FIG. 26), which spans 149 towns in Connecticut and is organized into four divisions (central, west, east and south). The outage predictions were analyzed over the corresponding NWP model grid cells, and subsequently spatially aggregated into coarser resolutions (town, division and territory) to investigate the effects of multiple scales.

Storm Outage Data

An outage is defined as a location where a two-man restoration crew needs to be sent for manual intervention to restore power. Storm outage records were acquired from the utility's outage management system (OMS) and to improve data quality, duplicate outage records and records with cause codes irrelevant to weather (e.g., vandalism or vehicular outage) were deleted from the data. Outages were recorded at the location of the nearest upstream isolating device (i.e., fuses, reclosers, switches, transformers) from where the damage on the overhead line occurred, which may be different from where the actual outage occurred. We made no differentiation of the different outage types to the overhead lines (i.e., a tree leaning on a conductor, a malfunctioning isolating device, or a snapped pole, etc.) because such data were not available to us.

Weather Simulation and Verification

Figure 29:
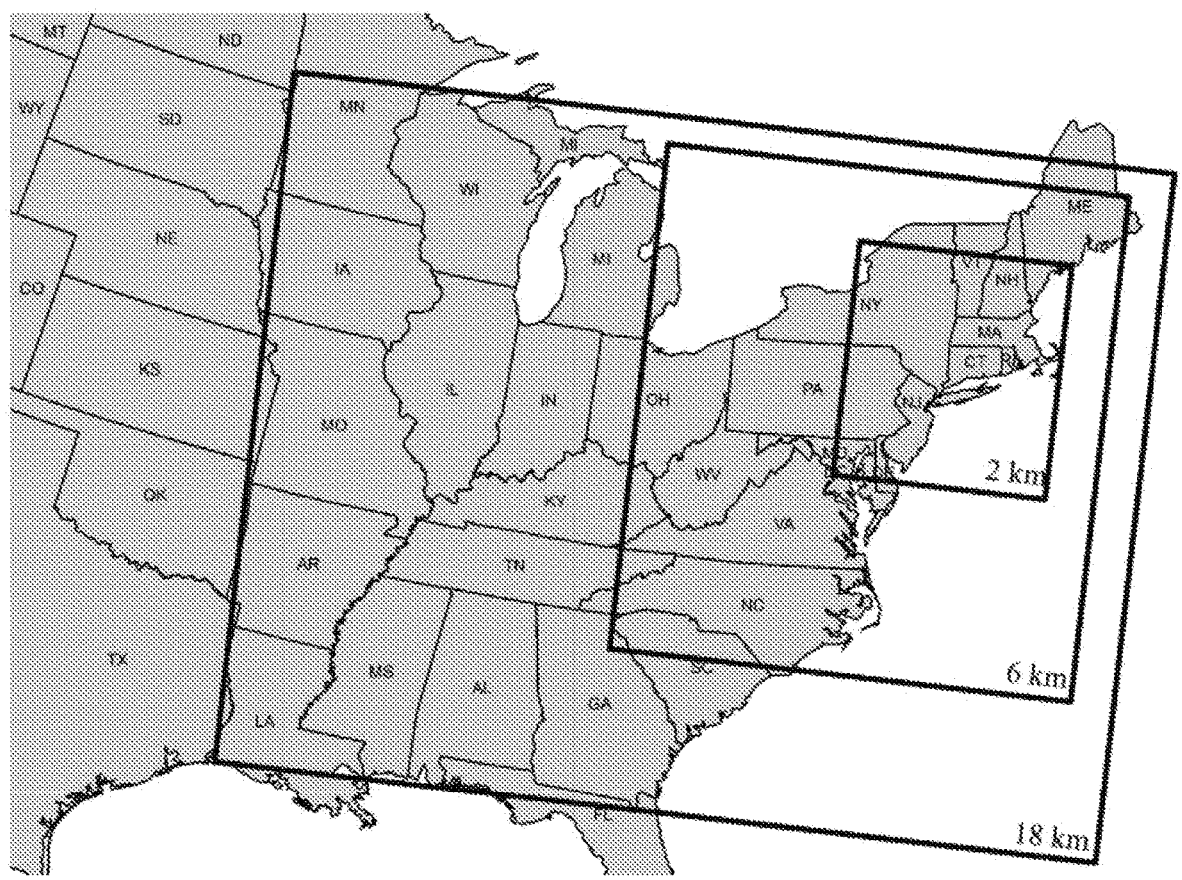
FIG. 29 is a map showing weather research and forecasting model nested domains in 18 km, 6 km and 2 km grids used for storm events simulation.

The Weather Research and Forecasting Model (WRF; described by Skamarock et al. in 2008 entitled "A description of the advanced research WRF version 3," NCAR Technical Node, NCAR/TN-475+STR, incorporated herein by reference, was devised to simulate the 89 storm events used in our study. The WRF model simulations were initialized and constrained at the model boundaries using NCEP Global Forecast System (GFS) analysis fields. The NWP model is set up with three nested domains with 18, 6 and 2-km of increasing grid spacing (FIG. 29). The simulated meteorological variables were summarized into maximum and mean values (FIG. 26). The wind-related variables in the NWP model included wind at 10 m, gust winds, and wind stress. The precipitation-related variables comprised of total accumulated precipitation, the precipitation rate, and snow water equivalent (SWE). The mean values of the selected meteorological variables represent the lasting impact of a storm. The means were calculated over the 4-hour window defined by the simulated wind speed, to which hereafter we refer to as the sustained period of the storm. This period is defined by the highest averaged value in the 4-hour running window across the NWP simulation length. The wind-based sustained period was then used to calculate the mean of the other meteorological variables. The maximum values of the meteorological variables represent the peak severity that occurred during the storm; they correspond to the nominal variable value at the time of highest simulated wind speed. Complementing the mean and maximum variables, the duration of winds and gusts above defined thresholds (9 m/s for wind, 18 m/s and 27 m/s for gust) were used to relate the duration of damaging winds to outages (FIG. 26).

The NWP model simulations were verified by comparing the sustained wind speed (previously defined for three major events (Hurricane Irene in August 2011; Hurricane Sandy in October 2012; Blizzard Nemo in February 2013) against METAR observations (airport meteorological station data) provided by the National Centers for Environmental Prediction (NCEP) ADP Global Upper Air and Surface Weather Observations. Though not shown here, the NWP model simulations showed acceptable agreement with the airport station data (e.g., low mean bias, and high correlation between actual and simulated sustained wind speed).

Seasonal Categorization

Storms affecting the distribution network can have a wide range of weather attributes (e.g., heavy snow or rain) that interact with overlying vegetation, and can have differing impact on the outage magnitude and frequency depending on the tree-leaf condition. For example, high winds usually have a greater impact on trees with leaves due to increased wind loading (described by Sellier entitled "Crown structure and wood properties: Influence on tree sway and response to high winds," American Journal of Botany, 96(5):885-896, incorporated herein by reference, and described by Ciftci in 2014 entitled "Analysis of the probability of failure for open grown trees during wind storms," Probabilistic Engineering Mechanics, 37:41-50, incorporated herein by reference. To capture this dynamic, we grouped our data by season (FIG. 26), which resulted in separate fits for each of the three different seasonal categories. Of the 89 storm events in our dataset, there were 38 storms and 1 hurricane (Irene) during the summer (leaves on) months (June to September); there were 24 storms and 1 hurricane (Sandy) during the spring and fall (transition) months (October, November, April and May); and there were 25 storms during the winter (leaves off) months (December to March).

Infrastructure and Land Use

The same infrastructure and land use data from Wanik et al. (2015) study has been used herein. The sum of isolating devices (e.g., sum of fuses, reclosers, switches, transformers) in each 2-km grid cell was an important predictor in our models, which is attributed to the outage recording methodology; if only one outage can be recorded at an isolating device, a grid cell with more isolating devices has more chances to record more outages than a grid cell with less isolating devices. Given that outages were recorded at the nearest isolating device and not the actual outage location, the different types of isolating devices were summed up into a single variable ("sumAssets") instead of modeling outages by isolating device type. This variable sets the upper limit on the number of outages that could occur in a 2-km grid cell.

Accurate tree-specific data (i.e., height, species, and health) around overhead lines are difficult to acquire, so we used land cover data aggregated around the overhead lines as a surrogate for the actual tree data. This aggregation differs with previous research (described in Quiring et al. in 2011 entitled "Importance of soil and elevation characteristics for modeling hurricane-induced power outages," Natural hazards, 58(1):365-390), herein incorporated by reference) that used the percentage of all land cover types in a grid cell, regardless of whether or not certain land cover types in that grid cell interacted with the overhead lines (i.e., a waterbody that is in the grid cell but is not close enough to the overhead lines to cause influence). Land cover data (30 m resolution) were obtained from the University of Connecticut Center for Land Use Education and Research (CLEAR) and were used to generate percentages of land use per grid cell. Details about the calculation of land use are available in Wanik et al. (2015).

Section 3 Methodology

As two systematically different examples of nonparametric tree-based models, QRF and BART utilize different assumptions and techniques for their application. We briefly introduce the benefits and known issues of these two models, followed by measurements and methods for analysis and comparison of the models. For brevity, we have excluded an investigation of variable importance as the focus of this paper is the predictive accuracy of the models rather than the relative contribution of each variable.

Quantile Regression Forests

Based on the well-known random forests algorithm described by Breiman in 2001 entitled "Random forests," Machine Learning, 45(1):5-31, incorporated herein by reference, and described by Meinshausen entitled "quantregForest: quantile regression forests. R Package version 0.2-3," CRAN, Institute for Statistics and Mathematics, Vienna University of Economics and Business, incorporated herein by reference, created the quantile regression forests (QRF) with the idea of quantile regression from econometrics. Similar to the weighted average of all the trees for predicted expected value of response, QRF utilizes the same weights to calculate the empirical distribution function:

$$\hat{F}(y \mid X = x) = \sum_{i=1}^{n} w_i(x) 1_{\{Y_i \leq y\}}. \quad (1)$$

The algorithm of QRF can be summarized as:
1. Grow k trees $T_t$, t=1, k, as in random forests. However, for every terminal node of every tree, take note of all observations, not just their average.
2. For a given X=x, drop x down all trees. Compute the weight $w_i$(x, Tt) of observation i=1, . . . , n for every tree. Compute weight $w_i$(x) for every observation i=1, . . . , n as an average over $w_i$(x, $T_t$), t=1, . . . , k. These weight calculations are the same as in random forests.
3. Compute the estimate of the distribution function as in (Equation 1), using the weights from Step 2.

Given the estimated empirical distribution, quantiles and percentiles are readily available. In this case, mean from the estimated distribution is a natural point estimate, which is exactly the same as random forests. Meinshausen (2012) has provided an R package called "quantregForest," with dependency on the "randomForest" package described by Liaw et al. in 2002 entitled "The randomForest package," R News, 2(3):18-22, herein incorporated by reference. Our analysis was based on a slightly modified version of "quantregForest" package providing RF prediction as well as desired quantiles.

QRF has already been used in several aspects of natural phenomena, but have not been implemented in storm outage prediction directly. Juban et al. in 2007 entitled "Probabilistic short-term wind power forecasting based on kernel density estimators," European Wind Energy Conference and Exhibition EWEC May 2-10, Milan Italy, incorporated herein by reference, tested QRF in approximating the kernel density of short-term wind power, indicating comparatively wide prediction intervals by QRF. Francke et al. in 2008 entitled "Flood-based analysis of high-magnitude sediment transport using a non-parametric method," Earth Surface Processes and Landforms; 33(13):2064-2077, incorporated herein by reference, addressed the better performance of QRF over GLMs in flood-based analysis of high-magnitude sediment transport. Zimmermann et al. in 2012 entitled "Forests and erosion: Insights from a study of suspended-sediment dynamics in an overland flow-prone rainforest catchment," Journal of Hydrology, 428:170-181, incorporated herein by reference, also took advantage of QRF to study erosion in rainforests.

Suppose we need to generate a prediction interval for a storm event by aggregation. Accurate empirical distributions are highly preferred, but demand a large number of observations. For example, to generate percentiles (actually 101 quantiles including maximum and minimum), we prefer more than 100 observations in each terminal node. However, enforcing too many observations in terminal nodes could introduce bias if the sample size is not large enough. In this study, we compared QRF to BART in order to get a deeper understanding about the importance of prediction intervals in characterizing model performance.

Bayesian Additive Regression Trees

Bayesian additive regression trees model (BART), introduced by Chipman, George and McCulloch entitled "BART: Bayesian additive regression trees," Technical Report, Department of Mathematics and Statistics, Acadia University, incorporated herein by reference, and entitled "BART: Bayesian additive regression trees," The Annals of Applied Statistics, 4(1):266-298, incorporated herein by reference, is a high performance derivation of Bayesian classification and regression trees model (CART). It takes advantage of a back-fitting MCMC algorithm (described by Hastie et al. in 2000 entitled "Bayesian backfitting," Statistical Science, 15(3):196-223, incorporated herein by reference) in generating the posterior sample of CART. Instead of a single regression tree (the mode of posterior tree sample), a sum of regression trees is utilized to estimate the response under normal assumption:

$$Y = \underbrace{\sum_{j=1}^{m} g(x; T_j, M_j)}_{\text{Mean Component}} + \underbrace{\varepsilon, \varepsilon \sim N(0, \sigma^2)}_{\text{Variance Component}} \quad (2)$$

Here $T_j$ stands for the $j^{th}$ regression tree; $M_j$ stands for the $j^{th}$ set of terminal nodes; m stands for total number of trees. The prior for probability of splitting node η (depth=d η), which is also presented by Chipman, George and McCulloch in 1998 (entitled "Bayesian CART model search," Journal of the American Statistical Association, 93(443):935-948, incorporated herein by reference.

$$p_{split}\alpha(1+d_\eta)^{-\beta}, 0 \leq \alpha \leq 1 \text{ and } \beta \geq 0. \quad (3)$$

Similar to Friedman's gradient boosting, each terminal nodes $\mu_{t_j}$ is determined by N $(0, \sigma_\mu^2)$, where $\sigma_\mu = 0.5/k\sqrt{m}$. An inverse chi-square distribution is set as the prior of $\sigma^2$, parameterized with v and $P(\sigma < \hat{\sigma})$. All of these hyper parameters can be optimized via cross-validation.

Chipman et al. (2009) provided an R package "BayesTree" based on C and Fortran, with their original work. Pratola et al. (entitled "Parallel Bayesian additive regression trees," Journal of Computational and Graphical Statistics, 23(3):830-852, incorporated herein by reference) offered a standalone C++ implementation with fast parallel computation. Kapelner and Bleich et al. (entitled "Machine Learning with Bayesian additive regression trees," R package version 1.1.1. Vienna (Austria): CRAN, Institute for Statistics and Mathematics, Vienna University of Economics and Business, 2014, incorporated herein by reference) made the R package "bartMachine" based on rJava, including features like parallel cross-validation and interaction detection, which we used in this paper.

BART has been widely used in risk analysis and the prediction of natural hazards. described by Guikema et al. in 2010 entitled "Prestorm estimation of hurricane damage to electric power distribution systems," Risk Analysis, 30(12): 1744-1752, incorporated herein by reference, conducted a comparison of multiple models for estimating the number of damaged poles during storms, and concluded that BART and an ensemble model with BART outperformed other parametric regression methods. Nateghi et al. in 2011 entitled "Comparison and validation of statistical methods for predicting power outage durations in the event of hurricanes," Risk analysis, 31(12):1897-1906, incorporated herein by reference, compared BART with traditional survival models in predicting power outage durations in Hurricane Ivan, 2004, and concluded that BART had better performance over parametric survival models. Blattenberger et al. in 2014 entitled "Avalanche forecasting: using Bayesian additive regression trees (BART). Demand for communication services-insights and perspectives," New York: Springer. Part III, Emperical Applications: Other Areas; p. 211-227, incorporated herein by reference, implemented BART in predicting binary response of avalanches crossing streets. They compared BART classification with linear and logistic regressions by altering the cutoff probabilities and concluded that BART excelled in predicting binary response.

As a well-defined Bayesian statistical model, BART naturally offers prediction intervals under its model assumptions, but the error term can be mis-specified with respect to storm outage modeling. Both modeling the number of outages and outage durations involve errors that do not necessarily follow a normal distribution. The response variable (the number of outages) seemed to follow a Poisson distribution in grid cells and towns, while a zero-truncated normal distribution seemed to fit better in divisions and the territory (FIG. 30; hurricanes are excluded for extreme values). That is, these errors could approximately satisfy normality and homogeneity of variance in some situations, while the distribution of data aggregated with different spatial resolution can vary greatly. This issue was first discovered by Gehlke and Biehl in 1934 entitled, "Certain effects of grouping upon size of the correlation coefficient in census tract material," Journal of the American Statistical Association, 29(185A):169-170, incorporated herein by reference, and later discussed in details by Openshaw in 1979 entitled "A million or so correlation coefficients: three experiments on the modify areal unit problem," Journal of the American Statistical Association, 29(185A):169-170, incorporated herein by reference. To understand the impact in our study, we would like to study the prediction intervals given by BART in more detail.

Metrics of Model Performance Evaluation

The two models are compared using the following metrics:

Mean absolute error (MAE) is an absolute measurement of the point estimate error of n predictions, which is calculated by $$MAE = \frac{1}{n}\sum_{i=1}^{n}|\hat{y}_i - y_i|. \tag{4}$$

Root mean square error (RMSE) measures the magnitude of error as well as its variability, which is defined as $$RMSE = \sqrt{\frac{1}{n}\sum_{i=1}^{n}(\hat{y}_i - y_i)^2} \tag{5}$$

MAE is less than or equal to RMSE. Closer difference between MAE and RMSE indicates smaller variability in the point estimate of error. A combination of MAE and RMSE is a common tool in model comparison with respect to point estimates.

Relative error (RE) is also known as the relative percentage error, which is computed by the following normalized average:

$$RE = \frac{\hat{y}_i - y_i}{y_i} \tag{6}$$

RE is useful for diagnostics of over-prediction or under-prediction, typically offering an indication of bias.

Nash-Sutcliffe efficiency (NSE) is the generalized version of R-squared from parametric regression, and is widely used in hydrology. NSE was introduced by Nash and Sutcliff in 1970 entitled "River flow forecasting through conceptual models part IA discussion of principles. Journal of Hydrology, 10(3):282-290, incorporated herein by reference and summarized by Moriasi et al. in 2007 entitled "Model evaluation guidelines for systematic quantification of accuracy in watershed simulations," ASABE, 50(3):885-900, incorporated herein by reference, $R^2$ is intuitively known as "percent variance explained", and pseudo $R^2$ is a built-in statistic of both "randomForest" package and "bartMachine" package in R. However, since $R^2$ is always measured with in-sample data, we use "NSE" to highlight its capability in validation. It is calculated by the following:

$$NSE = 1 - \frac{\sum_{i=1}^{n}(\hat{y}_i - y_i)^2}{\sum_{i=1}^{n}(y_i - \bar{y})^2} \stackrel{unbiased}{=} 1 - \frac{\hat{Var}(\text{error})}{\hat{Var}(y)} \tag{7}$$

Without bias and overfitting, NSE is a powerful tool measuring predictions of spatial variability for nonparametric models; NSE values range from negative infinity to 1. For example, NSE for a single storm validation could be negative, while the average NSE for the validation of all the storms remains positive, indicating that predictions for this specific storm is worse than a mean-only model in terms of spatial variability. When calculating NSE, we corrected the bias of total predicted value of each storm by scaling in order to focus on the spatial variability of each storm event.

When NSE is positive, it weakly increases as p/n increases, where p stands for the number of predictors and n stands for number of predictions. In our case, we aggregate predicted values from high resolution to low resolutions, which actually decreases n with predictors fixed. When NSE is positive (<1) for grid cells, we would expect NSE to be positive and even closer to 1 for coarser aggregations (i.e., towns and divisions), since the pseudo p/n increases. Similarly, negative NSE in high resolution may result in even smaller NSE in low resolutions.

Uncertainty ratio (UR) is a benchmark statistic of prediction uncertainty. Denote the prediction interval as ($Q_{lower_i}$, $Q_{upper_i}$). Similar to the UR described by Özkaynak et al. in 2009 entitled "Analysis of coupled model uncertainties in source-to-dose modeling of human exposures of ambient air pollution: A PM 2.5 case study," Atmospheric Environment, 42(9):1641-1649, incorporated herein by reference, the definition of UR is a generalized version for asymmetric intervals:

$$UR = \frac{\sum_{i=1}^{n}(Q_{upper_i} - Q_{lower_i})}{\sum_{i=1}^{n} y_i} \tag{8}$$

While UR is computed by summing up all the ranges of prediction intervals, the formal calculation of a prediction interval for each storm is done by summing up the simulated sample of prediction for each grid cell. Larger UR indicates relatively wider ranges of the prediction intervals (which may be less useful than narrower intervals, as they provide less detailed information).

Exceedance probability (EP) is a measurement of the probability that actual value will exceed the prediction interval. In this paper, we calculate the EP for each storm by $$\hat{P}\{exceed\} = 1 - \frac{1}{n}\sum_{i=1}^{n} 1_{\{Q_{lower_i} < y_i < Q_{upper_i}\}} \quad (9)$$

Similar to UR, large EP is unfavorable, and it implies a large chance to have actual values outside the prediction intervals. Coverage percentage is the opposite of exceedance probability and is defined as 100%

$$\text{Coverage \%} = \frac{1}{n}\sum_{i=1}^{n} 1_{\{Q_{lower_i} < y_i < Q_{upper_i}\}} * 100\% \quad (10)$$

In contrast to exceedance probability, we pursue high coverage rate of prediction intervals on actual values.

Rank histogram: A rank histogram provides a diagnosis of bias and dispersion in ensemble predictions (detailed interpretation of this plot can be found described by Hamill in 2001 entitled "Interpretation of rank histograms for verifying ensemble forecasts," Monthly Weather Review, 129(3): 550-560, incorporated herein by reference). Suppose we have m predictions for each observation $y_i$, denoted as $\{y_{ij}\}_{j=1,2,\ldots,m}$, and then the "ensemble" prediction is $\hat{y}_i = \overline{y_{ij}}$. A good model implies that the response is a realization of the prediction distribution, namely:

$$E\{P[y_{i,j-1} < y_i < y_{i,j}]\} = \frac{1}{m+1} \quad (11)$$

A rank histogram could be generated by collecting all the ranks of actual value in their prediction samples, denoted by $R=(r_1, r_2, \ldots, r_{m+1})$, where $r_j$ is the following average over all the i's:

$$r = \overline{\hat{P}\{y_{i,j-1} < y_i < y_{i,j}\}} \quad (12)$$

An ideal rank histogram should display a uniform distribution. A rank histogram with a convex function indicates under-dispersive predictions; a concave function implies over-dispersion. A rank histogram with larger values on the right than on the left addresses negative bias of predictions, while positively biased predictions yield large value on the left. In short, rank histogram above average means the distribution of actual values is "denser" than the distribution of predictions and vice versa.

Methods of Model Performance Comparison

The analysis is based on a dataset containing 89 storms that occurred in the utility's service territory, which resulted in 253,739 observations (89 storms with 2,851 grid cells per storm) for model training and validation. Within each storm, we randomly selected two thirds of the observations (n=1, 989) per storm for model training, and training data were grouped by season. The rest of the data (n=952 grid cells per storm) were used for model validation. Only model validation results will be presented in our model verification statistics.

For the QRF model, we specified a random forest of 1,000 trees (default setting for the "quantregForest" package—Meinshausen (2006) and 200 minimal instances for each terminal node to generate a large number of quantiles. Quantile regression was introduced to obtain 101 percentiles (including minimum and maximum) and predicted empirical distribution for each grid cell. The mean of the predicted empirical distribution (the same as random forest predictions), are recorded as point estimates at the grid cell level. We calculated 80% prediction intervals for each grid cell with the 10% and 90% prediction quantiles from QRF. We then sampled from the predicted empirical distribution 10,000 times per grid cell and aggregated these prediction samples to get empirical distributions in town, division and territory resolution. The weights obtained from step 2 in Section 3, were normalized as probabilities to draw prediction sample from training data responses. The mean and quantiles are consistent with predicted distribution, proved by Bickel et al. in 1981 entitled "Some asymptotic theory for the bootstrap," The Annals of Statistics, 1196-1217, incorporated herein by reference. After that, sample means and 80% intervals are calculated the three granularities (e.g., town, division and service territory). In the end, we combined these point estimations (means) and intervals for different seasons and generated plots of statistics, such as NSE, UR and rank histogram.

For the BART model, a 5-fold cross-validation indicated the following settings for the parameters: 50 trees, k=2, q=0.99, v=3, while other parameters remained default. In order to reach the convergence of MCMC, we performed 10,000 burn-in iterations, which produced a momentum sample (discarded). After that, we ran another 10,000 iterations to get the prediction sample of the model, which was used for prediction and validation. Point estimations and prediction samples for each observation in the testing dataset were computed in the Bayesian way. That is, sampling from the mean component (Equation 2) posterior sample and variance component (Equation 2) posterior sample under model assumptions. In contrast to QRF, BART generated prediction samples from a well-defined distribution instead of empirical distribution. Prediction intervals were calculated for BART in a way similar to QRF: the 10% and 90% quantiles from prediction samples for grid cells, or aggregated prediction samples for resolution lower than the grid cell.

We plotted statistics grouped by season and varying spatial resolutions (grid cell, town, division and territory) for evaluation. Through inspection of the plots and model characteristics, we were able to summarize the different behaviors of QRF and BART and provide a discussion of the observed patterns and their causes.

Section 4 Results and Discussion

First, discussed below is the QRF and BART performance for predicting Hurricane Irene (2011) and Hurricane Sandy (2012) outages. Then, the consistency and prediction intervals of QRF and BART are evaluated for different types of storms in our database. This evaluation is based on the statistical metrics described above, evaluated at different spatial resolutions ranging from the 2-km grid cell to town and regional averages.

Hurricane Outage Modeling

Point Estimate Results

Figure 31:
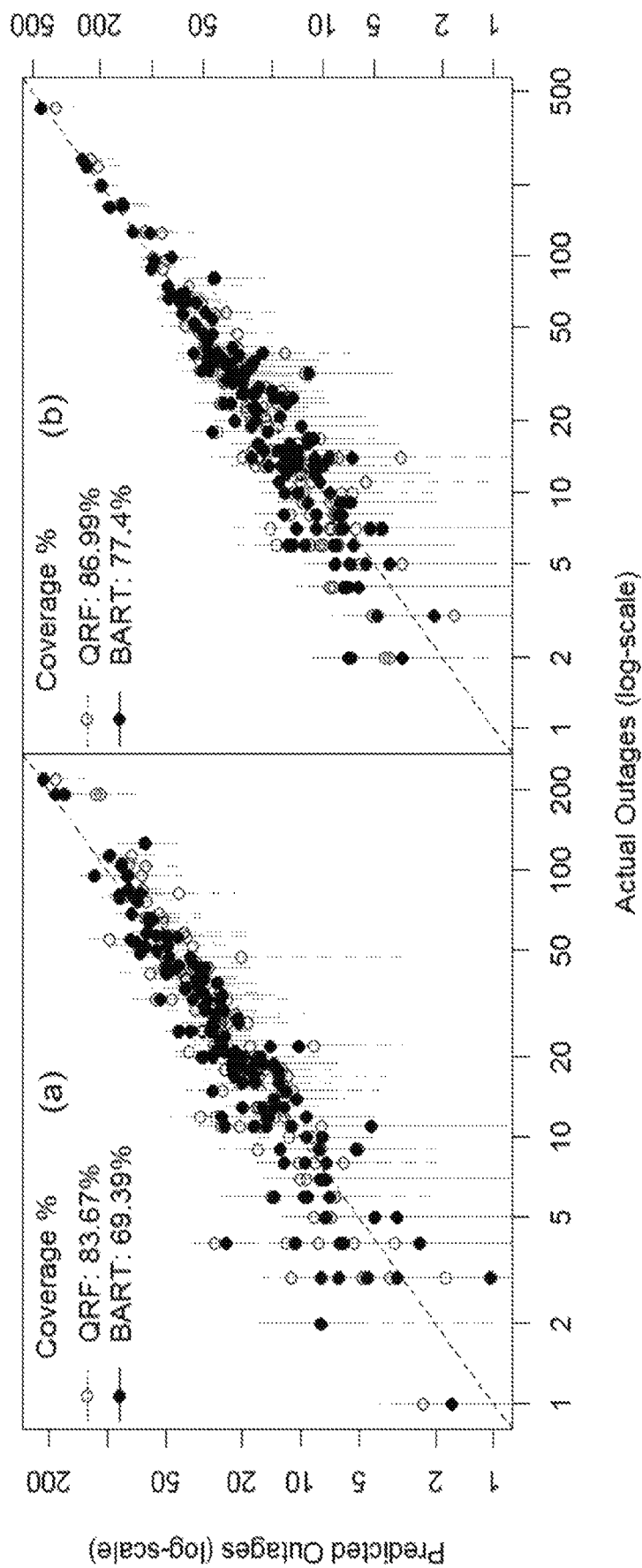
FIG. 31 shows a comparison of QRF and BART in town resolution: (a) Irene, (b) Sandy. (80% prediction intervals are given, as well as their coverage rates.)
Figure 32:
FIG. 32 shows a comparison of QRF and BART in Modeling Spatial Variability: total number of outages by town for (a) actual number of Irene, (b) actual number of Sandy, (c) QRF validation of Irene, (d) QRF validation of Sandy, (e) BART validation of Irene and (f) BART validation of Sandy.

With respect to hurricanes, FIG. 27 shows that both QRF and BART performed well in terms of point estimates, compared with a mean model (assuming uniform outages across grid cells). The mean model performed well in predicting total number of outages for Hurricane Sandy, because the randomly selected validation partition happened to capture two thirds of total outages in this case. However, the town level MAE and RMSE reveal that the mean model did not spatially predict the actual outages for Irene and Sandy. Both QRF and BART exhibited small MAE values (5.50-8.86 outages per town) with RMSE values close to MAE values, which indicates moderate variance of the point estimates and a lack of large residuals. For these tropical storm cases, BART showed less error than QRF in town resolution but did not exhibit an overwhelming advantage. QRF predictions were slightly more spread-out than BART as shown in the scatter plots of FIG. 31, which were consistent to the error metrics in FIG. 27. FIG. 32 illustrates the similar capability of QRF and BART in explaining the spatial variability of the predictions using the town-aggregated estimates; both QRF and BART predicted that the majority of outages from Irene and Sandy would be in central and southwestern Connecticut.

Prediction Interval Results

Both models exhibited different characteristics in terms of their prediction intervals. FIG. 31 shows that QRF produced more conservative town-resolution predictions by offering wider prediction intervals and a higher coverage rate than BART; coverage values for Irene and Sandy were 84% (69%) and 87% (77%) for QRF (BART) using the 80% confidence intervals. However, BART had narrower prediction intervals and was able to the cover actual number of outages for both Irene and Sandy in FIG. 27, while QRF failed to cover Irene's actual number of outages in its interval. We also noticed that BART produced symmetric intervals from the normal distribution, while QRF generated asymmetric intervals from the empirical distribution. Although we observed comparatively good results for BART, we were unable to conclude which model was superior in terms of predicting storm outages from analyzing these two hurricanes alone. Further investigation of the model performance for both hurricanes and the remaining less severe weather events follows next.

Comparison of Model Performance for all Storm Events

Point Estimate Results

In this section, QRF and BART are examined to explain how the magnitude and spatial variation of outages (i.e., point estimates), and also examine how both models' prediction intervals explained the variability of predicted outages. The analysis will highlight dependencies of our analysis on storm severity, season and leaf condition.

Figure 33:
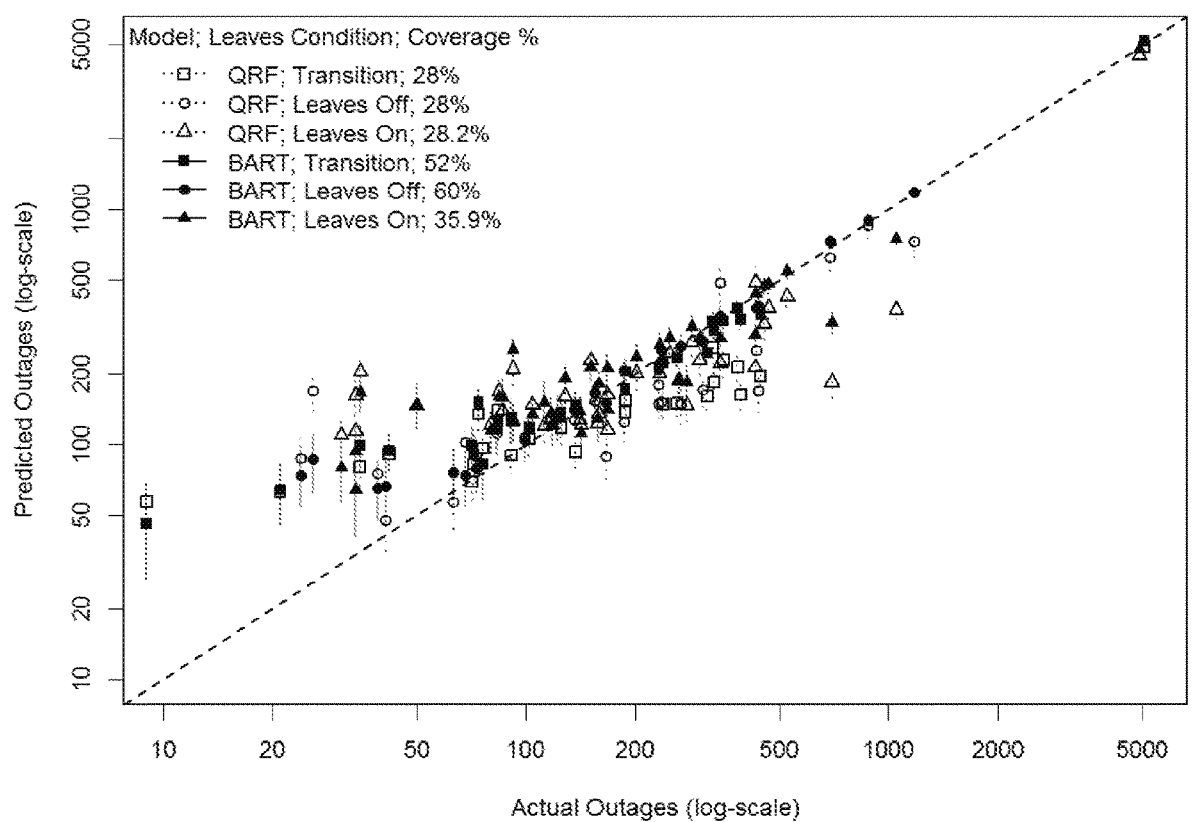
FIG. 33 illustrates predictions for each storm in validation dataset. (80% prediction intervals are given, as well as their coverage rates.)

FIG. 33 summarizes the overall fit of QRF and BART aggregated by storm events.

Both models show over-prediction for low impact events (<100 outages), while QRF also shows under-prediction for medium-high impact events (between 100 and 1000 outages). QRF (BART) exhibits coverage rates of prediction interval around 28% (36% to 60%), which were below our expectation (further analysis will reveal the cause of this phenomenon). We can see variations in performance across different leaf conditions and storm severities; both models did especially well at predicting hurricanes and for minor events with leaves off (winter).

Figure 34:
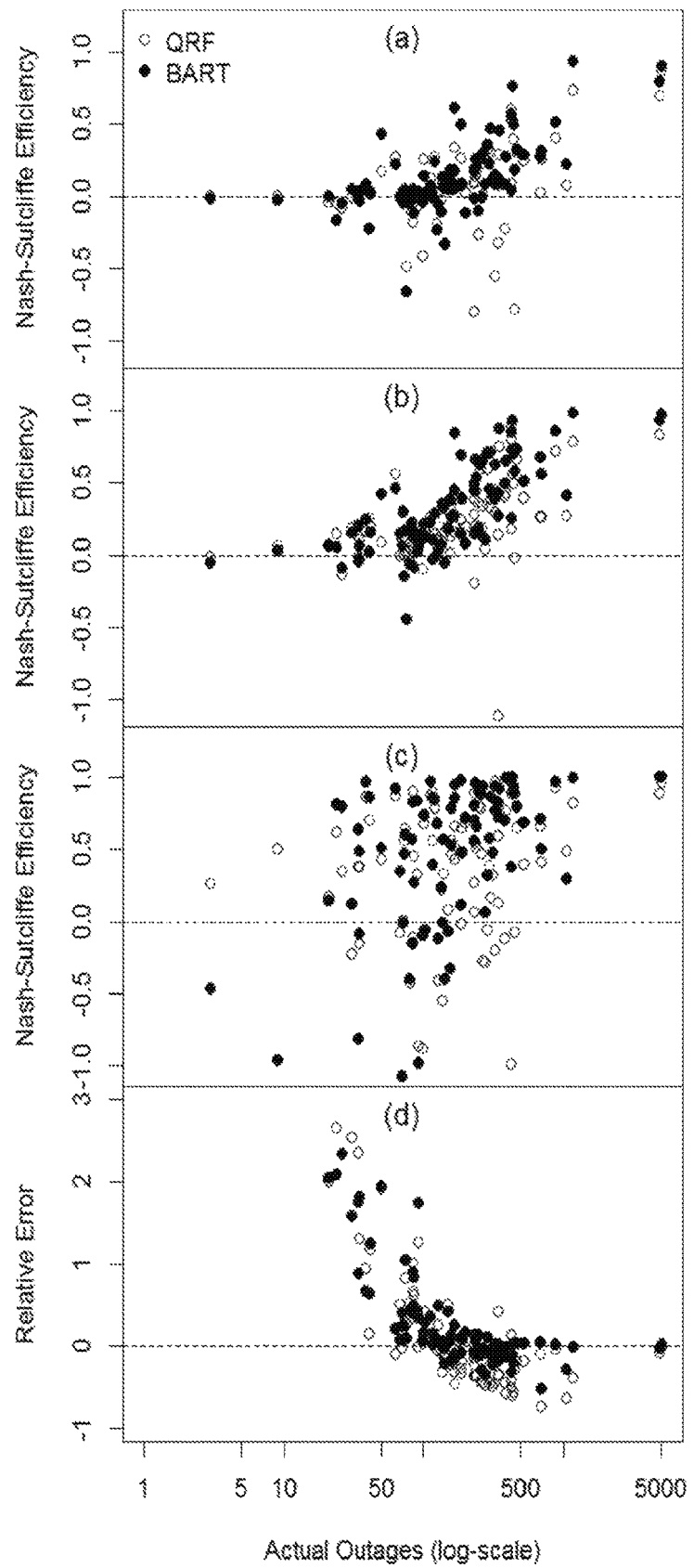
FIG. 34 shows Nash-Sutcliffe Efficiency (NSE) or Relative Error (RE) for each storm in different resolutions: (a) NSE for grid cells, (b) NSE for towns, (c) NSE for divisions, and (d) RE for territory.

First we will investigate the point estimate predictions of both models. FIGS. 34($a$), ($b$) and ($c$) illustrate how NSE varied for different spatial resolutions (grid, town, division) as a function of magnitude (outages per storm), while FIGS. 35($a$), ($b$) and ($c$) illustrate the same subject vs. different leaf conditions in boxplots. We see that the majority of storm events have positive NSE values in FIG. 34 and the 25% quantiles of NSE were close to or above 0 (zero) in FIG. 35, indicating that the most of predictions were informative in predicting the spatial variability of outages. In addition, both models show that the NSE for the three resolutions generally exhibited a positive correlation between the accuracy of spatial variability modeling and the magnitude of the event outages (FIG. 34). As expected, we observe in both FIG. 34 and FIG. 35 that for those events with positive NSE in grid cell resolution, the NSE's increased as the scale resolution became coarser (hence, we have many more events with NSE close to 1 at division resolution than at the grid resolution). Conversely, NSE tended to worsen at coarser scale aggregations for events where the models exhibited negative NSE at grid resolution. This "polarization" effect was so significant in division resolution that we should be cautious in using the aggregated results in this resolution, because the predicted outages may not reflect the true spatial distribution of outages for some storms. For all three resolutions, BART yielded better (more positive) NSE than QRF.

Figure 35:
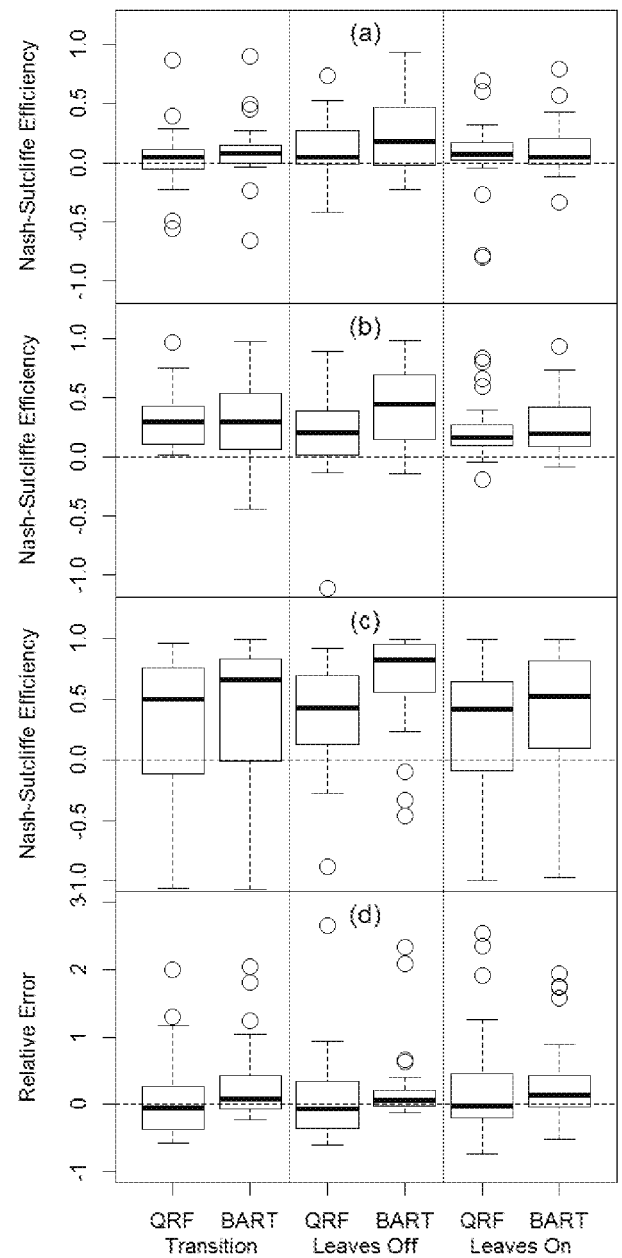
FIG. 35 shows Nash-Sutcliffe Efficiency (NSE) or Relative Error (RE) for each season in different resolutions: (a) NSE for grid cells, (b) NSE for towns, (c) NSE for divisions, and (d) RE for territory.

FIG. 34($d$) and FIG. 35($d$) show how the relative error (RE) of aggregated storm total predictions varied in event magnitude and leaf condition. In the territory resolution (on the storm event scale), there is no NSE defined and instead we are more interested in how the point estimate performed in predicting the actual magnitude (outages per storm). The RE exhibited a negative correlation with magnitude in FIG. 34, which suggests that both models were accurate for the most severe events. In FIG. 35, BART frequently yielded RE's with smaller variance than QRF, which is consistent to its less spread-out predictions in FIG. 33. Moreover, BART had the lowest (closest to zero) RE as well as highest NSE for the leaves off season (FIG. 35). We attribute BART's improved winter (leaves off) season error metrics to the similarity of the data in the grouping (e.g., only minor events (no hurricanes), the ground is more likely to be frozen). In short, we conclude that BART yielded better point estimates than QRF because it had higher NSE and lower (more close to zero) RE than QRF.

Prediction Interval Results

We also examined the prediction intervals provided by BART and QRF with uncertainty ratio (UR), exceedance probability (EP) and rank histogram. Prediction intervals that are very wide offer no value to decision makers, because they suggest any amount of storm outage may occur; conversely, a too-narrow prediction interval may not give a useful estimate of the extent of possible outages. These widths of intervals are captured by UR in FIG. 36 and a negative correlation between UR and magnitude was observed. Although narrow prediction intervals for high-magnitude events were favorable for their high certainty, the coverage rate becomes an important issue. In contrast to the UR, the actual value of outages exceeded the interval more frequently in severe events than in moderate events according to FIGS. 37($a$) and ($b$). We see a reverse trend of UR and EP vs. response magnitude. For BART, this is due to the homogeneity of variance assumption that made BART to offer intervals with similar absolute widths; for QRF, this is due to the fixed minimal number of instances in each terminal node that treated the nonzero or extreme responses the same as zero responses (more than 80% of responses as zeros at grid cell level in FIG. 30($a$)). In practice, we look for prediction intervals that have acceptable small UR and stable EP which associated with the confidence level (e.g., a stable probability of 0.2 given 80% intervals in our case). This suggests that more flexible assumptions and settings are needed for BART and QRF to capture the variation in response magnitude.

During aggregation, UR reduced step by step from grid cell resolution to territory resolution (FIG. 36), which is favorable. In contrast, the EP generally increased step by step via aggregation for both models (FIG. 37), which led to the low interval coverage rates in FIG. 33. In fact, QRF offered both low UR and low EP, implying superior performance in the highest resolution (i.e., grid cell). However, QRF's UR and EP became similar to or larger than BART's after aggregation, suggesting weakness in QRF's spatial aggregation. Since there are only four different divisions, EP can only be 0, 0.25, 0.5, 0.75 or 1 at division level in FIG. 37(c); Similarly, EP can only be 0 or 1 at storm event level in FIG. 37(d). Specifically, FIGS. 37(c) and (d) address that QRF suffered more 1's of EP than BART.

Figure 30:
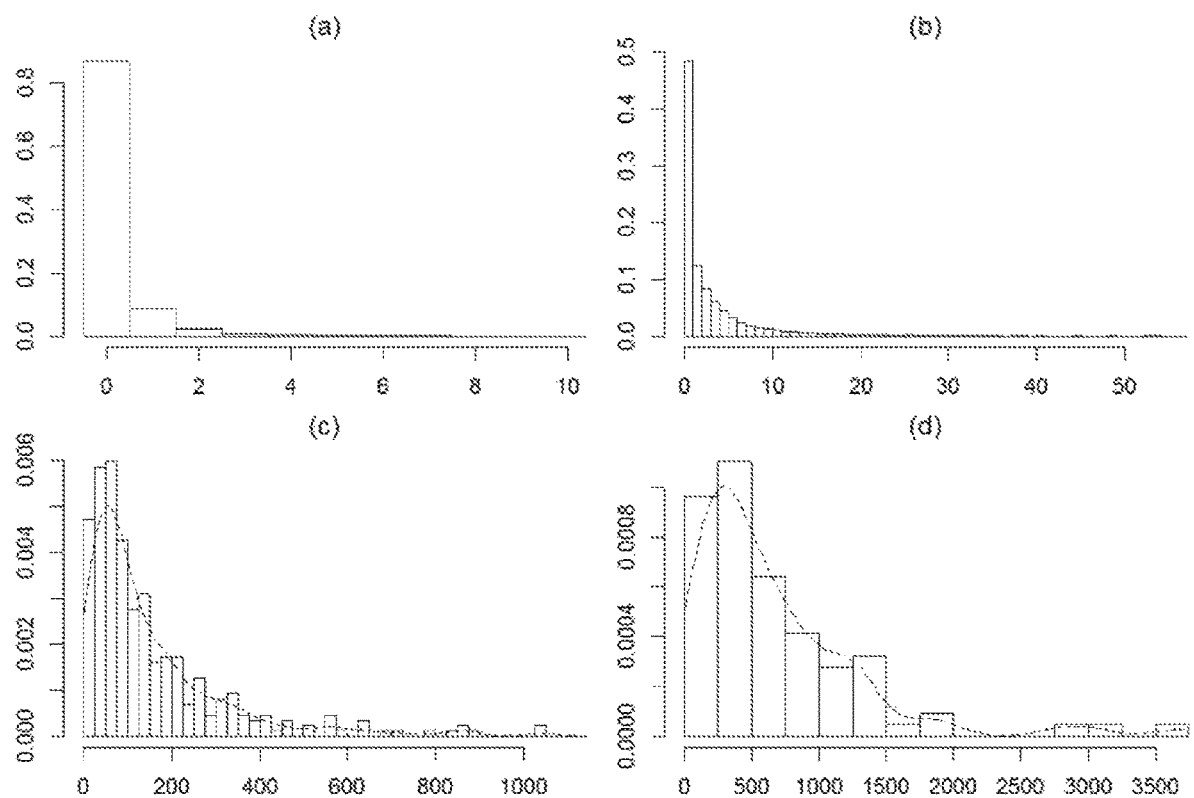
FIG. 30 illustrates density of outages in different resolutions: (a) grid cell, (b) town, (c) division, and (d) territory, wherein the dotted lines represent Gaussian kernel density estimations.
Figure 38:
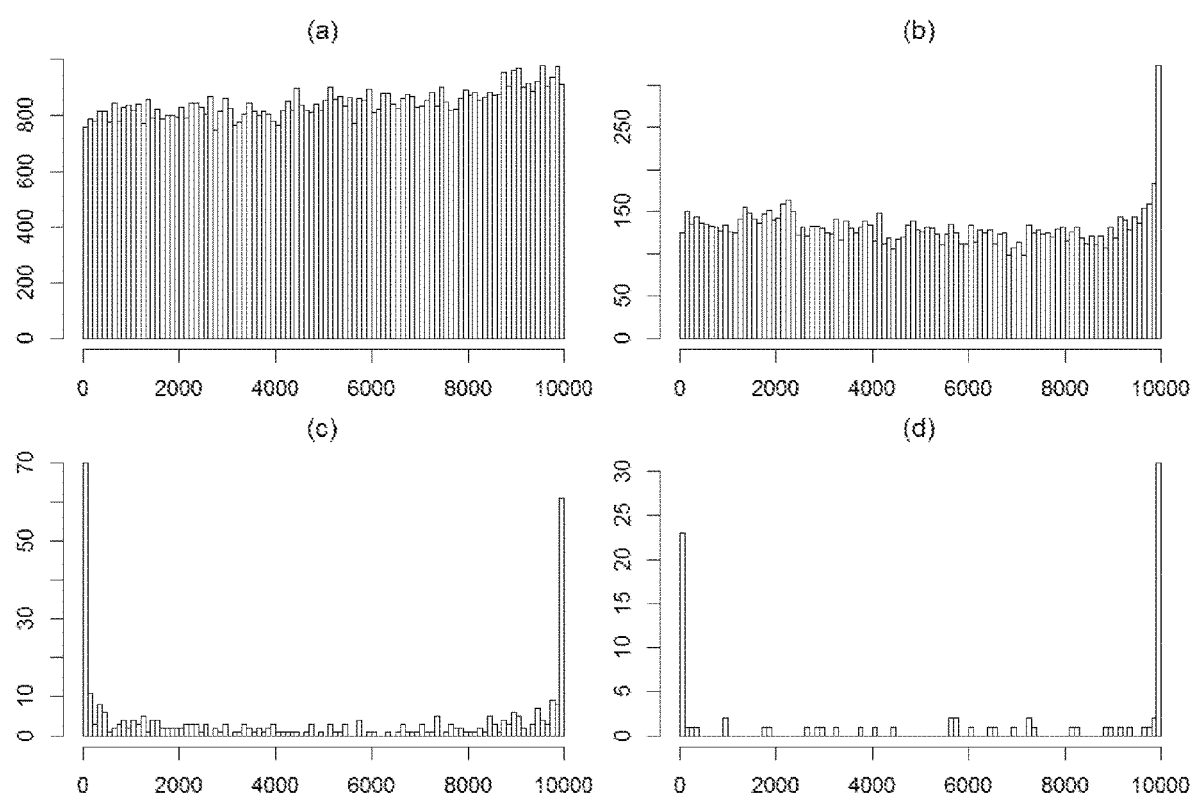
FIG. 38 shows Rank Histogram of QRF predictions in different resolutions: (a) grid cell, (b) town, (c) division, and (d) territory.
Figure 39:
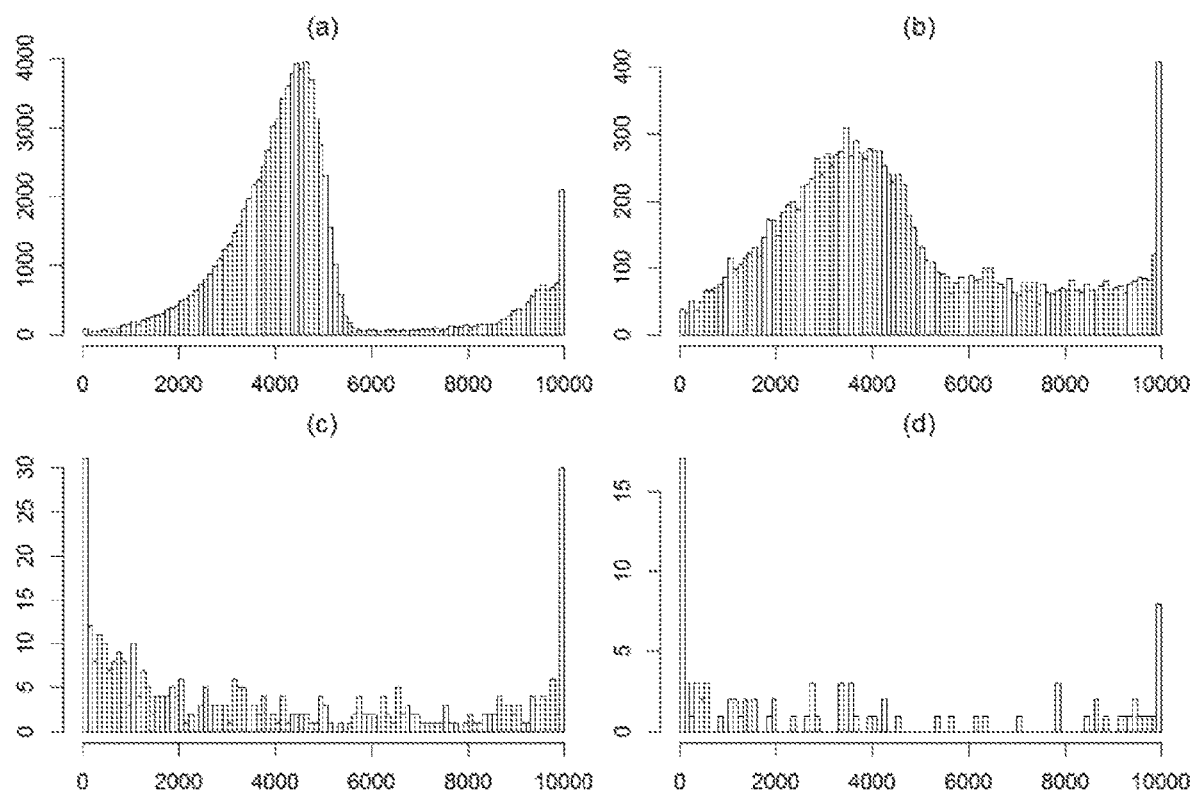
FIG. 39 shows Rank Histogram of BART predictions in different resolutions: (a) grid cell, (b) town, (c) division, and (d) territory.

To further elaborate the nature and issues of both models, we introduce rank histograms in FIG. 38 and FIG. 39. In practice, a uniformly distributed rank histogram means the predicated distribution (including its quantiles and intervals generated by quantiles) reflects the variability of the actual response. Overall QRF (FIG. 38(a)) did well in grid cell resolution as evidenced by the near-uniform distributed rank histogram with a moderate under-prediction issue. In comparison, BART (FIG. 39(a)) produced biased predicted distribution by assuming normal distribution on Poisson-distributed actual outages (FIG. 30(a)) for grid cells. However, spatial aggregation appears to undermine the QRF prediction by accumulating bias (FIG. 38). It is interesting to see BART (FIG. 39) benefited a little from spatial aggregation. In fact, BART yielded better predictions for storm event totals, where the normal distribution becomes a better approximation of combined Poisson distributions (FIG. 30). This explains why BART ended up with better interval coverage rates in FIG. 33, even though QRF started from more accurate predicted distribution for grid cells. Note that bias also differs from location to location and aggregating locations with under-estimates and locations with over-estimates could result in complicated bias which is hard to predict. In conclusion, BART produced better prediction intervals for divisions and whole territory, while QRF did better for grid cells and towns.

Figure 36:
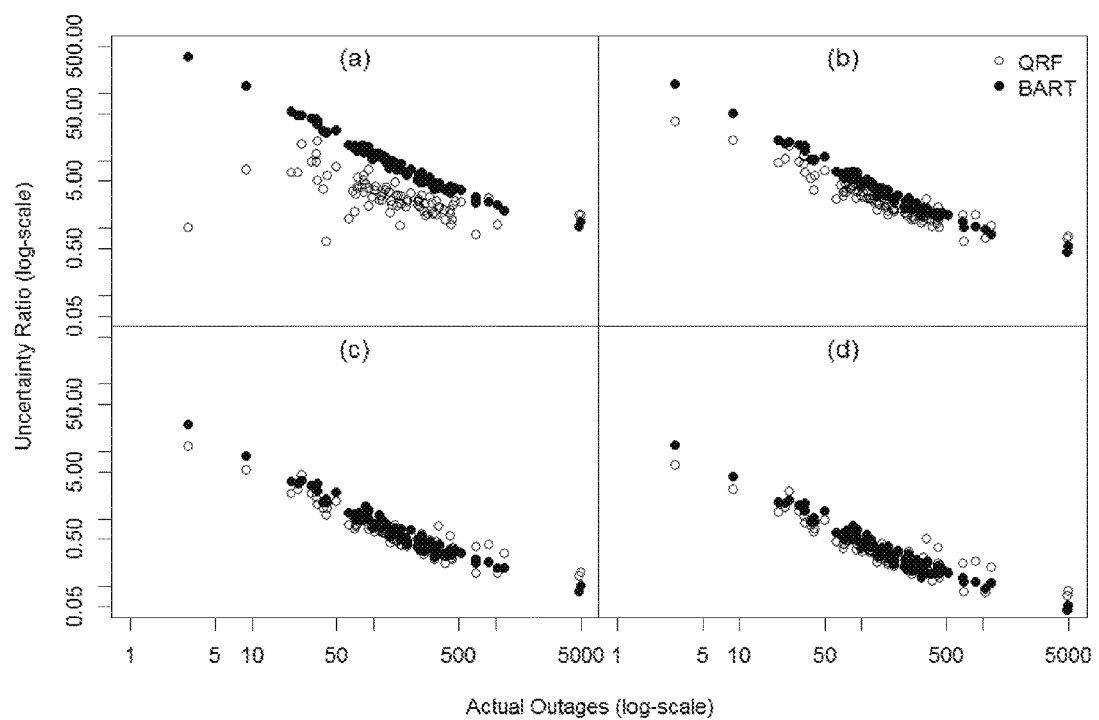
FIG. 36 shows Uncertainty Ratio (UR) for each storm in different resolutions: (a) grid cell, (b) town, (c) division, and (d) territory.
Figure 37:
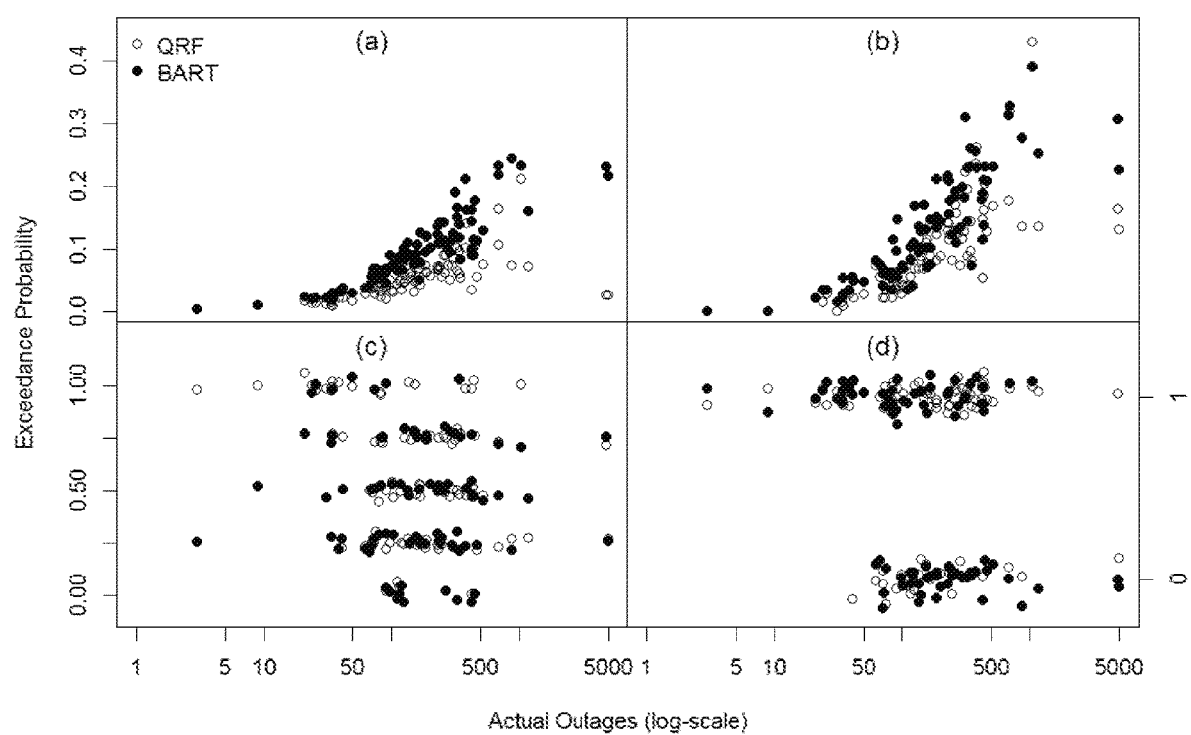
FIG. 37 shows Exceedance Probability (EP) for each storm in different resolutions: (a) grid cell, (b) town, (c) division, and (d) territory. (A small amount of noise is added in (c) and (d) to avoid overlap of points.)

Similar to previous works in parametric modeling like Liu et al. (2008), the models we utilized offer prediction intervals as well as point estimates of outages. Instead of simply identifying the potentials in quantifying prediction uncertainty, we took one more step in this study to evaluate QRF and BART with real-world data for their uncertainty measures. For hurricanes, BART model exceeded QRF in both predicting the outage magnitude (e.g., effective prediction intervals) and spatial variation of hurricane outages (FIG. 27). BART under-predicted Irene by 1.9% and over-predicted Sandy by 2.4%, while the best ensemble decision tree model in our previous work (Wanik et al. (2015) over-predicted Irene by 11% and under-predicted Sandy by 4.4%. However, caution must be exercised when directly applying BART to storm outage modeling. Nateghi et al. (2014) illustrated the weakness of BART when compared to random forest in survival analysis of hurricane outages where the response variable did not follow normal distribution. Most storms cause much less outages than hurricanes and even result in zero outage in some grid cells (FIG. 30(a)). Alternatively, QRF is promising in generating predictions and intervals without normality. Our analysis suggests that QRF suffered minor bias (FIG. 38(a)) in dealing with zero-inflated number of outages, while BART suffered significant bias (FIG. 39(a)). Compared to previous research (e.g., Guikema et al. (2012), we used real zero-inflated response variable based on storm events instead of simulated data or hurricanes, to suggest proper treatments to zeros. However, we found that BART was at least as good as QRF with respect to aggregated point estimates (FIG. 34 and FIG. 35) and was better at generating aggregated prediction intervals (FIG. 36 and FIG. 37). In short, different models could be utilized based on different interests or scales of application.

There are limitations for our study and results. Unlike Hurricane Ivan, studied by Nateghi et al. (2014), Hurricanes Irene and Sandy did not make landfall in the service territory of our study. Since these storms were not at their peak when they impacted Connecticut, our research does not necessarily reflect the "worst case scenario" for outages. We did not include ice storms in this research due to their fundamentally different characteristics with other events in our database. The categorization of leaf conditions according to seasonal periods and spatial aggregation strategy according to geographic boundaries was based upon utility's demand to integrate the models with their emergency planning efforts.

This methods and systems described in this document provide outage prediction models for an electric distribution network. It incorporates high-resolution weather simulations, distribution infrastructure and land use for modeling storm outages using quantile regression forests (QRF) and Bayesian additive regression trees (BART). For hurricanes, BART model exceeded QRF in both predicting the outage magnitude and spatial variation of hurricanes. It is found that outages caused by storms were not normally distributed and followed different distributions in different spatial resolutions. Hence, QRF was better at characterizing storm outages in high resolution, but did not aggregate well (from grid to division resolution). In contrast, BART did well at aggregating predictions for the storm outage total, but did not fully characterize the distribution of storm outages at higher resolution (e.g., grid resolution). In an operational context, utility companies might like to use maps of pre-storm outage predictions at the town resolution while also viewing a broader summary of the spatial variability, point estimates, and prediction intervals for the whole service territory. It is preferable to present the results from BART at coarser resolutions (e.g., division and service territory) and results from QRF for higher resolutions (e.g., grid and town) to best present the potential storm outages. Doing so will ensure that decision-makers get a complete idea of the overall severity of the event at a coarser resolution while also providing the detailed information supporting a pre-storm response at a higher resolution.

There are many opportunities for improvement in storm outage modeling on electric distribution networks. From a methodological point of view, both models could be modified to deal with the large number of zeros in our dataset (more than 80%). For QRF, empirical distributions for extreme observations are very different from the majority (mostly zeros). By experimenting with the minimum number of observations required for the terminal node (according to overall magnitude of observations in the node), the accuracy of point estimates and prediction intervals may be improved. For BART, an application in generalized linear models (GLMs) with more flexible assumptions and link functions becomes very important, because Poisson-distributed data or zero-inflated data appear frequently in high-resolution analysis. For example, Poisson, negative binomial and zero-truncated normal with heterogeneous variance could perform as priors to assist BART in storm outage modeling. In addition to the two-staged model (similar to the classification-GAM model used by Guikema et al. (2012), a zero-inflated BART model optimized simultaneously for both zero-inflated classification and zero-truncated signals could be implemented. For spatial aggregation, the ideal unbiased prediction may not be available for every location, thus getting accurate predictions for another resolution based on biased results is challenging and important. There are already some advanced techniques (e.g., Reilly et al. (2014) to aggregate point estimates into multiple scales while eliminating bias and error by utilizing spatial patterns. Similar techniques to aggregate predicted distributions for each location could be investigated in a future study.

From a modeling point of view, the inconsistent performance of both models for varying season categories (tree-leaf condition) implies difficulties in predicting storm outages with leaves on trees. Future research may consider including additional effective explanatory variables that represent the localized tree conditions such as Leaf Area Index (LAI), vegetation management (e.g., tree trimming) data or detailed tree density, location, height and species data to better capture this phenomenon. In addition, the landscape changes over time trees continue to grow, utilities trim them, and infrastructure is constantly being upgraded and expanded. While we have captured some variables related to the environmental and infrastructure conditions, future extensions of the models will include dynamic information on grid vulnerability related to landscape, vegetation and infrastructure.

Any patents or publications mentioned in this specification are indicative of the levels of those skilled in the art to which the invention pertains. These patents and publications are incorporated herein by reference to the same extent as if each individual publication was specifically and individually indicated to be incorporated by reference. In case of conflict, the present specification, including definitions, will control.

The present disclosure described herein and representative embodiments, are exemplary, and are not intended as limitations on the scope of the invention. Changes therein and other uses will occur to those skilled in the art which are encompassed within the spirit of the invention as defined by the scope of the claims.

What is claimed is:

1. An outage prediction system comprising:
   an electronic processor; and
   a memory communicatively coupled to the electronic processor, wherein the memory is configured to provide the electronic processor with instructions that when executed cause the electronic processor to
      store geographical information system (GIS) data and dynamic weather data in a database;
      receive, from the database, the dynamic weather data;
      receive, from the database, the GIS data from a geographic information system, wherein the GIS data is associated with a leaf area index around overhead lines;
      combine the dynamic weather data and the GIS data with a GIS look-up table to generate a file identifying parameters of a forthcoming weather event;
      define a plurality of model forcings, wherein each model forcing includes a predetermined set of weather variables;
      train a plurality of machine learning models for each model forcing, wherein each machine learning model is trained using a historic calibration dataset associated with one or more past weather events;
      execute each of the plurality of machine learning models to the identified parameters in the file to generate an outage prediction;
      automatically generate a spatial map with a visual output value for each model forcing and each machine learning model, each output value predicting the likelihood of a utility outage in a particular location, and
      update the historic calibration dataset, wherein each of the trained machine learning models, after the one or more past weather events has occurred, utilizes actual outage data associated with one or more past weather events to provide feedback for retraining to the trained machine learning models for predicting the likelihood of the utility outage in the particular location.

2. The outage prediction system of claim 1, wherein the GIS data is further associated with at least one additionally variable selected from the group consisting of land use and trimming.

3. The outage prediction system of claim 1, wherein the particular location is defined by an electrical utility's service area.

4. The outage prediction system of claim 3, wherein the particular location is defined within a grid cell within the electrical utility's service area.

5. The outage prediction system of claim 1, wherein each model forcing includes a predetermined set of weather variables, wherein a weather variable is related to at least one selected from a group consisting of a base calibration, a gust calibration, and a wind calibration.

6. The outage prediction system of claim 1, wherein the electronic processor is further configured to receive input of a season in which the forthcoming weather event is occurring.

7. The outage prediction system of claim 6, wherein the season is one where trees have leaves, one where trees do not have leaves, or one that is a transition period.

8. The outage prediction system of claim 1, wherein the electronic processor is further configured to generate the spatial map predicting a number of outages in the particular location.

9. A method of predicting a utility outage, the method comprising:
   storing geographical information system (GIS) data and dynamic weather data in a database;
   receiving, from the database with an electronic processor, the dynamic weather data;
   receiving, from the database with the electronic processor, the GIS data from a geographic information system, wherein the GIS data is associated with data related to location of utility overhead lines in a predefined region;
   receiving, with the electronic processor, input of a season in which a forthcoming weather event is occurring;
   combining, with the electronic processor, the dynamic weather data with the GIS data with a GIS look-up table to generate a file identifying parameters of the forthcoming weather event;
   defining, with the electronic processor, a plurality of model forcings, wherein each model forcing includes a predetermined set of weather variables;
   training, with the electronic processor, a plurality of machine learning models for each model forcing, wherein each machine learning model is trained using a historic calibration dataset associated with one or more past weather events;
   executing, with the electronic processor, each of the plurality of machine learning models to the file to generate an outage prediction;
   automatically generating, with the electronic processor, a spatial map with a plurality of visual output values for each model forcing and each machine learning model, each of the output values providing a prediction of an outage of one or more of the overhead lines; and
   updating, with the electronic processor, the historic calibration dataset, wherein each of the trained machine learning models, after the one or more past weather events has occurred, utilizes actual outage data associated with one or more past weather events to provide feedback for retraining to the trained machine learning models for predicting the likelihood of the utility outage in the particular location.

10. The method of claim 9, wherein each model forcing includes a predetermined set of weather variables.

11. The method of claim 10, wherein a weather variable is related to at least one selected from a group consisting of a base calibration, a gust calibration, and a wind calibration.

12. The method of claim 11, further comprising updating the model forcings by updating the weather variables with data related to the weather event.

13. The method of claim 11, further comprising defining a particular location of the overhead lines.

14. The method of claim 13, wherein the particular location is defined within a grid cell within an electrical utility's service area.

15. The method of claim 13, further comprising generating the spatial map identifying the particular location of the overhead lines.

16. The method of claim 9, further comprising classifying the forthcoming weather event as at least one of a group consisting of snow, ice, heavy rain, wind, thunderstorm, and tropical.

17. A method of predicting a utility outage, the method comprising:
    storing, with an electronic processor, geographical information system (GIS) data and dynamic weather data in a database;
    receiving, from the database with the electronic processor, the dynamic weather data;
    receiving, from the database with the electronic processor, the GIS data from a geographic information system, the GIS data associated with data related to location of utility overhead lines in a predefined region;
    combining, with the electronic processor, the dynamic weather data with the GIS data with a GIS look-up table to generate a file identifying parameters of a forthcoming weather event;
    inputting, via a user interface, a season in which the forthcoming weather event is occurring;
    receiving, with the electronic processor, leaf condition data associated with the season and precipitation data for the forthcoming weather event;
    defining a plurality of model forcings relevant to the forthcoming weather event, each model forcing including a predetermined set of weather variables related to precipitation and temperature;
    training, with the electronic processor, a plurality of machine learning models for each model forcing, wherein each machine learning model is trained using a historic calibration dataset associated with one or more past weather events;
    executing, with the electronic processor, each of the plurality of machine learning models to generate an outage prediction;
    automatically generating, with the electronic processor, a spatial map with a plurality of visual output values for each model forcing and each machine learning model, each of the output values providing a prediction of an electrical outage at a particular location; and
    updating, with the electronic processor, the historic calibration dataset, wherein each of the trained machine learning models, after the one or more past weather events has occurred, utilizes actual outage data associated with one or more past weather events to provide feedback for retraining to the trained machine learning models for predicting the likelihood of the utility outage in the particular location.

18. The method of claim 17, wherein the particular location is defined within a grid cell within an electrical utility's service area.

19. The method of claim 17, further comprising generating the spatial map identifying the particular location of the predicted outage.

20. The method of claim 17, further comprising updating the model forcings by updating the weather variables with data related to the weather event.

* * * * *